United States Patent [19]
Hulsing, II

[11] Patent Number: 5,396,797
[45] Date of Patent: Mar. 14, 1995

[54] TRIAXIAL ANGULAR RATE AND ACCELERATION SENSOR

[75] Inventor: Rand H. Hulsing, II, Redmond, Wash.

[73] Assignee: AlliedSignal Inc., Morris Township, Morris County, N.J.

[21] Appl. No.: 987,906

[22] Filed: Dec. 8, 1992

Related U.S. Application Data

[63] Continuation-in-part of Ser. No. 653,533, Feb. 8, 1991, Pat. No. 5,241,861.

[51] Int. Cl.$^6$ .............................................. G01P 9/04
[52] U.S. Cl. ...................................................... 73/505
[58] Field of Search .................................. 73/505, 510

[56] References Cited

U.S. PATENT DOCUMENTS

| | | |
|---|---|---|
| 4,372,173 | 2/1983 | EerNisse et al. |
| 4,445,376 | 5/1984 | Merhav |
| 4,467,651 | 8/1984 | Melametz et al. |
| 4,510,802 | 4/1985 | Peters |
| 4,512,192 | 4/1985 | Peters |
| 4,517,841 | 5/1985 | Malametz et al. |
| 4,522,062 | 6/1985 | Peters |
| 4,538,461 | 9/1985 | Juptner et al. |
| 4,541,105 | 9/1985 | Lee et al. |
| 4,590,801 | 5/1986 | Merhav |
| 4,592,233 | 6/1986 | Peters |
| 4,628,735 | 12/1986 | Kirkpatrick |
| 4,654,663 | 3/1987 | Alsenz et al. |
| 4,665,748 | 5/1987 | Peters |
| 4,706,259 | 11/1987 | Tonn et al. |
| 4,711,128 | 12/1987 | Boura |
| 4,712,426 | 12/1987 | Peters |
| 4,712,427 | 12/1987 | Peters |
| 4,727,752 | 3/1988 | Peters |

(List continued on next page.)

FOREIGN PATENT DOCUMENTS

| | | | |
|---|---|---|---|
| 2207758A | 2/1989 | United Kingdom | G01P 15/08 |
| WO92/08140 | 5/1992 | WIPO | G01P 15/08 |
| WO92/14160 | 8/1992 | WIPO | G01P 15/08 |

OTHER PUBLICATIONS

Albert P. Pisano, "Resonant-Structure Micromotors," Micro Electro Mechanical Systems, Feb. 20-22, 1989, IEEE Catalog No. 89TH0249-3, Library of Congress No. 88-83988, pp. 44-48.

William C. Tang, et al., "Laterally Driven Polysilicon Resonant Microstructures," Micro Electro Mechanical Systems, Feb. 20-22, 1989, IEEE Catalog No. 89TH0249-3, Library of Congress No. 88-83988, pp. 53-59.

*Primary Examiner*—John E. Chapman
*Attorney, Agent, or Firm*—Howard G. Massung

[57] ABSTRACT

A triaxial sensor substrate is adapted for use in measuring the acceleration and angular rate of a moving body along three orthogonal axes. The triaxial sensor substrate includes three individual sensors that are arranged in the plane of the substrate at an angle of 120 degrees with respect to one another. Each sensor is formed from two accelerometers having their sensing axes canted at an angle with respect to the plane of the substrate and further being directed in opposite directions. The rate sensing axes thus lie along three orthogonal axes. In order to reduce or eliminate angular acceleration sensitivity, a two substrate configuration may be used. Each substrate includes three accelerometers that are arranged in the plane of the substrate at an angle of 120 degrees with respect to one another. The sensing axes of the accelerometers of the first substrate are canted at an angle with respect to the plane of the first substrate toward the central portion thereof so that they lie along three skewed axes. Similarly, the sensing axes of the accelerometers of the second substrate are canted at an angle with respect to the plane of the second substrate away from the central portion thereof so that they lie along same three but oppositely directed axes. The sensing axes of the first and second substrates are aligned to prevent angular acceleration sensitivity.

8 Claims, 36 Drawing Sheets

U.S. PATENT DOCUMENTS

| | | |
|---|---|---|
| 4,750,363 | 6/1988 | Norling . |
| 4,766,768 | 8/1988 | Norling . |
| 4,782,700 | 11/1988 | Hulsing . |
| 4,786,861 | 11/1988 | Hulsing . |
| 4,799,385 | 1/1989 | Hulsing et al. . |
| 4,810,922 | 3/1989 | Hirsch . |
| 4,811,602 | 3/1989 | Hulsing . |
| 4,814,680 | 3/1989 | Hulsing . |
| 4,821,572 | 4/1989 | Hulsing . |
| 4,841,773 | 6/1989 | Stewart . |
| 4,848,156 | 7/1989 | Hulsing . |
| 4,864,861 | 9/1989 | Hulsing . |
| 4,870,588 | 9/1989 | Merhav . |
| 4,872,342 | 10/1989 | Hanson et al. . |
| 4,872,343 | 10/1989 | Peters . |
| 4,879,914 | 11/1989 | Norling . |
| 4,881,408 | 11/1989 | Hulsing et al. . |
| 4,882,933 | 11/1989 | Petersen et al. . |
| 4,891,982 | 1/1990 | Norling . |
| 4,891,984 | 1/1990 | Fujii et al. . |
| 4,896,268 | 1/1990 | MacGugan . |
| 4,901,586 | 2/1990 | Blake . |
| 4,912,990 | 4/1990 | Norling . |
| 4,920,801 | 5/1990 | Church . |
| 4,922,756 | 5/1990 | Henrion . |
| 4,928,203 | 5/1990 | Swindal et al. . |
| 4,930,351 | 6/1990 | Macy et al. . |
| 4,996,877 | 3/1991 | Stewart et al. ............... 73/510 |

TRIAXIAL ANGULAR RATE AND ACCELERATION SENSOR

This application is a continuation-in-part of U.S. Ser. No. 07/653,533, filed Feb. 8, 1991, now U.S. Pat. No. 5,241,861.

FIELD OF THE INVENTION

The present invention relates to micromachined devices used for measuring angular rate and acceleration. More particularly, the present invention relates to a triaxial angular rate and acceleration sensor for use in inertial measurement units that may be micromachined from a single substrate.

REFERENCE TO RELATED APPLICATIONS

Reference is further made to the following commonly assigned, co-pending patent applications:
1) entitled "Monolithic Accelerometer" U.S. Ser. No. 07/377,785, filed Jul. 6, 1989 in the name of Brian L. Norling;
2) entitled "Accelerometer with Co-Planar Push-Pull Force Transducers" U.S. Ser. No. 07/316,399, filed Feb. 27, 1989 in the name of Mitch Novack;
3) entitled "Coriolis Inertial Rate and Acceleration Sensor" filed (SDC-B03808) in the name of Rand H. Hulsing II;
4) entitled "Translational Accelerometer with Motion Constraints", filed (SDC-BO3804), in the names of B. Norling and S. Becka.
5) entitled "Torque Coil Stress Isolator" U.S. Ser. No. 07/569,398, by S. Foote.

BACKGROUND OF THE INVENTION

Inertial measurement units (IMUs) are critical to the proper operation of inertial navigation and guidance systems. Such systems are used on ships, aircraft, spacecraft, etc.

A typical IMU utilizes a cluster of three accelerometers and three gyros mounted to a structure which is shock isolated. The three accelerometers are used to measure linear acceleration while the gyros are used to measure angular rate.

U.S. Pat. No. 4,920,801, the mathematical equations of which are hereby incorporated by reference, is directed to a monolithic accelerometer capable of sensing linear acceleration in three orthogonal directions. The accelerometer utilizes three co-planar cantilever beams. A mass is formed on each of the cantilever beams. The mass is asymmetrically arranged about the neutral plane of the beam such that the sensing axes passes through the mass at an angle with respect to the plane of the beams. The beams are arranged at 120 degrees with respect to one another such that the sensing axes are substantially orthogonal. Although this accelerometer may be used to measure linear acceleration, it cannot measure angular rate.

Sundstrand Data Corporation has pioneered the development of a Single Coriolis Inertial Rate and Acceleration Sensor (SCIRAS ™). In an article by Rand Hulsing II entitled "Single Coriolis Inertial Rate and Acceleration Sensor", Journal of the Institute of Navigation, Vol. 35, No. 3, pp. 347–59 (Fall 1988), the inventor describes a proof-of-concept mechanism which was capable of simultaneously measuring both linear acceleration and angular rate with the same accelerometer structure. The mechanism utilized two back-to-back linear accelerometers disposed on opposite sides of a flexible parallelogram structure. The parallelogram structure was rocked at a predetermined dither frequency. As the parallelogram is rocked about flexures at its corners, a predominantly linear motion is applied to both accelerometers in equal and opposite directions. Using the difference between the two accelerometer outputs, the linear component is measure. Using the sum of the two outputs, the linear components cancel, and only the Coriolis components remain. Thus the small Coriolis acceleration signal associated with angular rate can be extracted from a large linear vibration by matching the scale factors of the two accelerometers.

SUMMARY OF THE INVENTION

The present invention is directed to a monolithic sensor substrates which are adapted for use in sensors which allow simultaneous measurement of both linear acceleration and angular rate along three skewed axes. The sensor includes two sets of three accelerometers each. Thus a total of six accelerometers are used.

In accordance with one feature of the invention, the accelerometers are formed as a monolithic structure from a single substrate such as silicon. Each accelerometer includes a proof mass connected to a sensor frame by at least one flexure. All six accelerometers are arranged in a single plane. The input axis of each accelerometer is canted at an angle with respect to the plane. A first set of three accelerometers are disposed in the plane such that their input axes are skewed to one another. The remaining second set of three accelerometers are arranged such that their input axes are also skewed with one another and opposite in direction to the input axes of the first set of three accelerometers. The sensor frames of each accelerometer of the first set of accelerometers is connected to a corresponding accelerometer from the second set of accelerometers. The link allows the corresponding accelerometers to dither at the same frequency and further ensures that a force imparted to one accelerometer of the pair along the dither axis of the pair is also imparted to the corresponding accelerometer in an equal but opposite direction. All of the accelerometers in the plane are further mechanically linked to one another such that a single dither oscillator may be used to dither the accelerometers in the plane at the same dither frequency.

In accordance with another feature of the invention, the input axis of each accelerometer is canted by adding a mass plate as part of the proof mass to adjust the center of mass of the proof mass. The full scale acceleration range and the Q of the accelerometer can be set to a particular value dependent upon the density of the mass plate material.

In accordance with a further feature of the invention, the sensor may be designed to prevent angular acceleration sensitivity. In one embodiment of such a design, the first and second sets of accelerometers are not coplanar. Rather, the first set of accelerometers lie in a first plane while the second set of accelerometers lie in a second plane that is generally parallel to the first plane. The input axes of the first set of accelerometers are aligned with the input axes of the second set of accelerometers. The first set of accelerometers are linked to one another such that they dither at the same frequency. Likewise, the second set of accelerometers are linked to one another such that they dither at the same frequency. The first and second sets of accelerometers, in turn, are linked to one another such that they dither at the same frequency but with a phase differential.

The phase difference may be provided in several manners. In one particular embodiment, the phase difference is the result of a linking member associated with each one of the first set of accelerometers. While the second set of accelerometers undergo a dither force in a first direction, the linking member causes a counter force to be applied to dither the first set of accelerometers in the opposite direction. In a further embodiment, the phase difference is merely the result of the natural motion of the accelerometers. In a still further embodiment, a connection link is disposed between the substrate forming the first set of accelerometers and the substrate forming the second set of accelerometers. The connection link causes the first and second set of accelerometers to dither at the same frequency, but at a phase difference approaching 180 degrees.

It will be understood that the drawings are not necessarily to scale. In certain instances, details which are not necessary for understanding the present invention have been omitted for clarity.

DESCRIPTION OF THE PREFERRED EMBODIMENTS

Figure 1A:
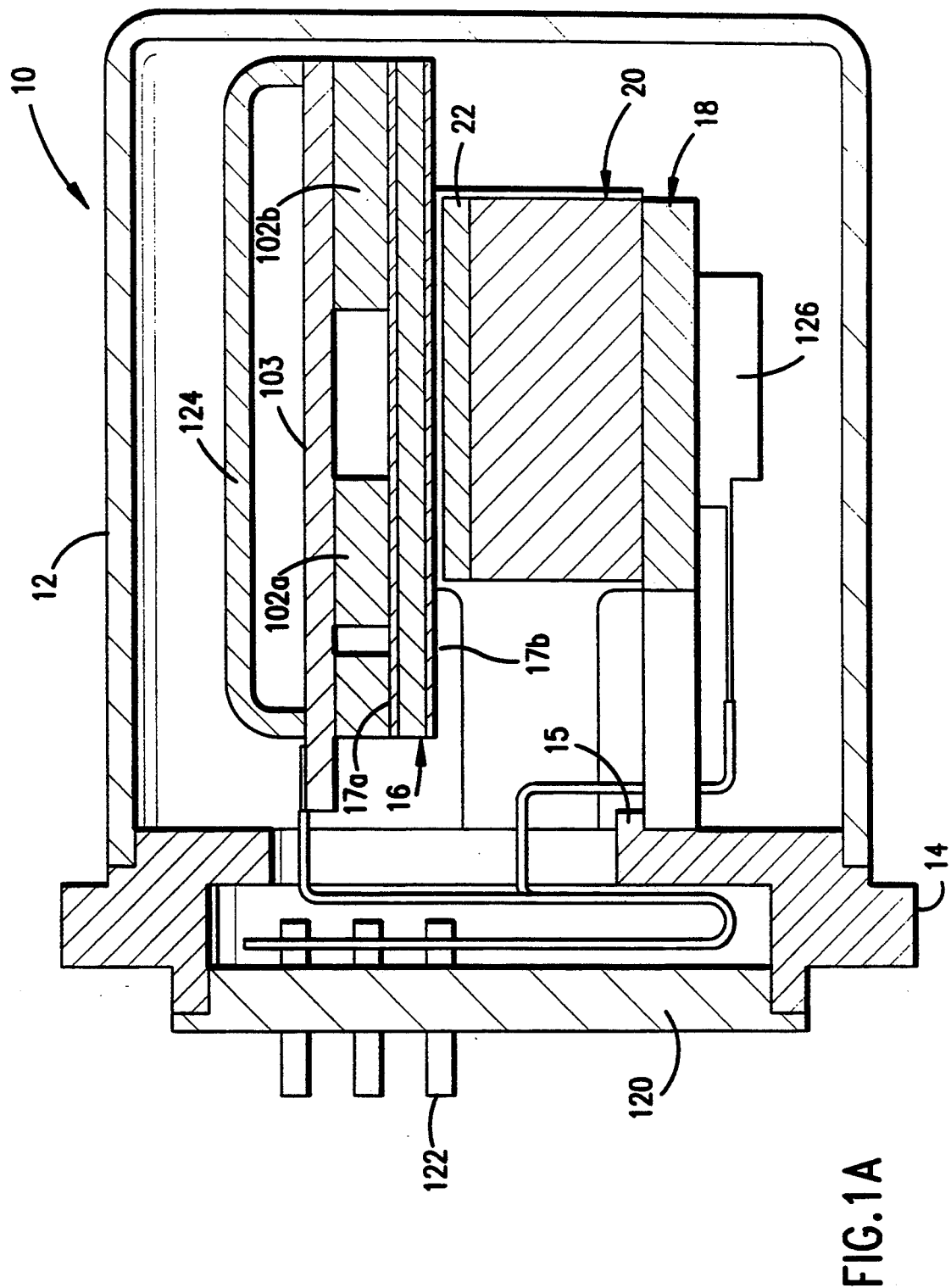
FIG. 1A is a perspective view illustrating the rate and acceleration sensor of this invention.

Referring now to the drawings, FIGS. 1A, B, C and D show the arrangement of a rate and acceleration sensor 10 according to the present invention. The sensor 10 includes a shell 12 housing a unitary substrate 16, which is illustratively made of silicon and in which is formed, illustratively by micromachining, a pair of accelerometers 32a and 32b disposed in side-by-side relation such that their input axes 38a and b are disposed in opposite directions (see FIG. 1D). The sensor 10 also includes a unitary magnet 20 and a flux path assembly 18, which provides a magnetic path for directing the flux emanating from the magnet 20 through the substrate 16 and its first and second accelerometers 32a and b. As will be explained, the configuration and disposition of the accelerometers 32a and b within the substrate 16 permits a simple, straightforward magnetic flux path to effect the operation of the dithering motion and the vibration of a sensor element of the accelerometers 32a and b.

Figure 2A:
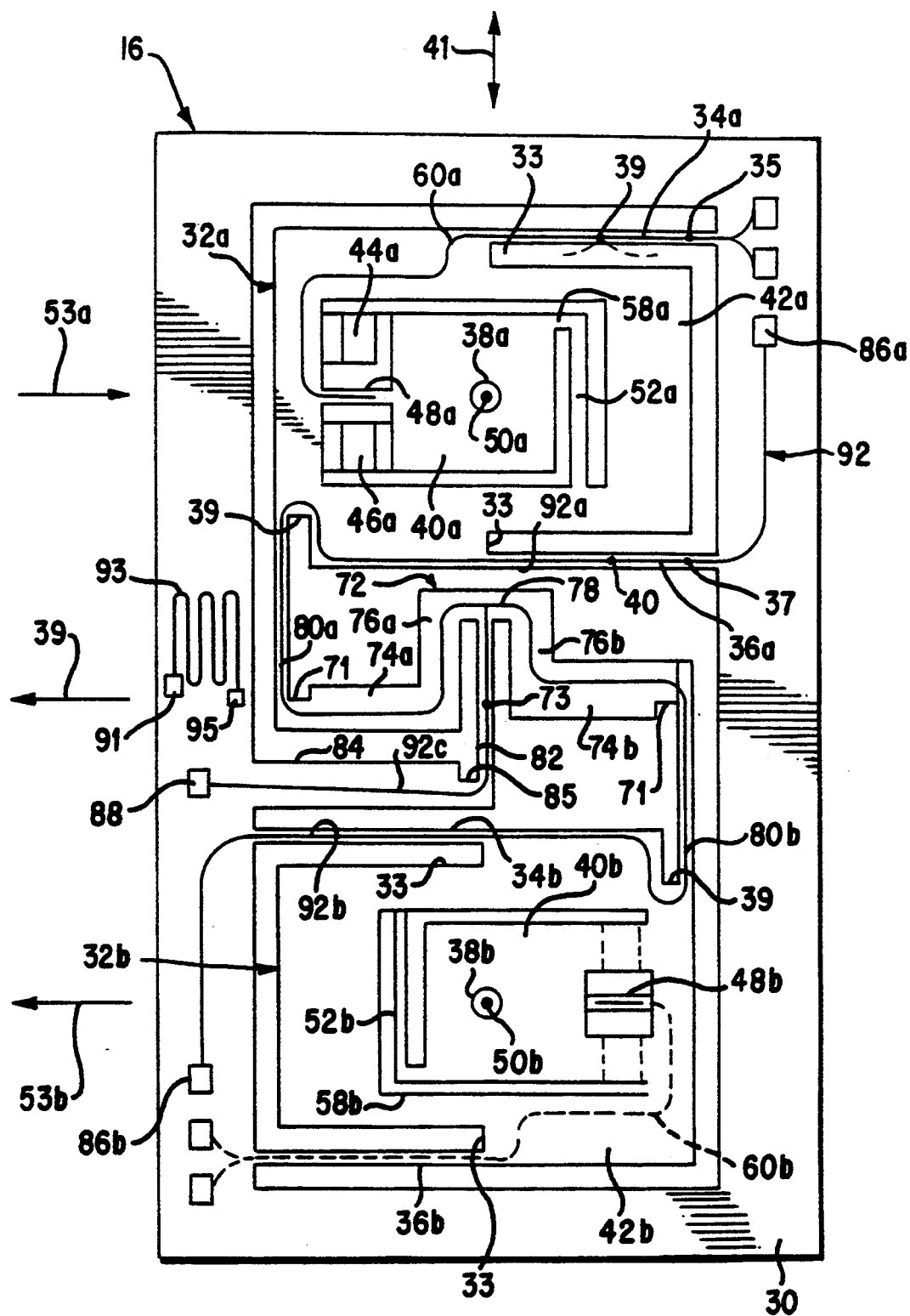
FIG. 2A is a top plan view of the unitary substrate out of which are formed a pair of accelerometers disposed in a side-by-side relationship with their input axes pointing in opposite directions, as shown in FIGS. 1B, 1C, and 1D.

Referring now to FIG. 2A, the details of the substrate 16 are shown. The first and second accelerometers 32a and b are micromachined from the unitary, silicon substrate 16 so that their input axes 38a and 38b are disposed in parallel but opposite directions. In FIG. 2A, the input axis 38a of the accelerometer 32a is disposed out of the page, whereas the input axes 38b of the accelerometer 32b is disposed into the page. Further, the input axes 38a and b are disposed perpendicular to a dither or vibration axis 41 and to a rate axis 39. As is well known in the art, the accelerometers 32a and b will respond to linear acceleration along their input axes 38a and b, respectively, and to rotation of the substrate 16 about its rate axis 39.

The substrate 16 includes a dither or mounting frame 30 from which each of the accelerometers 32a and b is suspended respectively by a pair of flexures 34 and 36, which upon application of a dithering force vibrate with an "S bend" motion to translate the accelerometers 32a and b in a predominantly linear relationship with each other. As will be further described, a periodic drive signal or current is applied via the external connectors 86a and b to a conductor or conductive path 92. The magnet 20 emanates a magnetic field substantially perpendicular to the surface of the substrate 16, whereby the accelerometers 32a and b are subjected to a periodic dithering motion along their dither axis 41.

A link 72 is connected to the unsupported end of each accelerometer 32 to insure that the dithering motion imparted to one of the accelerometers 32a will be of the exact same frequency and in phase with that applied to the other accelerometer 32b. Without a link 72 therebetween, the accelerometers 32a and b would tend to vibrate at slightly different frequencies due to slight mass mismatch. Even if driven by a drive signal of common frequency, the accelerometer motions would tend to be out of phase with each other. The link 72 is connected by a flexure 80a to the free moving end of the first accelerometer 32a opposite to the flexures 34a and 36a, which mount the accelerometer 32a to the dither frame 30. The link 72 resembles a lever pivotally mounted about a pivot point 73 provided by a pivot flexure 82. The link 72 includes first and second lever arms 74a and b extending in opposite directions from the pivot point 73. The second lever arm 74b is connected by a flexure 80b to the free moving end of the accelerometer 32b opposite to its end connected by the flexures 34b and 36b to the dither frame 30. The link 72 includes a pair of parallel members 76a and 76b interconnecting the pivot arms 74a and 74b to a brace 78 connected to the pivot flexure 82. In turn, the pivot flexure 82 is mounted along a center axis of the substrate 16 by a support member 84, which is in turn affixed to the dither frame 30.

Figure 2B:
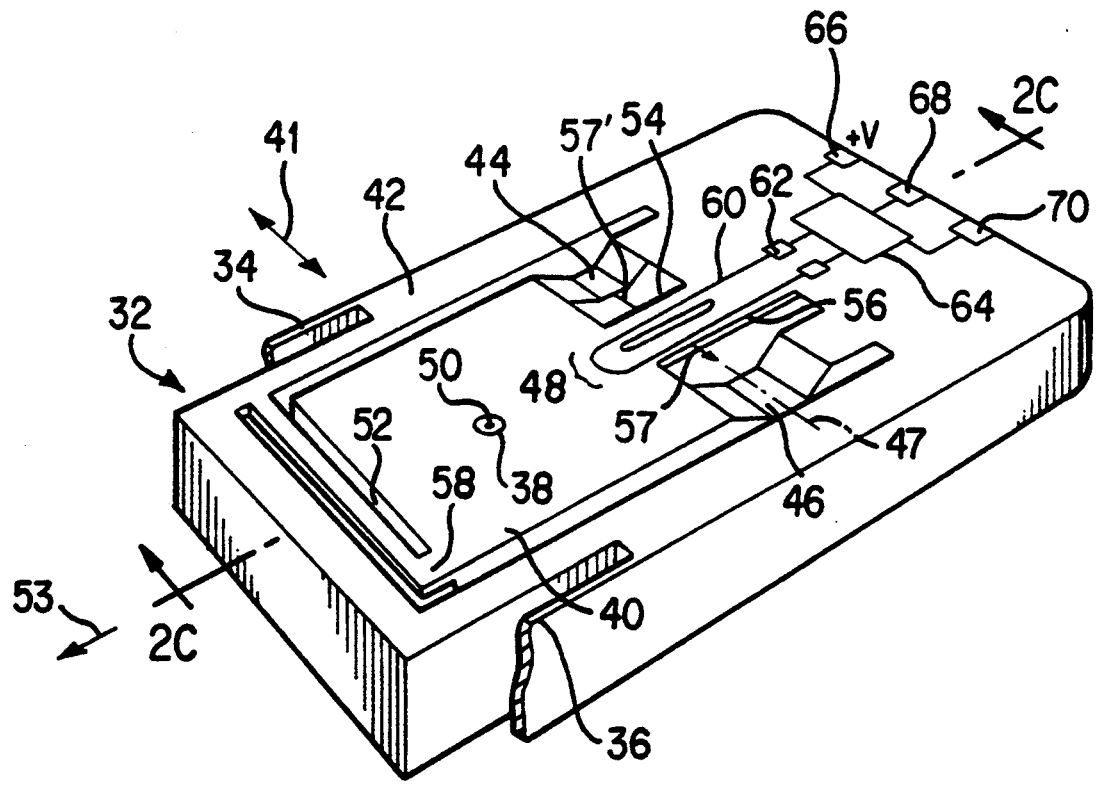
FIG. 2B is a perspective view of one of the accelerometers formed in the substrate as shown in FIG. 2A.
Figure 2C:
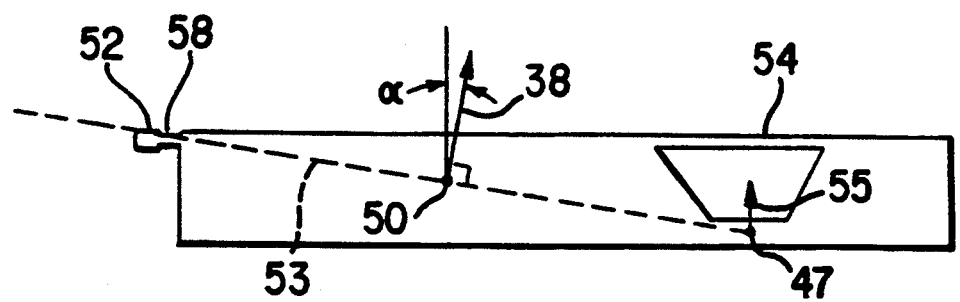
FIG. 2C is a cross-sectional view of the substrate and its accelerometer as taken along the line 2C—2C of FIG. 2B.

As more fully shown in FIG. 2B, each accelerometer 32 includes an element 48 sensing the acceleration imposed on the sensor 10 and including a pair of vibrating beams 54 and 56, which are driven to vibrate in opposite directions as indicated by the arrows 57' and 57" respectively It will be appreciated that the arrows 57' and 57" are aligned in a parallel relationship with the dither axis 41 and are disposed perpendicular to the input axes 38a and b and to the rate axis 39 (see FIG. 2A). One end of each of the vibrating beams 54 and 56 is affixed in a relatively stationary relationship to an accelerometer support frame 42. The remote ends of the vibrating beams 54 and 56 are connected to a proof mass 40, which is suspended by a pair of hinges 44 and 46 to the frame 42. As shown in FIG. 2B, the hinges 44 and 46 define a hinge axis 47 about which the proof mass 40 rotates. When accelerating forces are applied along the input axis 38 of each accelerometer 32, its proof mass 40 tends to pivot about its hinge axis 47. The opposite end of the proof mass 40 is pliantly or flexibly connected to the accelerometer support frame 42 by a strut 52 of reduced cross-section, whereby the proof mass 40 is free to move along its input axis 38. As shown in FIG. 2C, the hinges 44 and 46 are formed by micromachining the silicon substrate 16 into a relatively thin flexure with respect to the width of the support frame 42, whereby the proof mass 40 is permitted to pivot about the hinge axis 47.

As shown in FIGS. 2A, B and C, each of the accelerometers 32a and b has a corresponding strut 52a or b, which tends to dampen or attenuate extraneous movements applied to the proof masses 40a or b. A pendulous axis 53 is associated with each of accelerometers 32 and its proof mass 40. As best shown in FIG. 2C, each proof mass 40 has a center of gravity 50. The input axis 38 of each accelerometer 32 intersects the center of gravity 50 and is disposed perpendicular to the pendulous axis 53. The pendulous axis 53 passes through the center of gravity 50, the hinge axis 47 and the strut 52. In an illustrative embodiment of this invention, the input axis 38 is tilted at an acute angle of approximately 8° with respect to the unitary substrate 16 and its support frame 42. Also the dither axis 41 intersects the centers of gravities 50a and b of both accelerometers 32a and b and is perpendicular to their input axes 38a and b. Undesired moments may be produced by acceleration forces acting along the hinge axis 47 to develop moments about the pendulous axis 53 equal to the product of such forces times a moment arm or equivalent radius of rotation 55 corresponding to the vertical distance between the rate axis 47 and the center of gravity 50. In a preferred embodiment, each strut 52 is made of reduced cross sectional dimensions, e.g., 1 millinch square. A foot 58 is disposed at right angles to the strut 52 to interconnect the end of the strut 52 to the proof mass 40. If the strut 52 is of a length L, the foot 58 may be constructed having a length L/4. One end of the strut 52 is connected to an inner peripheral edge of the accelerometer support frame 42, and its foot 58 is connected to an edge of the free end of the proof mass 40 remote from its hinges 44 and 46 and its hinge axis 47. By maximizing the length of the strut 52, its spring rate is reduced to provide maximum flexibility of the strut 52. The foot 58 is so configured and dimensioned to render it relatively flexible, so that the foot 58 will "S-bend" to allow rotation of the proof mass 40 substantially only about its hinge axis 47.

The vibrating beams 54 and 56 are also machined from the substrate 16 but on a surface of the substrate 16 opposite to that of the hinges 44 and 46. Thus, as acceleration forces cause the proof mass 40 to rotate upwardly as shown in FIG. 2C, both of the vibrating beams 54 are put into compression, whereas when the proof mass 40 is pivoted downwardly as shown in FIG. 2C, the vibrating beams 54 and 56 are placed in tension. When the vibrating beams 54 and 56 are placed in tension, the frequency of their natural vibration increases, and when put into compression, that frequency decreases.

As shown in FIGS. 2A and B, a drive signal or current is applied via connector pads 62 via a conductive path or conductor 60 that extends in a first direction along the vibrating beam 54 and in a second, opposite direction along the vibrating beam 56, whereby in the presence of a magnetic field as generated by the magnet 20, the vibrating beams 54 and 56 vibrate in opposite directions. A drive circuit 64 is incorporated in the accelerometer support frame 42 to provide the current to the conductor 60. The drive circuit 64 also provides an output to the external connector path 70, indicative of the frequency at which the vibrating beams 54 and 56 are vibrating.

Figure 1B:
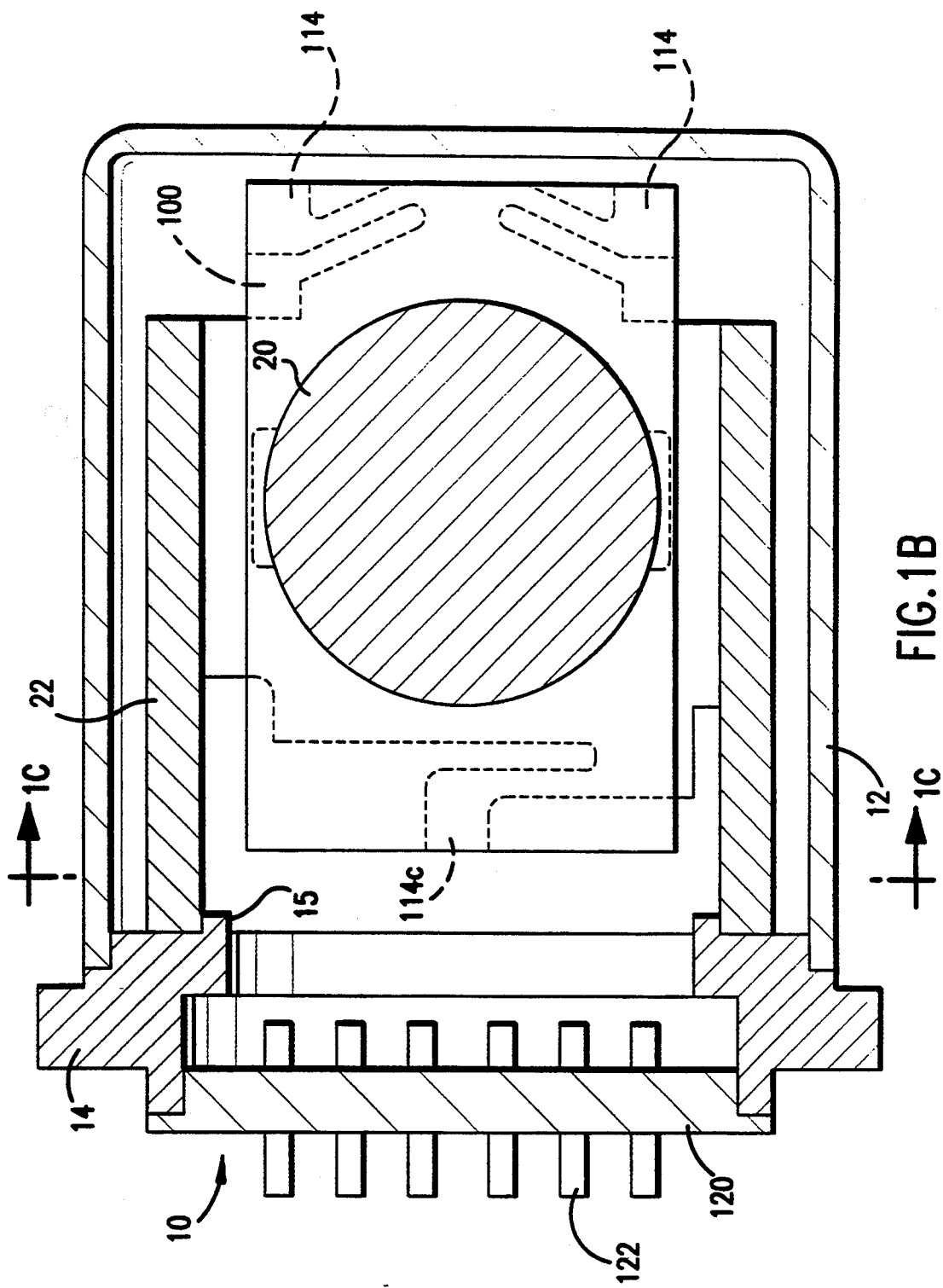
FIG. 1B is a side, cross-sectional view of the sensor of FIG. 1B.
Figure 1C:
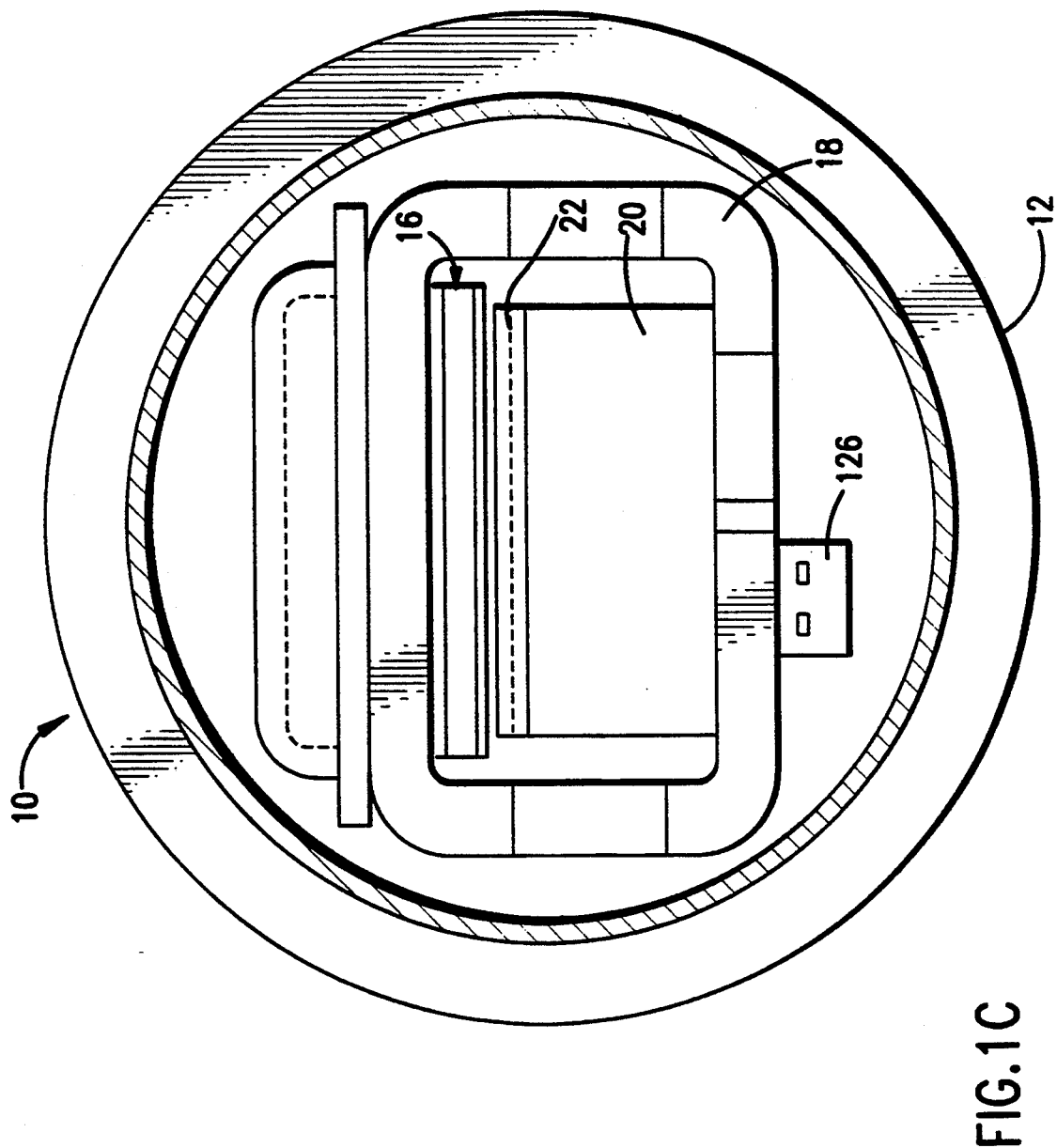
FIG. 1C is a cross-sectional, side view taken along line 1C—1C of FIG. 1B.
Figure 1D:
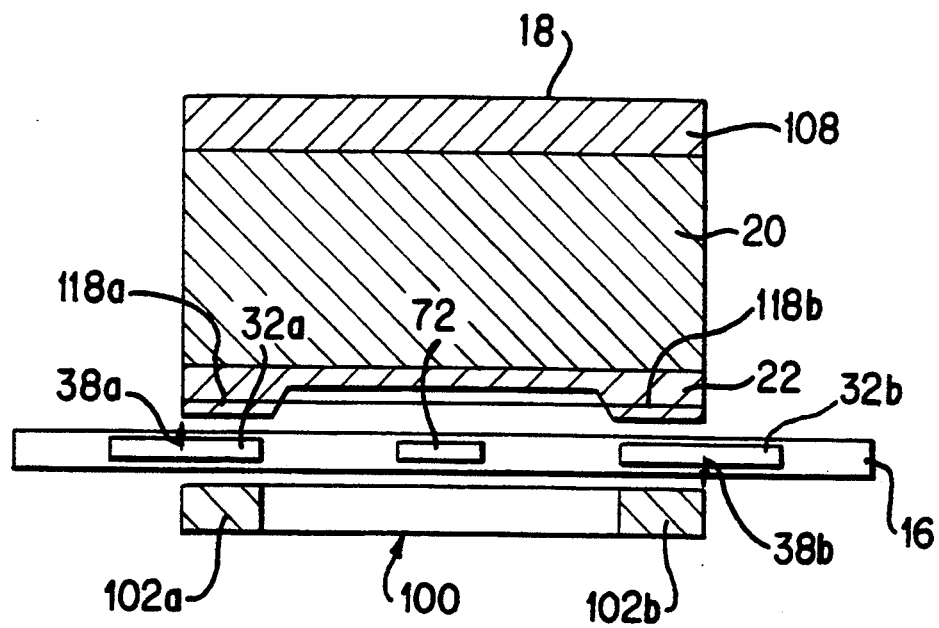
FIG. 1D is a bottom plan view of the sensor shown in FIGS. 1A and B.
Figure 1E:
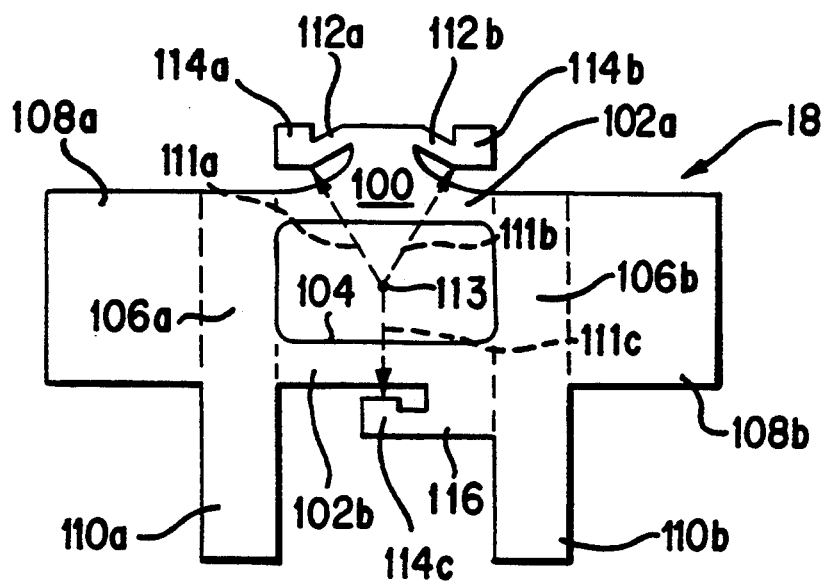
FIG. 1E is a top plan view of the flux path assembly included within the sensor as shown in FIGS. 1B, C and D.

A significant advantage of this invention resides in the placement of the first and second accelerometers 32a and b within the silicon substrate 16, whereby a single magnet 20 may be employed to direct magnetic flux through each of the accelerometers 32a and b for the dual purposes of imparting the dithering motion to the accelerometers 32a and b, and imparting a vibrating motion to the sensor elements 48 in the form of the vibrating beams 54 and 56. FIG. 1E shows the flux path assembly 18 in its flat state, before it is folded into the configuration shown in FIG. 1D. The assembly 18 supports and retains the substrate 16, a pole piece 22 and the magnet 20 in the positions as shown in FIGS. 1C and D, and includes a bottom member 100, opposing side members 106a and 106b and top members 108a and b. In turn, the assembly 18 is supported within the housing cover 12 by a pair of support legs 110a and b, which extend downward to mate with a housing ring 14 and, in particular, a projection 15, whereby the assembly 18 is securely held within the assembled housing cover 12 and base 14.

As particularly shown in FIG. 1C, the assembly 18 provides a flux path therethrough for the flux emanating from the magnet 20, and concentrated or focused by the pole piece 22 to pass primarily through the first and second accelerometers 32a and b, before the flux returns into the restricted legs 102a and b. Thereafter, the flux passes through the side members 106a and b and their respective top members 108a and b and into the magnet 20 to complete the flux path. The structure described, and in particular the pole piece 22 and the restricted legs 102a and b, concentrate the flux to pass primarily through the accelerometers 32a and b, such that when drive signals are applied to pass through the conductors 92 and 60, a dither motion is imparted to the accelerometers 32a and b, and a natural vibration motion is imparted to the vibrating beams 54a and b, and 56a and b. The pole piece 22 has a pair of projections 118a and b of approximately the same dimensions as the corresponding cross-sectional areas of the accelerometers 32a and b such that the flux passes primarily through the accelerometers 32a and b. As shown particularly in FIGS. 1A and E, the restricted legs 102 form an opening 104 therethrough in which only a nominal flux appears, it being understood that most of the flux is concentrated to pass through the legs 102a and b. It is estimated that this configuration of the flux path assembly 18 doubles the strength of the flux passing through the accelerometers 32a and b, thus increasing proportionally the voltage appearing on the pickup coils and, thus, reducing the gain of that drive circuit 127' to be explained with respect to FIG. 3C. Thus, because of the placement of accelerometers 32a and b in a side-by-side relationship within a single substantially planar substrate 16, a single magnet 20 and a simple flux path assembly 18 may be employed to provide the magnetic flux to effect efficiently both the dithering and vibrating motion of accelerometers 32a and b.

As shown in FIG. 2A, the conductive path 92 is deposited on the top surface of the substrate 16 and extends from the external connector 86a down a leg of the dither frame 30, horizontally across the flexure 36a and the bottom peripheral edge of the accelerometer 32a, down the vertical flexure 80a, across the link arms 74a and 74b, down the vertical flexure 80b, across the upper peripheral edge of accelerometer 32b and its flexure 34b, and down the opposing leg of the dither frame 30 to the external connector 86b. The conductive path 92 has a center point, which is connected by a conductive path 92c and a ground terminal 88 to ground. In order to maximize the efficiency of generating the dither motion, the conductive path 92 follows a path along the bottom portion of accelerometer 32a and its flexure 36a and the upper portion of the accelerometer 32b and its flexure 34b, which portions are closest to the center of the substrate 16, whereby the magnetic flux emanating from the magnet 20 and focussed by the pole piece 22 and its projections 118a and b, is concentrated to pass through these portions of the conductive path 92. The conductive path 92 includes a first effective portion identified by the numeral 92a mounted on the flexure 36a and the bottom of the accelerometer frame 42a of the accelerometer 32a and a second effective portion 92b similarly but oppositely mounted on the accelerometer 32b. Both effective portions 92a and b are disposed within the concentrated magnetic flux produced by the magnet 20 and its pole piece 22. By so configuring the conductive path 92 and its effective portions 92a and b, the driving force of the dither motion is maximized.

As shown in FIG. 1A, the substrate 16 is provided with a pair of dust covers 17a and b disposed respectively upon the opposing surfaces of the substrate 16. The dust covers 17a and b may also be made of silicon and serve to protect the accelerometers 32a and b from dust. Illustratively, the inner surfaces of the dust covers 17a and b are recessed (not shown in the drawings) to permit movement of the proof masses 40a and b and to provide stops for them.

As described above, the input axis 38 is oriented at an acute angle with respect to a line perpendicular to the surface of the substrate 16. In an illustrative embodiment of this invention, the assembly 18 mounts the substrate 16 at a compensating angle with respect to the axis of the housing shell 12, whereby the sensor 10 and thus, the input axes 38 of the accelerometers 32a and b may be precisely oriented with respect to the vehicle or aircraft carrying the sensor 10 of this invention.

As illustrated, the substrate 16 is mounted on a plurality of pads 114. A pair of support arms 112a and b extend from the leg 102a to support the corners of the lower surface (as seen in FIG. 1E) of the substrate 16. In turn, a support arm 116 connects the pad 114c to the leg 102b of the assembly 18, whereby the pad 114c supports a center portion of the opposite edge of the substrate 16. The numeral 113 designates the center of the opening 104 and is aligned with the pivot point 73, when the substrate 16 is mounted within the flux path assembly 18 as shown in FIG. 1A. The pivot point 73 forms the center of the silicon substrate 16 as shown in FIG. 2A. Similarly, the axis of the permanent magnet 20, shown in FIG. 1B as being of a cylindrical configuration, is also aligned with the center 113 and the pivot point 73.

The assembly 18 solves a thermal stress problem resulting from the different coefficients of thermal expansion of the silicon substrate 16 and the flux path assembly 18, i.e., the assembly 18 expands at a greater rate than the silicon substrate 16. Illustratively, the silicon substrate 16 has a temperature coefficient of expansion in the order of 2.5 PPM/°C., whereas the assembly 18 is made of a silicon steel (having a silicon content of 3%), which in turn exhibits a temperature coefficient of in the order of 11 PPM/°C., which is considerably greater than that of the substrate 16. In the absence of thermal stress relief, the substrate 16 would tend to buckle, possibly break and/or separate from the assembly 18. If the substrate 16 warps, the critical alignment of the accelerometers 32a and b and its various parts will be thrown out of balance with the result that the desired compensation of extraneous motions applied to the sensor 10 will be defeated. As shown in FIG. 1E, each of the support arms 112a and b, and 116 is disposed perpendicular respectively to each of a corresponding plurality of radial stress lines 111a, b and c. Thus, as the assembly 16 expands and tends to place a radial stress on the arms 112a, b, and 116, their configuration as shown in FIG. 1E permits them to readily flex under the thermal stress rather than buckle or break the substrate 16. In addition, each of the mounting pads 114a, b, and c is connected to the substrate 16 by a resilient adhesive such as an epoxy.

As the temperature of the permanent magnet 20, the assembly 18 and the substrate 16 vary, the mounting structure provided by the assembly 18 and the relative positions of the permanent magnet 20 and the substrate 16 therewith ensure that as the substrate 16 and it's assembly 18 expand at different rates, the relative positions of these elements with respect to the magnet 20 remain the same. Therefore, the accelerometers 32a and b remain in the same relative relationship with the permanent magnet 20 and are exposed to a magnetic flux field of the same strength. If the magnet 20, the assembly 18 and the substrate 16 were mounted such that the magnet 20 could shift even to a small degree with respect to the accelerometers 32a and b, the flux emanating through the effective portions 92a and b and the conductive paths 60 associated with vibrating beams 54 and 56 would also vary, whereby any extraneous motion imparted to the accelerometers 32a and b, as well as the outputs derived from the conductors 60 of each of the accelerometers 32a and b, would differ from each other.

The arrangement as shown in FIG. 2A of the accelerometers 32a and b, their supporting flexures 34 and 36 and the interconnection therebetween by the link 72 provide equal and opposite dither motion to the accelerometers 32a and b, and isolate the substrate 16, its dither frame 30 and the accelerometers 32a and b from extraneous stress, such that error signals are not introduced by data processing into the resultant force signals F and rotational signals Ω and permits data processing using the output of the accelerometers 32a and 32b by relatively simple differentiating and scaling techniques. Further, the structure of FIG. 2A may be implemented by micromachining techniques upon a silicon substrate 16, whereby the resultant structure is produced at a low cost and with a precision of which the prior art accelerometers were simply not capable. In turn, the extreme accuracy of construction afforded by micromachining techniques permits the relative placement of accelerometers 32a and b and its link 72 to a precision in the order of 40 micro inches. As a result of such accuracy, the accelerometers 32a and b are placed in precise balance with each other such that extraneous movements imposed upon the frame 30 do not upset this balance and introduce erroneous signals into the outputs of the accelerometers 32a and b as may be otherwise caused by even slight misalignment of the accelerometers 32a and 32b.

First, the accelerometers 32a and 32b are mounted upon opposing sides of the dither frame 30 by their flexures 34a and 36a and 34b and 36b, respectively. Each of the flexures 34 and 36 is formed from the silicon substrate 16 to a height equal to the width of the substrate 16, illustratively of 20 mils, and a thickness of 1.4 mil corresponding to the vertical dimension of the flexures 34 and 36 as shown in FIG. 2A. The length of each of the flexures 34a and b and 36a and b is selected to provide a spring rate relative to the mass of accelerometers, e.g., of 0.1 gram, that will cause the flexures 34 and 36 to flex in an "S-bend" when subjected to the dither motion. The spring rate of the flexures is proportional to $T^3/L^3$, where T is the thickness of the flexures 34 and 36 and L is the length thereof. The length L and thickness T of the flexures 34 and 36 are set such that when dither motion is applied, the flexures 34 and 36 then flex in an S configuration, as shown in FIG. 2A. Such "S-bend" flexures 34 and 36 permit the accelerometers 32a and b to translate with predominantly linear motion, i.e., the vibrating beams 48a and 48b (as well as the other elements) of accelerometers 32a and 32b remain substantially parallel to each other as they are dithered along the dither axis 41. In addition, the flexures 34 and 36 permit accelerometers 32a and 32b to move in a predominantly linear fashion with only an insignificant nonlinear motion component imposed thereon.

The link 72 mechanically interconnects the first and second accelerometers 32a and b so that any motion including dithering motion and extraneous motions applied to one of the accelerometers 32, will also be applied in precisely equal and opposite fashion to the other accelerometer 32. In this fashion, the outputs of the accelerometers 32a and b may be processed simply by sum and difference techniques to provide a force signal F and the rotational signal Ω, as well as to cancel out erroneous signals. Without the link 72, the accelerometers 32a and 32b would operate at different frequencies due to slight mass mismatch of the proof masses 40. If driven at a common frequency, the accelerometers 32a and 32b would, without the link 72, operate out of phase with each other (other than 180°).

The configuration and the manner of mounting the link 72 are effected to permit the link 72 to effectively pivot about the pivot point 73 intersecting an axis passing through the lever arms 74a and b. The pivot point 73 is disposed at a selected point along the length of the pivot flexure 82. As shown in FIG. 2A, the bottom end of the pivot flexure 82 is affixed to the support member 84 and extends vertically along the dither axis 41. The length of the pivot flexure 82 is selected, e.g., 100 mils, to impart a simple bending thereto, whereby that portion from the pivot point 73 to the point of interconnection to the link 72 is permitted to flex about the pivot point 73, while the remaining portion of the flexure 82 between the pivot point 73 and the support member 84, flexes in a smooth arc. In this fashion, the end points of the link 72 are disposed a radial distance from the pivot point 73 equal to the effective radius of rotation provided by the "S-bend" flexures 34 and 36 for the accelerometers 32a and 32b.

As indicated above, the length of the pivot flexure 82 is determined so that it flexes with only a simple arc bending. To accommodate a pivot flexure 82 of the desired length, it is necessary to configure the link 72 with a U-shaped configuration comprised of the parallel members 76a and b and the interconnecting member 78. In addition, a portion of the support member 84 is removed to provide a cut out 85, whereby the length of the pivot flexure 82 is set to provide the simple bend motion.

The vertically oriented flexures 80a and b as shown in FIG. 2A are dimensioned and, in particular, their lengths are set such that they exhibit 50% simple arc bending and 50% "S-bend" motion. Opposite ends of the vertical struts 80a and b are respectively interconnected between an edge of one of the accelerometers 32a and b and an end of one of the link member 74a and b. Portions of the link 72 and the accelerometers 32 are removed to provide cutouts 71 and 39, respectively, so that the precise length of the flexures 80a and b is determined to ensure that the flexures 80 have characteristics of 50 percent simple motion and 50 percent "S-bend" motion. Further with such characteristics, it is assured that any motion imparted by the flexures 80 to one of the accelerometers 32 is imparted as a sinusoidal function to the other without introducing a higher order harmonic into the translation motion. Without such flexures 80 and the link 70, the dither motion, as well as other extraneous motion applied to the substrate 16, could impose high order harmonic motion to the accelerometers 32a and b, whose outputs upon demodulation would bear an undesired bias signal.

As indicated above, the flexures 34 and 36 are made of such dimensions and, in particular, their length such that they flex with an "S-bend". In particular, one end of each of the flexures 34 and 36 is respectively affixed to the inner periphery of the dither frame 30 and the other end to the accelerometer 32. An external edge portion of the accelerometer support frame 42 is removed to provide a cut out 33 so that the length of the flexures 34 and 36 is critically set to provide the desired "S-bend" motion and so that the other end of the flexures 34 and 36 are connected to a midpoint of the horizontal edges of accelerometers 32a and b. As shown in FIG. 2A, the flexures 34 and 36 support accelerometers 32a and b so that their centers of gravity 50 and the pivot point 73 lie along the central axis of the substrate 16 so that the center axis coincides with the dither axis of 41.

The "S-bend" flexures 34 and 36 have respective pivot points 35 and 37, which are disposed a distance 1/6th of the flexure length from the inner periphery of the dither frame 30. The "S-bend" flexures 34 and 36 form respectively an effective radius from their pivot points 35 and 39 to their points of connection with their support frames 42. That effective radius is equal to 5/6 of the length of the flexures 34 and 36, which in turn precisely equals the radius provided by the lever arms 74 from their pivot point 73 to the points of interconnection of the upright flexures 80a and b to the extremities of the lever arms 74a and b. By providing the link 72 and the accelerometers 32a and b with equal radii of rotation about the respective pivot points 73, and 37 and 35, it is assured that the link 72 will provide equal and opposite motion to the accelerometers 32a and b. As a result, if any extraneous noise is applied to one of the accelerometers 32a and b, a like and opposite motion will be applied to the other, so that, upon processing, any noise in the outputs of the accelerometers 32 is effectively removed by sum and difference techniques.

Upon application of the dithering motion to the accelerometers 32a and b, the "S-bend" flexures 34 and 36 move up and down in a substantially parallel relationship to each other due to the "S-bend" flexing of their flexures 34 and 36. Each flexure 34 and 36 has a center point 39 and 40, respectively. The bending motion resembles two smooth curves, the first terminating at the center point in one direction and the second curve with an opposite curve meeting the first at the center point. The "S-bend" flexures ensure that the horizontal and vertical edges of the support frames 42a and b remain precisely parallel with the inner horizontal and vertical peripheral edges of the dither frame 30.

As indicated above, the "S-bend" flexures 34 and 36 provide an effective rotation of the accelerometers 32a and b about their pivot points 35 and 37. In an illustrative embodiment, the commonly applied dithering forces move accelerometers 32a and b through a positive and negative angular rotation with respect to their rest positions, whereby the center of gravities 50a and b move from the center axis of the substrate 16 a distance of only 37 microinches for a dithering motion having an amplitude of 1 mil along the dithering axis 41.

The construction of accelerometers 32a and b from the silicon substrate 16 results in extremely close alignment of the accelerometers 32. This results from the high degree of flatness of the silicon substrate 16 and the relative proximity of the accelerometers 32a and b micromachined from the substrate 16. The flexures 34, 36, 80 and 82 are produced by etching near the surfaces of the substrate 16. Such micromachining ensures that the input axes 38a and b will be precisely perpendicular to the dither axis 41 that will at least be as good as the flatness and parallel relationship of the surfaces of the silicon substrate 16, which can typically be achieved to a high degree. Thus, this invention achieves close alignment of the input and dither axes 38 and 41 and overcomes the problem of prior art Coriolis sensors with regard to such alignment. The suspension of the accelerometers 32a and b by their flexures 34a and 36a, and 34b and 36b from opposing sides of the dither frame 30 so that their input axes 38a and b point in opposite directions and the use of the link 72 provides excellent nonlinearity motion cancellation.

The well known Euler-Buckling curves represent the structural tensioning and compression characteristics of the vibrating beams 54 and 56 of the accelerometers. The back-to-back orientation ensures that when the vibrating beams 54 and 56 of the accelerometer 32a are in tension, the beams of the other accelerometer 32b are in compression, and vice versa. As will be explained, the outputs of the accelerometers 32a and 32b are summed together to provide an indication of linear acceleration. This orientation insures that the beams 54 and 56 are operating in complementary portions of these curves and the summed outputs of the accelerometers 32a and b provide an accurate indication of the linear acceleration by canceling the higher order nonlinearities of the vibrating beams 54 and 56. In addition, extraneous movements acting on the accelerometers 32a and b will, at least to a first order of measure, tends to cancel or dampen each other, whereby extraneous signals do not appear in the summed accelerometer outputs. In an analogous fashion, when the difference of the accelerometer outputs is taken, the canceling characteristics of these curves ensure that second order nonlinearities in the resultant angular rotation signal will also average.

The construction of the two accelerometers 32a and b from the silicon substrate 16 offers other advantages. First, the configuration and the dimensions of the accelerometers 32, the various flexures and the link 72 may be determined with an extreme degree of accuracy, e.g., 40 microinches, so that the relative position of these elements is controlled to a like degree. Second, the construction of the flexures in the plane of the silicon substrate 16 ensures that the accelerometers 32 are dithered in that plane. As noted above, the link 72 ensures that the accelerometers 32a and b move in equal and opposite directions under the influence of the applied dithering motion. Thus, the centers 50a and b of gravity of the accelerometers 32a and b are placed precisely upon the center axis of the substrate 16, which is aligned with the dither axis 41 with a high degree of precision, whereby the dither motion caused by the current passing through the drive coils a and b causes the dithering motion to be applied precisely along the center axis of the substrate 16. Such accuracy ensures that extraneous motions otherwise resulting from the dither motion are not imposed upon the accelerometers 32a and b.

Secondly, the suspension of accelerometers 32a and b by the "S-bend" flexures 34 and 36, which are also formed in the plane of the silicon substrate 16, produces a motion of the accelerometers 32a and b of relatively small, opposing arcs as a result of this dithering motion. In one illustrative embodiment, dithering at maximum displacement (amplitude) of 1 millinch (corresponding to 1 degree of the total peak to peak angular travel), displaces the accelerometers 32a and b from their center axis by a mere 37 microinches. During a single cycle of motion of each of the accelerometers 32a and b up and down along the dither axis 41, each accelerometer 32 is subjected to 2 translations as it rotates about its effective radius provided by its flexures 34 and 36. However, since these double translations or "bobbings" occur within the plane of the silicon substrate 16 and not along the input axes 38a and b, the problems that have occurred with the prior art sensors of parallelogram configuration are avoided. First, a corresponding double frequency error signal is not imposed upon the inputs of the accelerometers 32, which required a phase servo adjustment in the processing as described in U.S. Pat. No. 4,799,385. Second, there is no need to offset the center of oscillation or to couple turn-around acceleration into the accelerometer input axis. As a result, for any position of the accelerometers 32a and b during their dithering motion, there is very little double frequency motion imposed upon their input axis 50. Thus, there is no need to "steer" out the misalignment by adding a bias to the dither drive signal.

The various components of the silicon substrate 16 may be micromachined by various techniques well known in the prior art such as a wet chemical etch, a dry chemical etch, plasma etching, sputter etching or reactive ion etching. For a detailed discussion of such techniques, reference is made to the following publications, which are incorporated herein by reference: *VLSI Fabrication Principles* by Sorab K. Ghandhi and *Silicon Processing for the VLSI Era*, Vol. 1—*Process Technology* by S. Wolf & R. J. Tauber.

In this illustrative embodiment of the silicon substrate 16, the maximum misalignment of the accelerometers 32 from the substrate center axis would be less than 0.1 mrad. This has the benefit of not fully imposing second harmonic distortion resulting from the dither drive into the rotational component signal output by the accelerometers 32a and b. Otherwise, as is disclosed by the prior art parallelogram drive arrangements, such second harmonic drive distortion could be multiplied by the squaring action of double dipping to generate primary and third harmonics, which can be coupled into the rate channels as error. These errors are avoided by the side-by-side placement and accurate micromachining of the accelerometers 32a and b within the substrate 16.

As noted above, each of the accelerometers 32a and b is suspended by "S-bend" flexures 34 and 36 which provide effective radii of rotation equal to that radius provided by the link arms 74a and b. Without such construction, the accelerometers 32a and b would dither with a non-sinusoidal motion, which would introduce high order harmonic distortion in the rate signal. It is contemplated that there will be some coupling due to the offset of the input axis 50 resulting from the centers 50 of gravity being disposed above the flexures; however, such coupling is minor compared to that introduced by the parallelogram structures of the prior art.

Figure 3A:
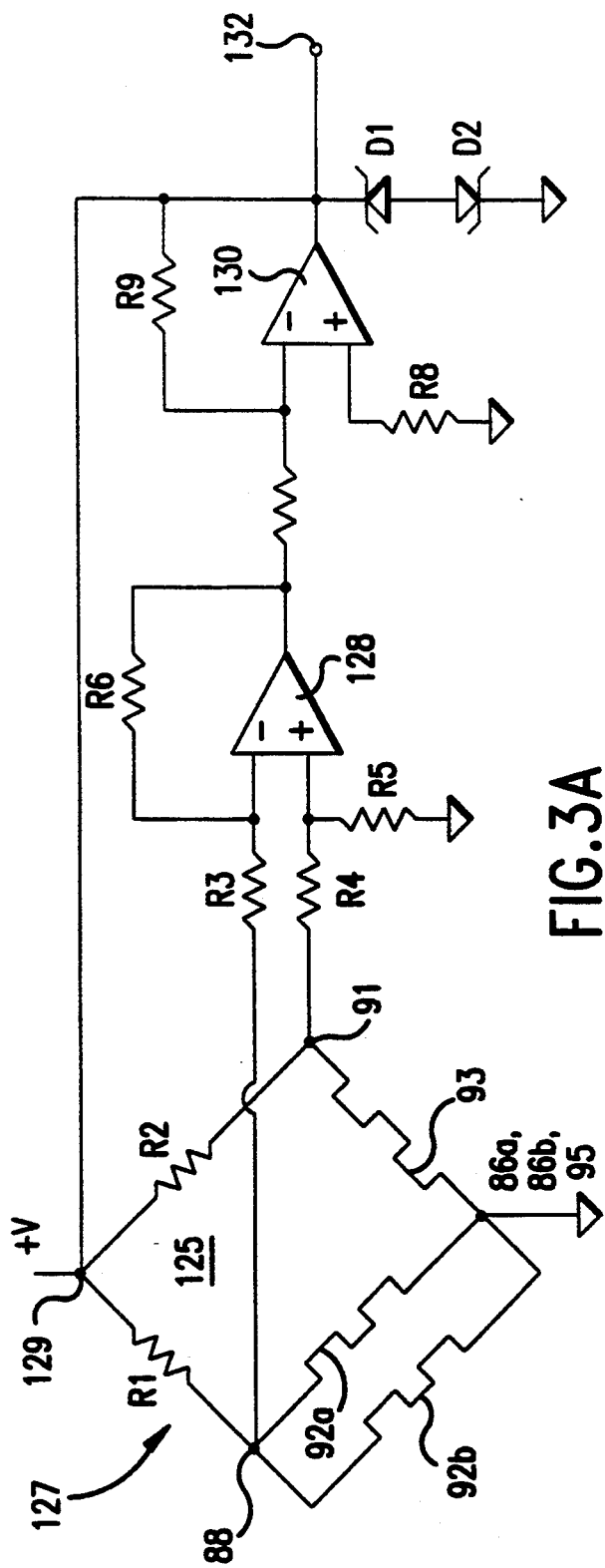
FIG. 3A is a circuit diagram of a first embodiment of an oscillator circuit for providing drive signals to the drive coils of the accelerometers shown in FIG. 2A.

Referring now to FIG. 3A, there is shown a dither drive circuit 127 for providing a sinusoidal voltage to be applied across the effective portions 92a and b. The conductive path 92 forms the first effective portion 92a for imparting a vibrating motion to the accelerometer 34a and the second effective portion 92b for imparting a vibrating motion to the accelerometer 32b. The center point of the conductor 92 is connected to ground via the conductor 92c and a ground terminal 88. As shown in FIGS. 1A and 1D, a magnetic field is generated perpendicular to the surfaces of the substrate 16 and is focused by the pole piece 22 through the accelerometers 34a and 34b. Illustratively, the conductor 92 takes the form of a deposit of gold. In an illustrative embodiment of this invention wherein the length of the conductor 92 extending between terminals 86a and 88 (or 86b and 88) is approximately 1 inch and is deposited to a depth of 1$\mu$ meter and a width of 10$\mu$ meter, the resistance offered by such a length of the conductor 92 is in the order of 100 ohms. When the magnetic flux crosses the conductive path 92, a voltage is induced thereacross of approximately 0.5 volt, which is approximately 2500 times the voltage amplitude of the velocity signal which is output by the dither drive circuit 127 of FIG. 3A on its output 86–91. To effectively remove this resistance voltage, a bridge 125 shown in FIG. 3A is employed with one leg thereof being formed by the effective portions 92a and b connected in parallel, and a second leg by a reference conductor 93 which is disposed on the dither frame 30 and has ends connected to terminals 91 and 95, as shown in FIG. 2A. The effective portions 92a and b are connected in parallel by connecting the terminals 86a and b together; in turn, the terminal 88 forms one node of the bridge 125 and the connected terminals 86a and b another node. The conductive path 92 forms the two effective portions 92a and b connected, with the interconnecting portion of conductor 92 being connected via the conductive path 92c to the ground terminal 88. The effective portions 92a and 92b are connected in parallel to form one leg of the bridge 125. The other leg of the bridge 125 is formed of the reference conductor 93 having one-half the length of the conductor 92 between the terminals 86a and 88 (or 86b and 88), e.g., one-half inch. The reference conductor 93 is made of the same material as that of conductor 92, e.g., gold, and is deposited to a like depth, whereby a like voltage, e.g., 0.5 v, is developed across both of the parallel connected effective portions 92a and b, and the reference conductor 93. A single drive voltage is applied from a first bridge node 129 to ground, whereas an output of the bridge 125 as developed across bridge nodes 86 and 91 is taken and applied to a first operational amplifier 128, which subtracts the voltage developed across the reference conductor 93 from that developed across the parallel connected effective portions 92a and b. A second operational amplifier 130 provides the remaining gain to boost the output of the first operational amplifier 128 to approximately 2.5 v peak at the output 132. A feedback path is connected to the bridge circuit 125 providing position feedback plus an excess phase shift due to the high-order operational amplifier poles, whereby an oscillating circuit is established to provide the sinusoidal signal to drive the effective portions 92a and b. The output 132 is clamped by a pair of Zener diodes D1 and D2 connected in opposition between the output 132 and ground, to clamp the output 132 and thereby stabilize the drive signal applied to the effective portions 92a and b.

Figure 3B:
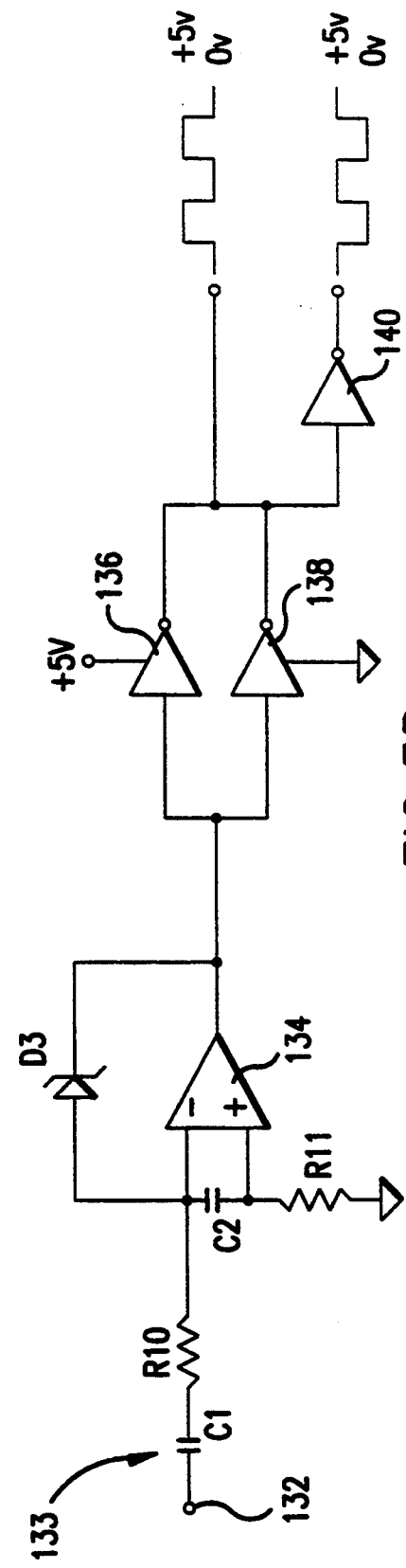
FIG. 3B is a circuit diagram responsive to the velocity output signal of the circuit shown in FIG. 3A for gating the output signals from the accelerometer into counters.

As shown in FIG. 3B, the velocity signal appearing on the output 132 of the dither drive circuit 127 is applied to a zero-crossing detector circuit 133 whose outputs are used to gate the counters for counting the crystal clock signal to demodulate the Coriolis rate signal and acceleration force signal. The velocity signal is coupled to an operation amplifier 134 by a capacitor C1 and resistor R10 to generate a zero-crossing signal. The open loop gain of the operational amplifier 134 "squares" the velocity signal and applies the "squared" signal to a pair of CMOS logic gates 136 and 138 connected in parallel with each other; these gates effect a voltage shift of the signal to levels compatible with the counters, e.g., 0 to + or −5 v. Another inverting logic gate 140 inverts the signal. The signals illustrated in FIG. 3B are applied to the counters 152 and 154, as shown in FIG. 3D, to count a signal indicative of the resonant, natural frequency for each half cycle of the dithering frequency f, whereby the Coriolis rate component is demodulated by inverting every other sample. As described in detail in U.S. Pat. No. 4,590,801, the acceleration is the sum of each such sample.

Figure 3C:
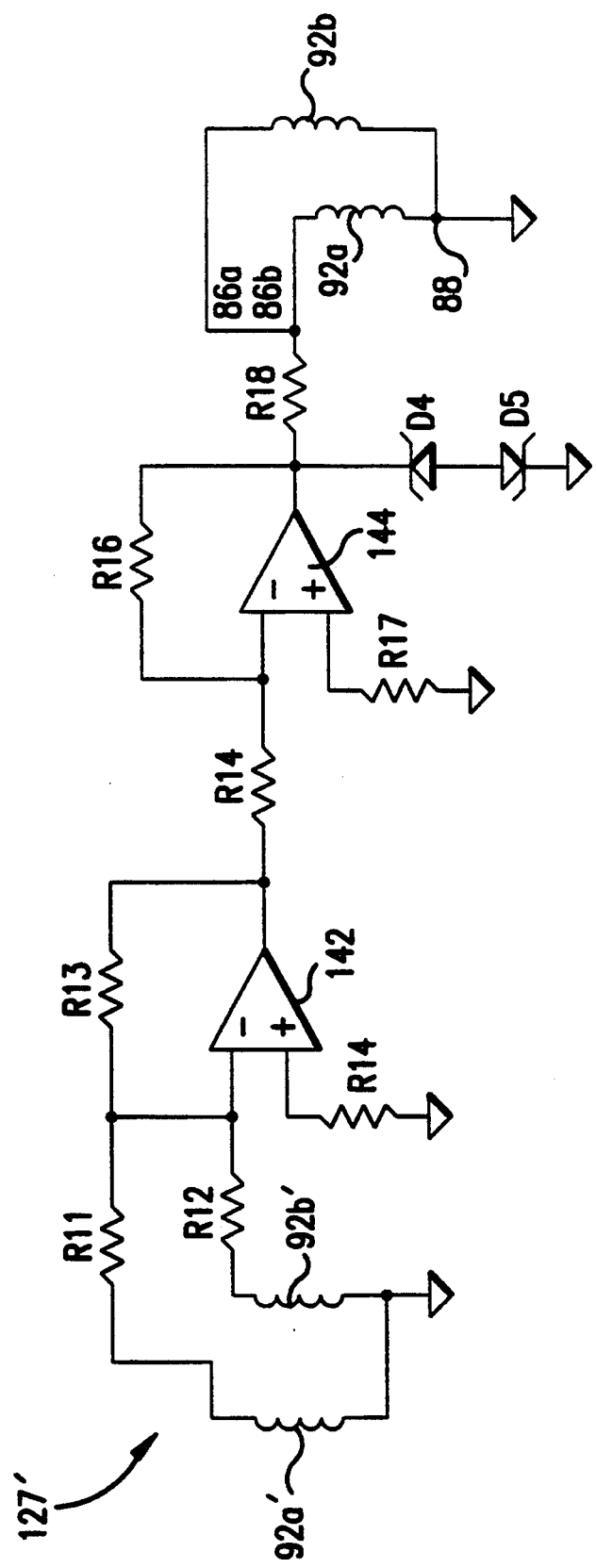
FIG. 3C is a circuit diagram of a second embodiment of an oscillator circuit for sensing signals derived from the pick-off coils disposed on the accelerometers shown in FIG. 2A for providing drive signals to the coils of these accelerometers to effect the dither motion thereof.
Figure 3D:
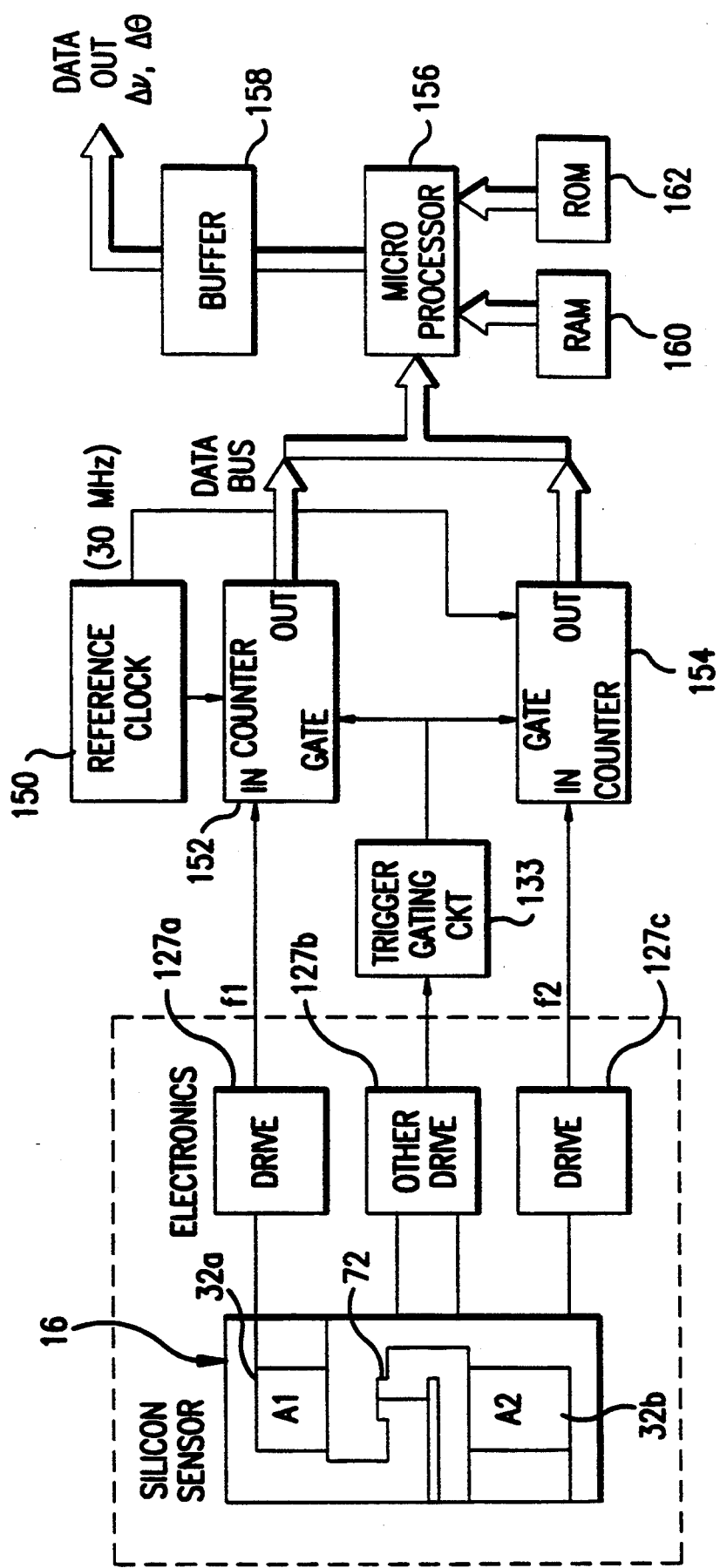
FIG. 3D is a functional block diagram illustrating the processing of the output signals from the first and second accelerometers formed within the silicon substrate, of FIG. 2A and, in particular, illustrates how a pair of counters are gated to effectively demodulate the accelerometer output signals to provide an indication of the specific force and angular rotation rate of the moving body.

Referring now to FIG. 3C, there is shown an alternative embodiment of the dither drive circuit 127' which provides a dither drive signal across the external connectors 86a and 86b to the effective portions 92a and b. As described above, a magnetic field is generated and directed by the magnet 20 and its flux path assembly 18 perpendicular to the surfaces of the substrate 16 and the effective portions 92a and b disposed thereon, whereby a force is generated by the current flowing through the effective portions 92a and b to move the accelerometers 32a and b in a substantially rectilinear, vibrating movement up and down along the dither axes 41 as shown in FIG. 2A. The accelerometers 32a and b vibrate or dither at the frequency f determined by the mechanical characteristic including the spring rates of the flexures 34, 36, 80 and 82, and the mass of the accelerometers 32a and b. The dither drive signal output from the dither drive circuit 127' is of a frequency corresponding to the frequency f of dither vibration and, as explained above, is used in the further processing of the accelerometer outputs to demodulate those signals to provide a force signal F and a rotational signal Ω. Further, a wire (not shown) is disposed on the opposite side of the substrate 16 (from that shown in FIG. 2A) and forms first and second pick-off portions 92a' and 92b'. The interconnection of the pick-off portions 92a' and 92b' to ground is more clearly shown in FIG. 3C. As accelerometers 32a and b are vibrated, the pick-off portions 92a' and b' move through the magnetic field created by the unitary magnet 20 and its assembly 18 and a current is induced therein. The resultant voltage is applied via resistors R11 and R12 to a pair of operational amplifiers 142 and 144 to be successively amplified with a relatively high gain before being applied as the dither drive signal to the effective portions 92a and b. Zener diodes D4 and D5 serve to clamp the dither drive voltage output of the operational amplifier 144 to a known voltage level.

The configuration of the accelerometers 32a and b within their silicon substrate 16 and the flux path assembly 16 and its unitary magnet 20 develop a considerable force in excess of that minimum turn-around acceleration required to effect the dither motions of accelerometers 32a and b. It is understood in the art that a minimum turn-around acceleration is needed to cause each of the accelerometers 32a and b to stop going in one direction and to accelerate in the opposite, whereby the dithering motion may occur. The acceleration force F tending to cause the dithering motion of accelerometers 32a and b is set out by the following equation:

$$F = mg = l \cdot i \times B, \quad (1)$$

where i is the current passing through the conductive path 92 making up the effective portions 92a and b, l is the effective length of that portion of the conductive path 92 within the magnetic flux passing through the accelerometers 32a and b, i.e., the length of the effective positions 92a and b, and B is the magnitude of the flux. In an illustrative embodiment of this invention, a current of 5 milliamp may be applied to each of the effective portions 92a and b, the effective portions 92a and b may have an effective length l of 6 mm and 8 kilogauss may be readily provided by the magnet 20 and its assembly 18. Solving equation (1) for mass m, where g is the universal gravity constant, it is shown that a force of 2.4 milligrams may be readily developed by this illustrative embodiment. In such an embodiment, the resonant frequency of the dithering motion imposed upon the accelerometers 32a and b is approximately 500 hz and a displacement D of accelerometers of 1 milliinch. The drive acceleration a may be calculated by the following:

$$a = \frac{D(2\pi f)^2}{K}, \quad (2)$$

where D is the displacement, f is the dither frequency and K is a conversion factor. The calculated force for 1 millinch of displacement D at 500 Hz is 25 g's peak acceleration. Where the mechanical gain of the spring mass system formed by the Q of the accelerometers is set at a modest value of 1,000, the force developed by the interaction of a current passing through the conductive path 92 and the magnetic flux directed through the accelerometers 32, is 0.025 g's (25 g's/1,000). This force is sufficient to accelerate the calculated mass force of 0.024 grams. It is noted that the Q of pure crystals may be as high as 10,000, demonstrating that the dithering system described above is more than capable of developing sufficient force to effect the required dithering drive motion.

The following calculations demonstrate that the values of $\epsilon$, the voltage induced in the pick-off portions 92a' and 92b', is relatively high compared to the noise found in those operational amplifiers as would be incorporated into the drive circuit 127', as shown in FIG. 3C. Values of $\epsilon$ are provided by the following equation:

$$\epsilon = v \times B \cdot l \qquad (3)$$

where v is the amplitude of the velocity output signal of the accelerometers 32, B is the strength of the magnetic field crossing the effective portions 92a and b, l is the effective length of the conductor within the magnetic flux field. For a dither displacement D of 1 milliinch, a natural frequency of accelerometer of 500 Hz, a velocity signal v of approximately 8 cm/sec., a length l of the effective portions 92a and b of 6 mm, and a flux strength of 8 kilogauss, the output of a single pickoff portion 92a' is 0.4 mv. If the outputs of accelerometers 32a and b are connected in series, the output voltage is doubled to 0.8 mv. An operational amplifier, as may be incorporated into the drive circuits of FIGS. 3A and C, typically has a noise of 0.1 $\mu v$ for a bandwidth of 10K Hz. If the operational amplifier has a gain of $3 \times 10^3$, its output may typically be 2.4 v peak providing a noise to peak signal ratio of 0.01%, which is a good indicator that the sensor 10 of this invention is a good velocity sensor for the inherent of noise level found in the available operational amplifiers.

The accuracy with which the rate and acceleration sensor 10 may be made, the symmetry of the accelerometers 32a and b and their suspension by the flexures 34 and 36, and the interconnection of the link 72 to impose equal and opposite motions on the accelerometers 32a and b, have a accumulative effect to greatly simplify the processing of the accelerometer output signals, essentially reducing it to a cosine demodulation step. This can be done every half cycle, since neither sine nor double frequency sine demodulation is needed as was the case with the parallelogram structures of the prior art. Basically, the outputs of accelerometers 32a and b are subtracted from each other to provide the linear acceleration signal and to average both signals while inverting every other sample to demodulate for the cosines to produce a rate of rotation signal $\omega$. Neither an alignment servo nor a phase servo is needed for such processing thus increasing the band width of the rotational acceleration signal $\Omega$ to be 1K Hz in one illustrative embodiment of this invention.

The rate and acceleration sensor 10 has a sensitivity to rotational acceleration imposed about its rate axis 39, i.e. the moment of each of accelerometers 32a and b about the rate axis 39, which acceleration sensitivity will introduce an undesired noise component in the subsequent demodulation processing of the accelerometer output signals. That noise component can be effectively eliminated by differentiating the rotation rate signal $\omega$ and scaling it. In effect, as indicated above, the demodulated outputs of accelerometers 32 are a measure of its rotation rate signal $\omega$, which can be differentiated to obtain an indication of the angular acceleration of each accelerometer 32. Since the dimensions and, in particular, the distance between the rate axis 39 and each of the centers 50a and b of gravity is known to a high degree of precision, e.g., 40 microinches, that equivalent radius of rotation is multiplied by a measured angular acceleration force to obtain an accurate indication thereof of the linear acceleration caused by the angular acceleration. The calculated acceleration moment is subtracted from the accelerometer outputs to reduce or substantially eliminate such acceleration sensitivity.

Referring now to FIG. 3D, there is shown how the output signals f1 and f2 as derived from the respective drive circuits 127a and c are processed and, in particular, are applied respectively to counters 152 and 154. As explained above, as the vibrating beams 54 and 56 are placed in tension or in compression due to accelerations being applied along the force sensing axes 38 of the respective accelerometers 32, the frequencies of the output signals f1 and f2 change. The dither drive circuit 127b may preferably take the form of that circuit shown in FIG. 3C or alternatively FIG. 3A. The drive circuits or signal generators 127a and c may illustratively take the form of that circuit shown in FIG. 3A.

The dither drive circuit 127b provides an output signal, which is applied to the gating circuit 133 as discussed above with regard to FIG. 3B. The output of the gating circuit 133 is a pair of squared gating signals which are applied to the counters 152 and 154. This pair of gating signals occur at the velocity zero-crossings to gate the counters 152 and 154. This is approximately a reading at 1 k Hz or both edges of the velocity zero-crossings. The counters 152 and 154 count the frequencies of the accelerometer output signals f1 and f2 with respect to a reference clock signal generated and applied by a reference clock 150 to each of the counters 152 and 154. In turn, a microprocessor reads the output of the counters 152 and 154 at an illustrative frequency of 1 k Hz and process these counts to provide an indication of $\omega v$ and $\omega$.

As explained in detail in commonly assigned U.S. Pat. No. 4,786,861, $\Delta v$ is provided by the following equation:

$$\Delta v_i = A\,[(N1_i - N2_i) + FT + B(N1_i + N2_i)] \qquad (4)$$

where $v_i$ is the "ith" sample of the velocity signal, A and F are scale factors, $N1_i$ is the count derived from the counter 152 over a 1 k Hz (1 m sec) period for the "ith" sample, $N2_i$ is the count obtained from the counter 154 for the "ith" sample, T is the time period and B is the bias correction term. As well known in the art, $\Delta\Theta_i$ is provided by the following equation:

$$\Delta\Theta_i = a(\cos N1_i + \cos N2_i) + b(\cos N1_i - \cos N2_i) \qquad (5)$$

where a is a scale factor and b is a bias/correction term, and $$\cos(N1_i) = N1_i - N1_{(i-1)}, \qquad (6)$$

over each 500 Hz period or $$\cos(N1_i) = (-1)^i N1_i, \qquad (7)$$

at 1 KHz rate.

Angular acceleration $\alpha$ is equal to the linear acceleration as derived from the output of either of the accelerometers 32a or b, divided by the equivalent radius of rotation, $r_{eq}$ in accordance with the following equation:

$$\alpha = \frac{A_{linear}}{r_{eq}}$$

In turn, angular acceleration $\alpha$ is a function of the measured rotation rate $\omega$ in accordance with the following equation:

$$\alpha = \frac{d\omega}{dt}$$

In turn, the rotation rate may be expressed as follows:

$$\omega = \frac{\Delta\theta}{\Delta t}$$

Since the derivative of the rotation rate $\omega$ is equal to acceleration $\alpha$, acceleration may be expressed by the following equation:

$$\alpha = \frac{\omega_i - \omega_{(i-1)}}{\Delta t} = \frac{\frac{\Delta\theta_i}{\Delta t} - \frac{\Delta\theta_{(i-1)}}{\Delta t}}{\Delta t}$$

Thus, correction for linear acceleration $A_{linear}$ is provided by the following equation:

$$A_{linear\ correction} = \alpha\ r_{eq.} = r_{eq.} \frac{\frac{\Delta\theta_i}{\Delta t} - \frac{\Delta\theta_{(i-1)}}{\Delta t}}{\Delta t}$$

In turn, the microprocessor 156 is programmed in a conventional fashion to subtract values of $A_{linear\ correction}$ from the accelerometer outputs f1 and f2 to correct for angular acceleration.

An alternative dither drive is also feasible. For example, finger-like extensions may be attached to the support frame and have metallization dispose thereon. Such extensions would engage corresponding acceptance channels in the dither frame. Further details of such a drive arrangement may be found in Tang et al., "Laterally Driven Polysilicon Resonant Microstructures" IEEE Catalog No. 89TH0249-3 (February, 1989), which is hereby incorporated by reference.

In some situations, the substrate 16 may experience torsional modes of movement which are within the range of the natural frequency of the accelerometers 32a and 32b. Such torsional modes may cause the accelerometers 32a and 32b and their associated components attaching them to the dither frame 30 and to one another to move from the plane of the unitary substrate 16 thus imparting a motion component along the force sensing axes 38. The link 72 may not entirely compensate for such torsional movement. Consequently, the motion components along the sensing axes may not necessarily be equal and may introduce errors into the acceleration and angular rate calculations.

Figure 4:
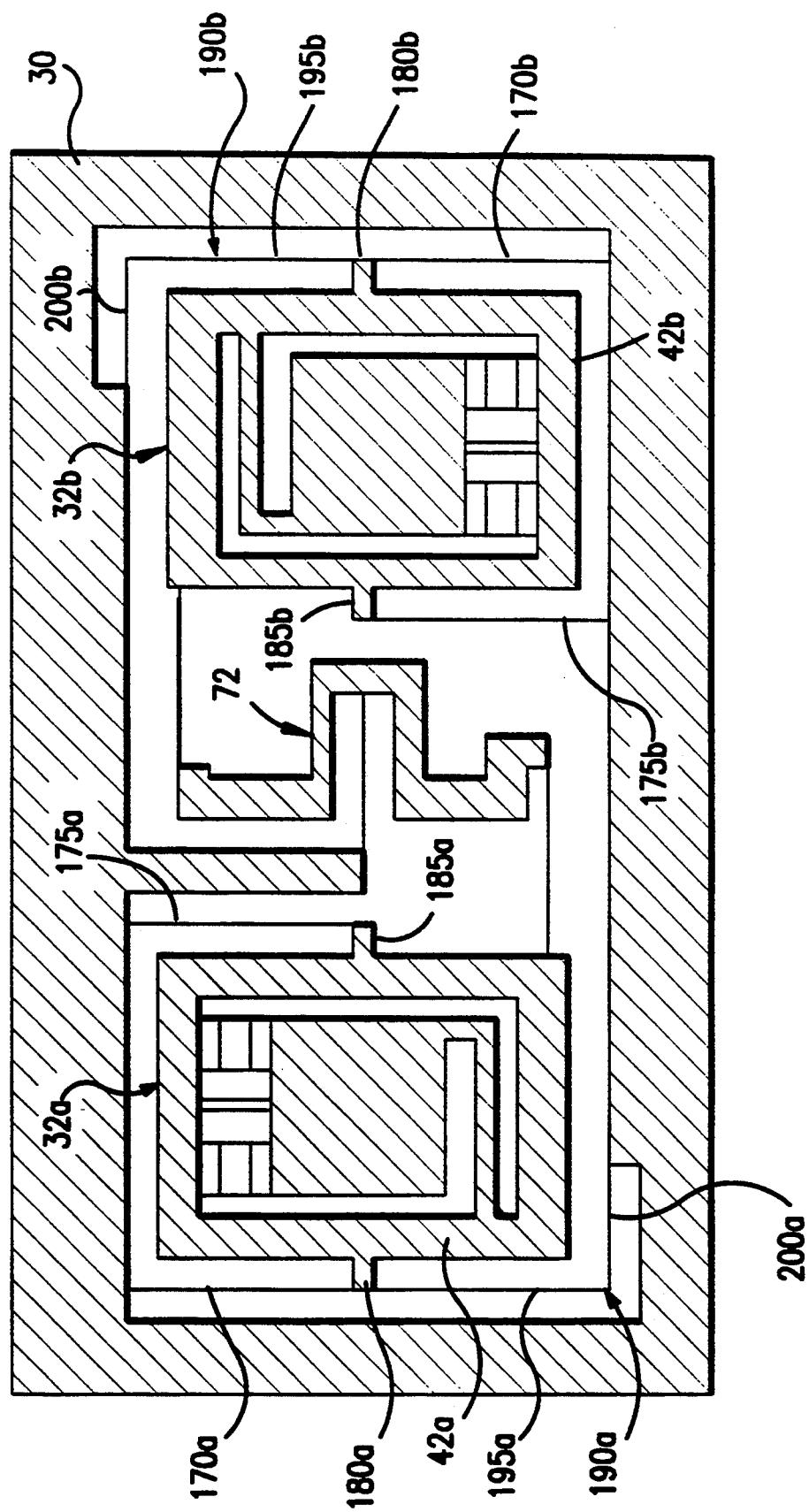
FIG. 4 is an alternative embodiment of the substrate shown in FIG. 2A wherein the sensor substrate is provided with a stiffening support which places the torsional modes of motion of the accelerometers at a frequency above the natural frequency of the accelerometers.

FIG. 4 shows an embodiment of the substrate 16 which has its torsional modes at a frequency that is significantly above the natural frequency of the accelerometers 32a and 32b. In the embodiment shown in FIG. 4, the flexures 170 and 175 are formed by removing edge portions of the accelerometer support frame 42 to provide a cut out so that the lengths of the flexures 170 and 175 are critically set to provide the desired "S-bend" motion. Unlike the embodiment shown in FIG. 2A, however, the flexures 170 and 175 hold the respective accelerometers in a configuration which is inverted from that shown in FIG. 2A. Additionally, further edge portions on each side of the accelerometers are removed to create extension tabs 180, 185. Each accelerometer further includes a stiffening flexure 190 that extends from the exterior tab 180. The stiffening flexures 190 each include a first flexure portion 195 that extends from the tab 180 in the opposite direction of flexure 170 and a second flexure portion 200 that connects flexure portion 195 to the dither frame 30 and that runs substantially perpendicular to the flexure portion 195.

The additional removal of material from the support frame 42 and the dither frame 30 to create the stiffening flexures 190 alters the center of gravity and center of percussion of each accelerometer. Consequently, additional measures must be taken to ensure that the substrate remains mass balanced so that the positions of the sensing axes and pivot point remain in the desired alignment. Whereas the portion of the support frame 42 that is proximate the strut 52 is wide in the embodiment shown in FIG. 2A, the corresponding portion of the support frame 42 is narrowed in the embodiment shown in FIG. 4a. This narrowing is the result of removing material from the wide portion of the support frame 42 to compensate for the material removed to create the stiffening flexure 190 and thus mass balances the accelerometers. Similarly, the components that make up the link 72 may be mass balanced and altered to maintain the desired alignment. In the preferred embodiment, the components are arranged such that the pivot point is at the center of gravity of the substrate and the pivot point and center of percussion of each accelerometer all lie along a single axis that is parallel to the dither drive.

As previously noted, the suspension of the accelerometers 32a and b by the "S-bend" flexures 34 and 36 of FIG. 2A produces a motion of the accelerometers 32a and b of relatively small, opposing arcs as a result of the dithering motion. Although this arcuate motion often tends to be negligible in many applications, it may create an error signal in applications where the sensing axes are canted with respect to the plane of the substrate 16. Thus, such applications may require a more linear dither motion of the accelerometers.

Figure 5:
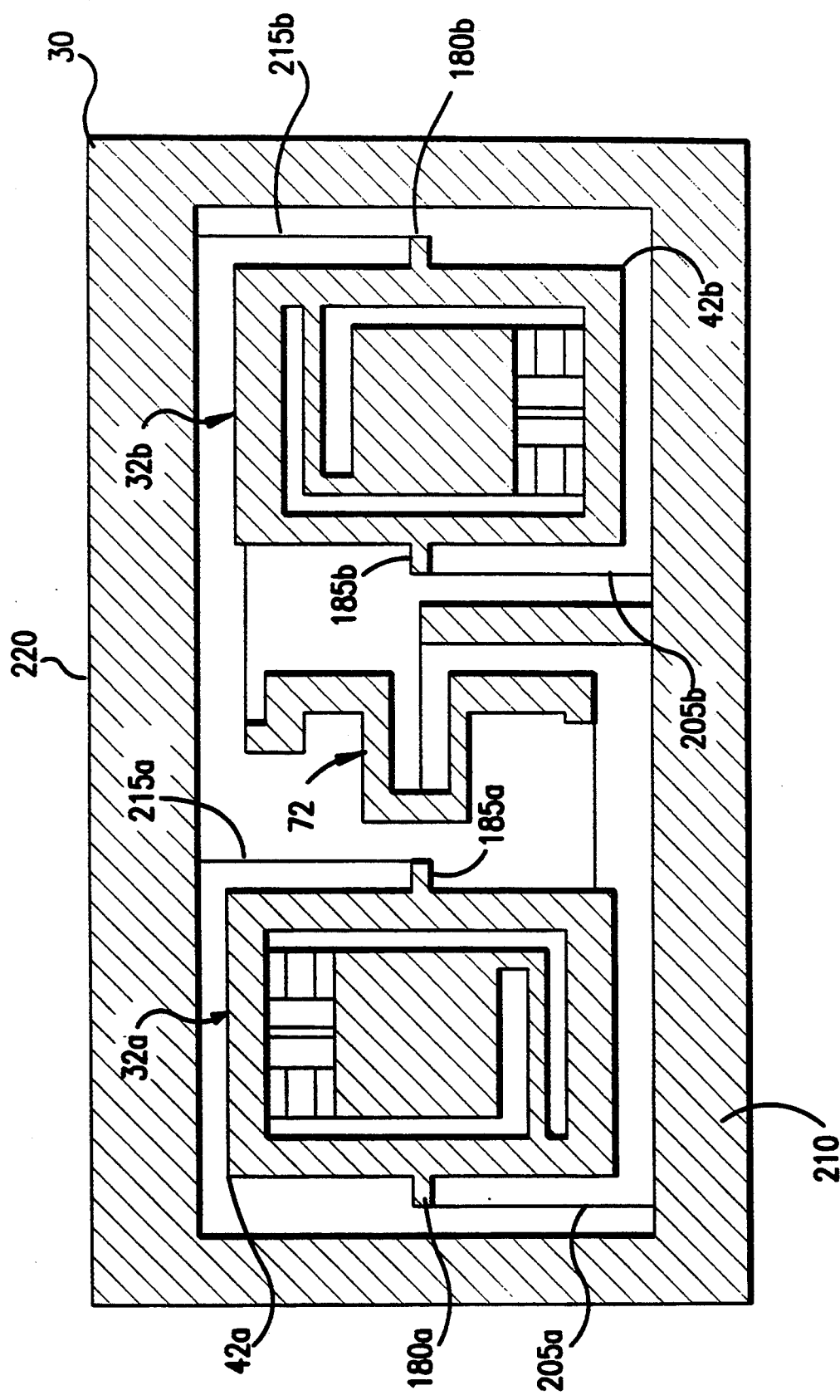
FIGS. 5–13 illustrate alternative embodiments of the substrate shown in FIG. 2A wherein the accelerometers are allowed to dither in a purely linear manner.
Figure 6:
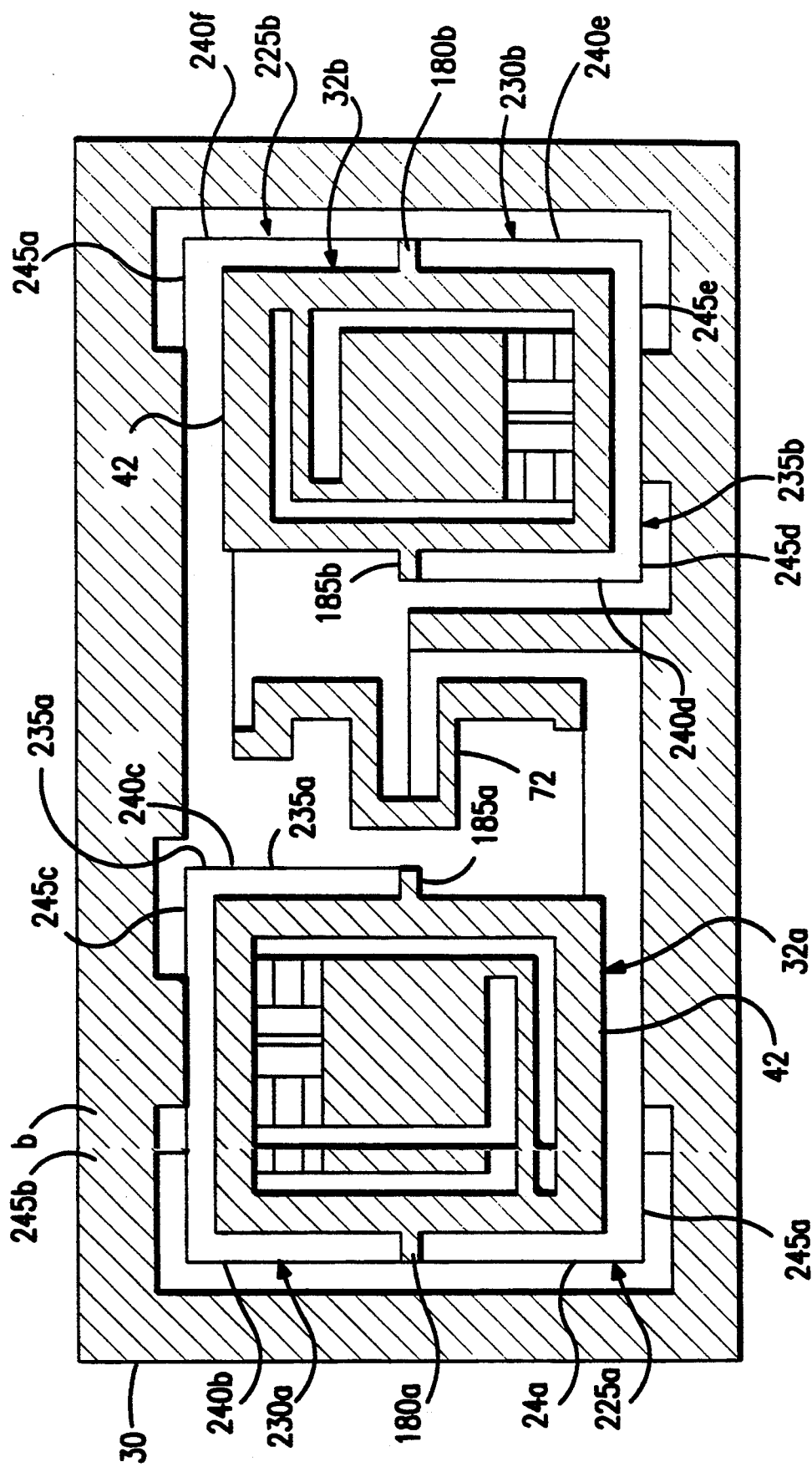

FIGS. 5 and 6 are directed to accelerometer support configurations having a purely linear dither motion. The embodiments of FIGS. 5 and 6 also have an advantage in that the frequency of the torsional modes is above the natural frequency of the accelerometers.

In the embodiment illustrated in FIG. 5, the accelerometers 32 are in a side-by-side relationship. Each accelerometer 32 has an exterior tab 180 and an interior tab 185 that extends from the support frame 42. S-bending flexures 205 respectively extend from the exterior tab 180a of accelerometer 32a and interior tab 185b of accelerometer 32b to join a first side 210 of the dither frame 30. Likewise, S-bending flexures 215 extend from the interior tab 185a of accelerometer 32a and the exterior tab 180b of accelerometer 32b to join a second side 220 of the dither frame 30 that is opposite and generally parallel to the first side 210.

Although the configuration of FIG. 5 produces a pure linear dither and does not experience the arcuate motion that is inherent in the previously described embodiments, the configuration does tend to rotate each accelerometer about its sensing axis. An alternative pure linear dither configuration that does not experience the same degree of rotation and which has its torsional modes at a frequency above the natural frequency of the accelerometers is shown in FIG. 6.

As illustrated in FIG. 6, the accelerometers 32 are placed in a side-by-side relationship. Each accelerometer 32 includes an exterior tab 180 and an interior tab 185 that extends from the respective support frame 42. The exterior tab 180 of each accelerometer is connected to two oppositely directed L-shaped flexures 225, 230. The interior tab 185 of each accelerometer 32 is connected to a single L-shaped flexure 235. Each L-shaped flexure 225, 230, 235 includes a longitudinally extending portion 240 that is connected to the respective tab and a transversely extending portion 245 that extends from the longitudinally extending portion 240 to connect to the dither frame 30. The transversely extending portions 245 are formed by cutting out a portion of the dither frame 30 so that the transversely extending portions are of the desired length. In a preferred embodiment, the longitudinally extending portions 240 of each L-shaped flexure are all of a length L. The transversely extending portions 245b, c, d and e all have a length equal to L/2 while transversely extending portions 245a and f are cut to a length equal to L/2.52.

Figure 7:
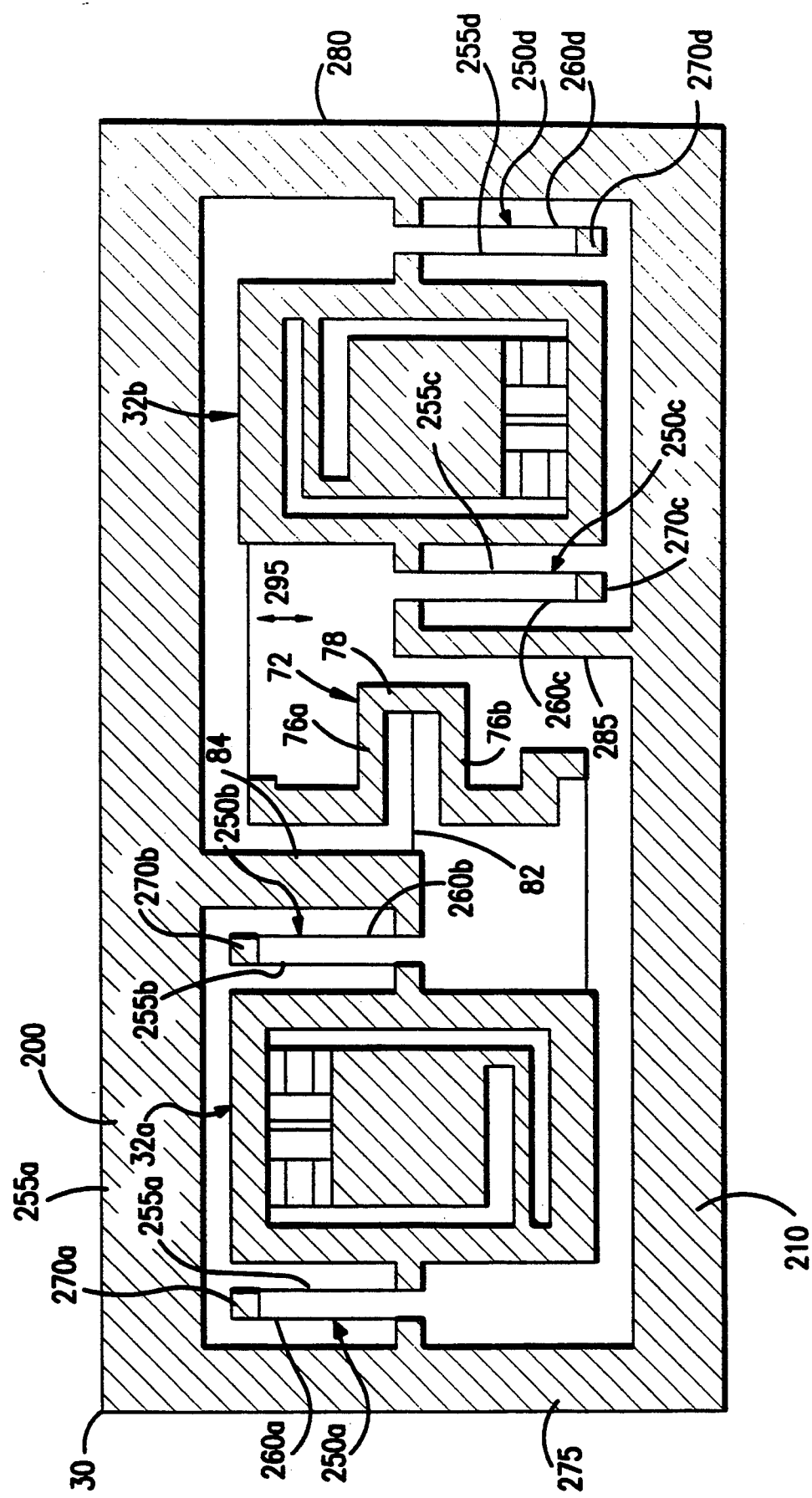

FIGS. 7-13 are directed to accelerometer support configurations having a purely linear dither motion which do not experience undesired rotation of the accelerometers 32 about their sensing axes. In the embodiment of FIG. 7, the accelerometers 32 are connected to the dither frame 30 by a configuration of back-to-back, S-bending flexure units 250. Each of the back-to-back, S-bending flexure units includes a first S-bending flexure 255 connected to a tab on the support frame 42 and a second S-bending flexure 260 that is generally parallel with the first flexure 255 and which is connected to a tab 265 that extends from the dither frame 30. The first and second S-bending flexures are connected to one another by a cross-over flexure 270.

As illustrated, each accelerometer 32 has a pair of back-to-back, S-bending flexure units 250. The exterior flexures 260a, 260d are connected to the dither frame 30 by tabs that extend from opposite parallel sides 275 and 280 of the dither frame. The interior flexures 260b and 260c are connected to tabs that extend from support members 84 and 285 that extend from opposite parallel sides 210 and 220 of the dither frame 30.

Figure 8:
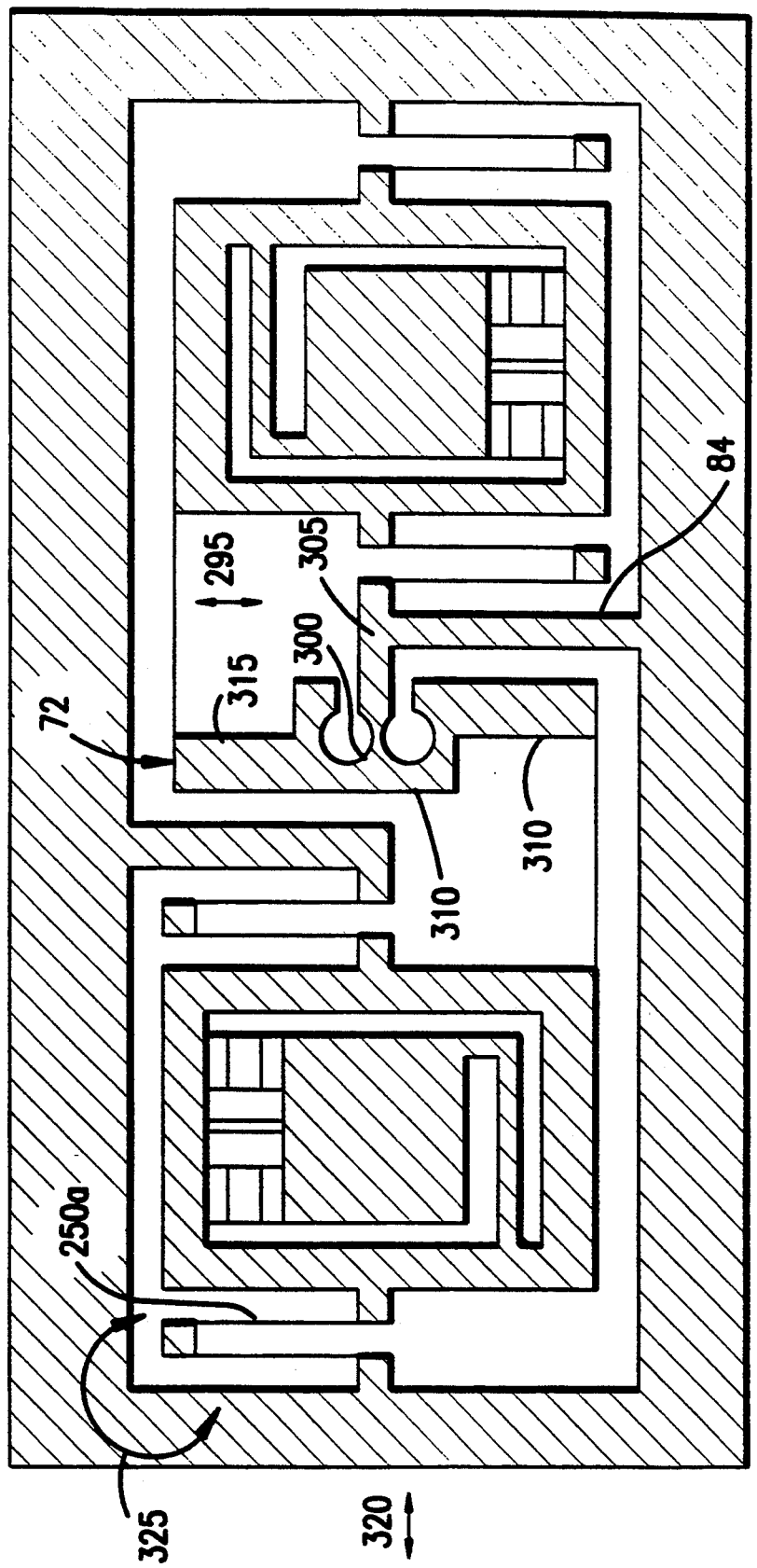

FIG. 8 illustrates an embodiment that is substantially similar to the embodiment shown in FIG. 7. The principal difference lies in the link 72. Specifically, the linear resonance is stiffened in the directions shown by arrow 295 by employing a circular arc flexure 300 at mid-portion 302 which is connected to a fulcrum 305 that extends perpendicularly from the support member 84. If formed from silicon, the edges of the circular arc flexure may have many facets depending on the type of processing used to form the flexures. Therefore, it is desirable to use reactive ion etching to from the circular arc flexure. Reactive ion etching minimizes or eliminates the faceting which would otherwise occur. A pair of lever arms 310, 315 extend from the mid-portion 302 in opposite directions.

Figure 9:
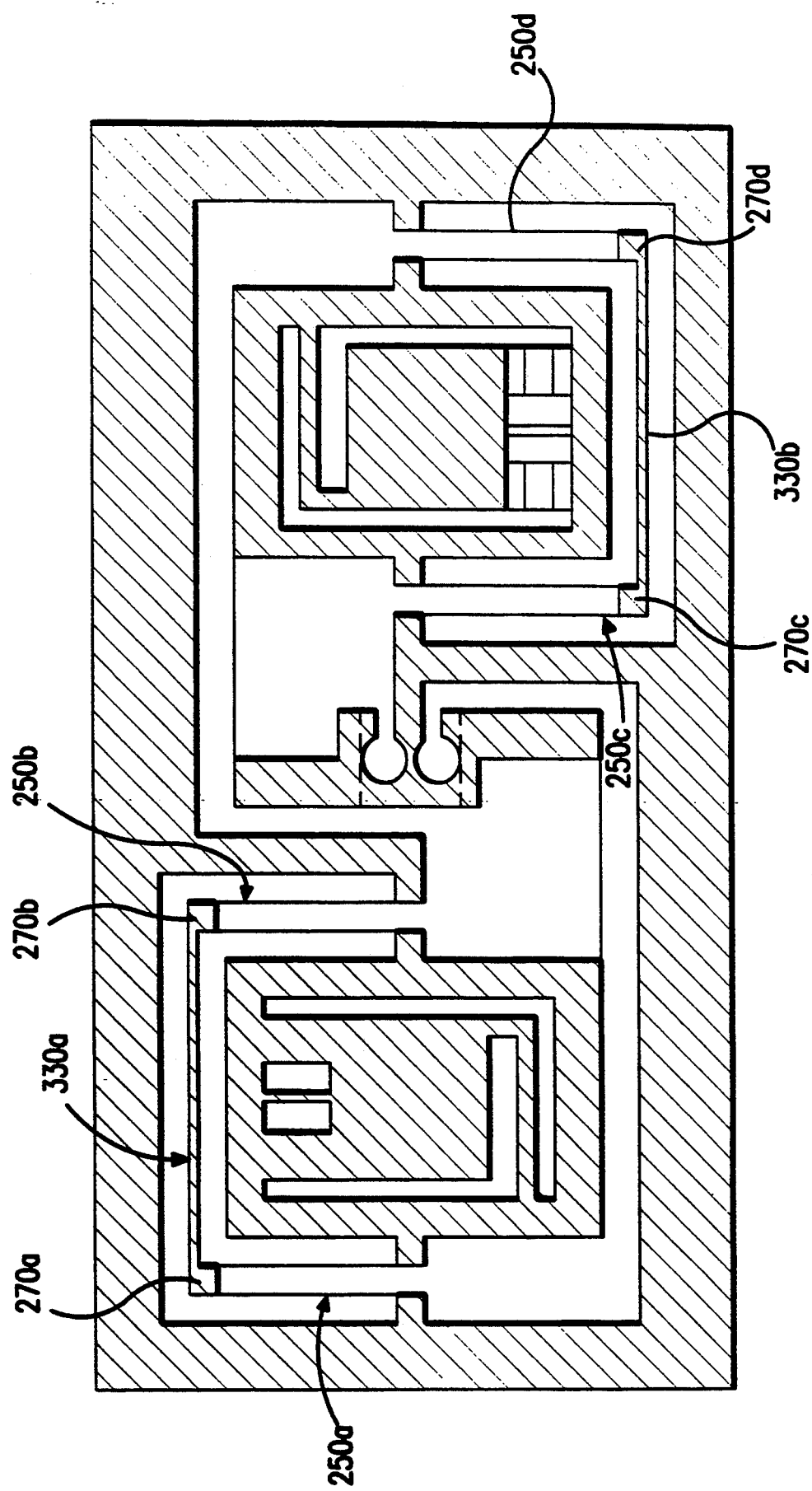

Ideally, the back-to-back flexure units 250 limit the dithering of the accelerometers to a linear motion in the direction denoted by arrow 320. In certain instances, however, the flexures may experience a soft mode in the direction denoted by arrow 325 and thus may experience block rotation in the directions shown by arrow 325. FIG. 9 illustrates a further modification of the embodiment shown in FIG. 8 which corrects such block rotation. In this embodiment, each corresponding pair of back-to-back, S-bending flexure units 250 have their crossover flexures 270 interconnected by a walking bar 330.

Figure 10:
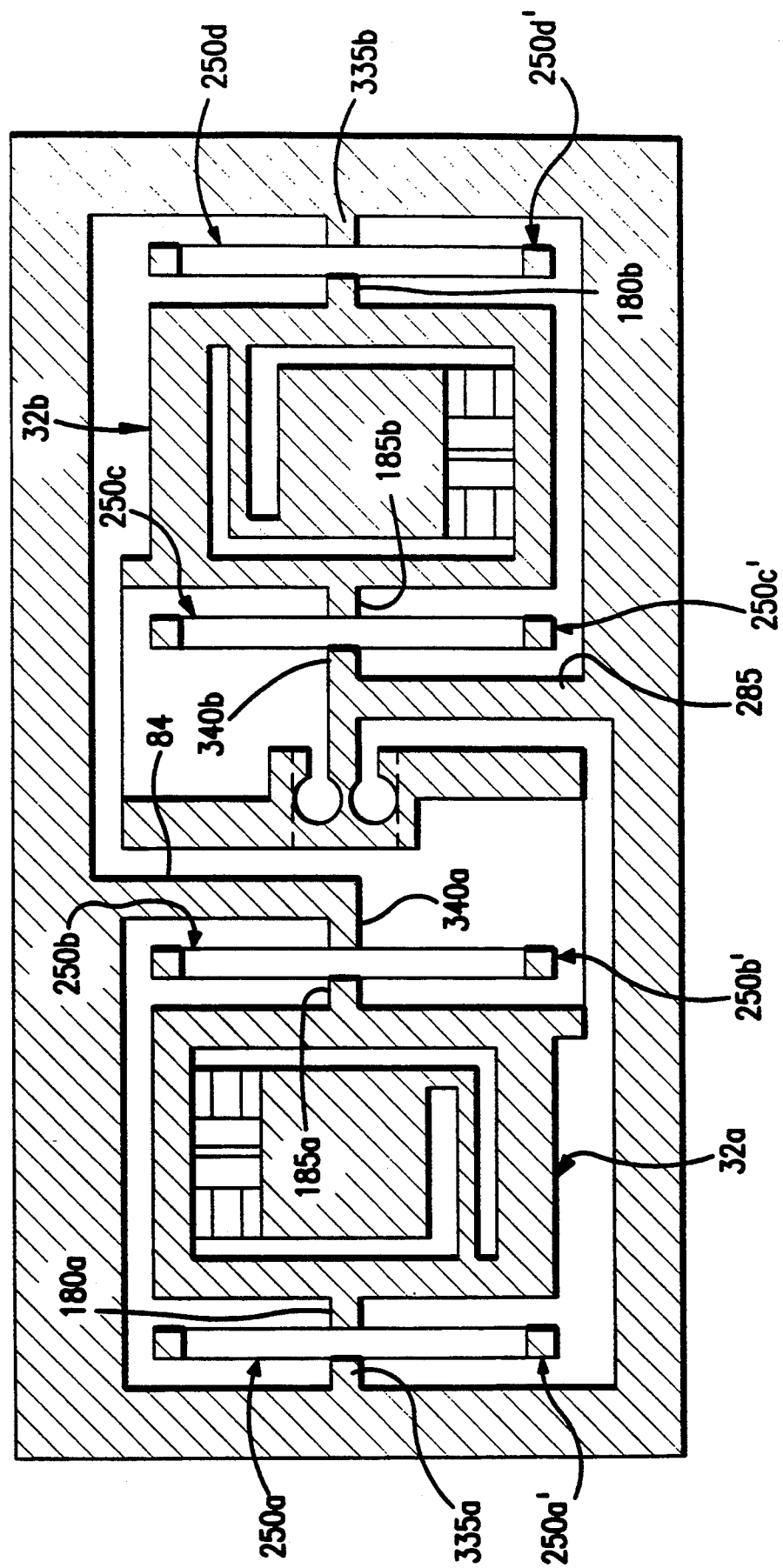

FIG. 10 illustrates a further embodiment having a linear dither. In this embodiment, each accelerometer 32 is supported by four back-to-back, S-bending flexure units. Each back-to-back, S-bending flexure unit 250 is paired with a corresponding, oppositely directed back-to-back, S-bending flexure unit 250'. The oppositely directed back-to-back, S-bending flexure units are joined to one another at tabs 180, 185, 335, 340.

Figure 11:
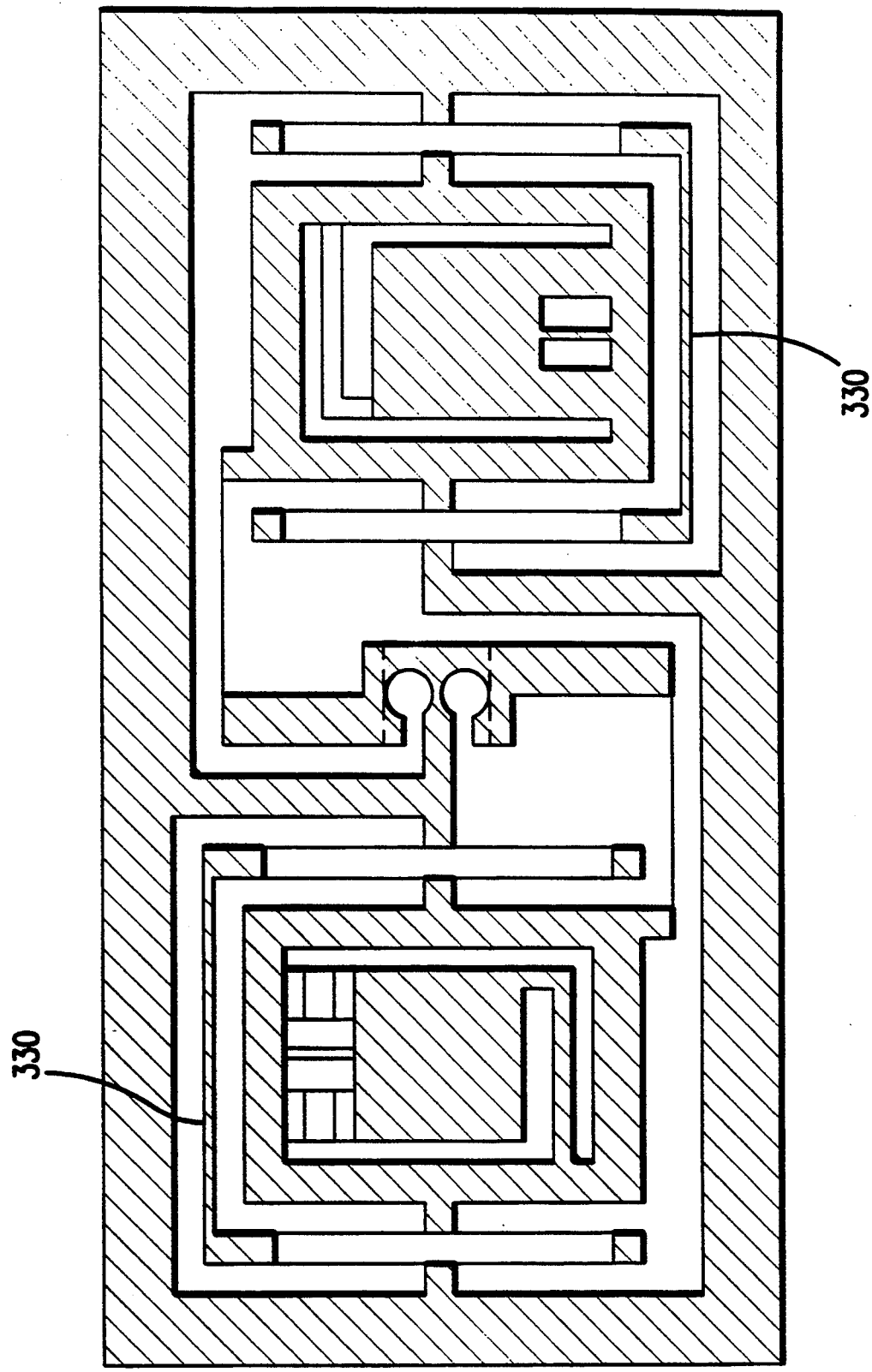

As described with respect to the embodiment of FIG. 7, the flexures may experience block rotation. To correct this block rotation and further stiffen the accelerometers along their pendulous axes, walking bars 330 may be connected between a pair of similarly directed back-to-back, S-bending flexure units. Such a configuration is shown in FIG. 11. Alternatively, as illustrated in FIG. 12, every pair of similarly directed back-to-back, S-bending flexure unit may be connected by a walking bar 330.

Figure 12:
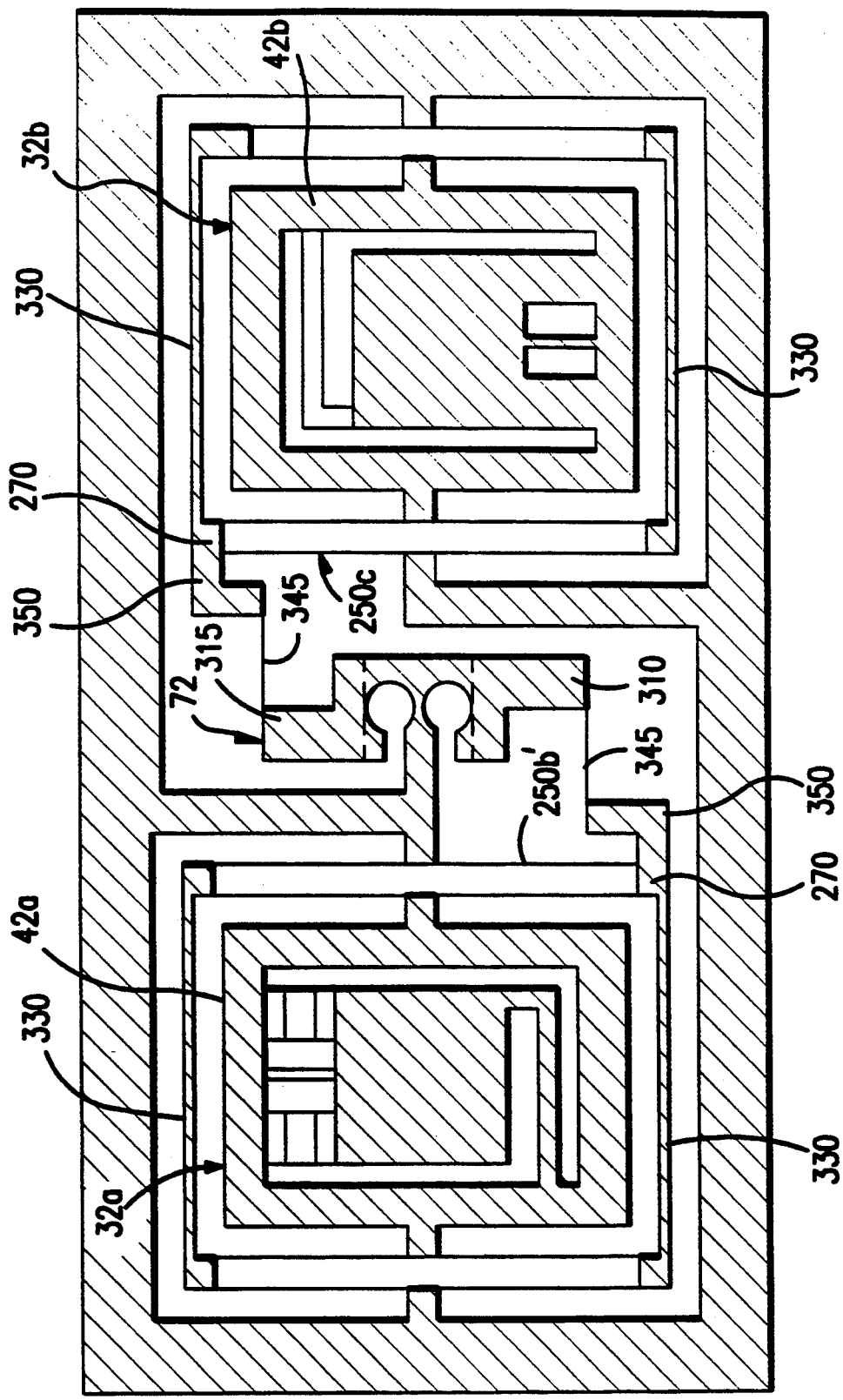

The link 72 and associated structures must be altered in the embodiment of FIG. 12 since the walking bars 330 cut off the connection between the link 72 and the support frame 42 of each accelerometer 32. As illustrated, the lever arms 310, 315 are shortened. A flexure 345 extends respectively from the end of each lever arm 310, 315 and joins an L-shaped extension 350 that extends from the cross-over bar 270 of an internally disposed, back-to-back S-bending flexure unit. Thus, this embodiment allows the link 72 to apply a dither motion to the back-to-back, S-bending flexure units 250b' and 250c as opposed to a direct transfer of the force to the support frame 42.

Figure 13:
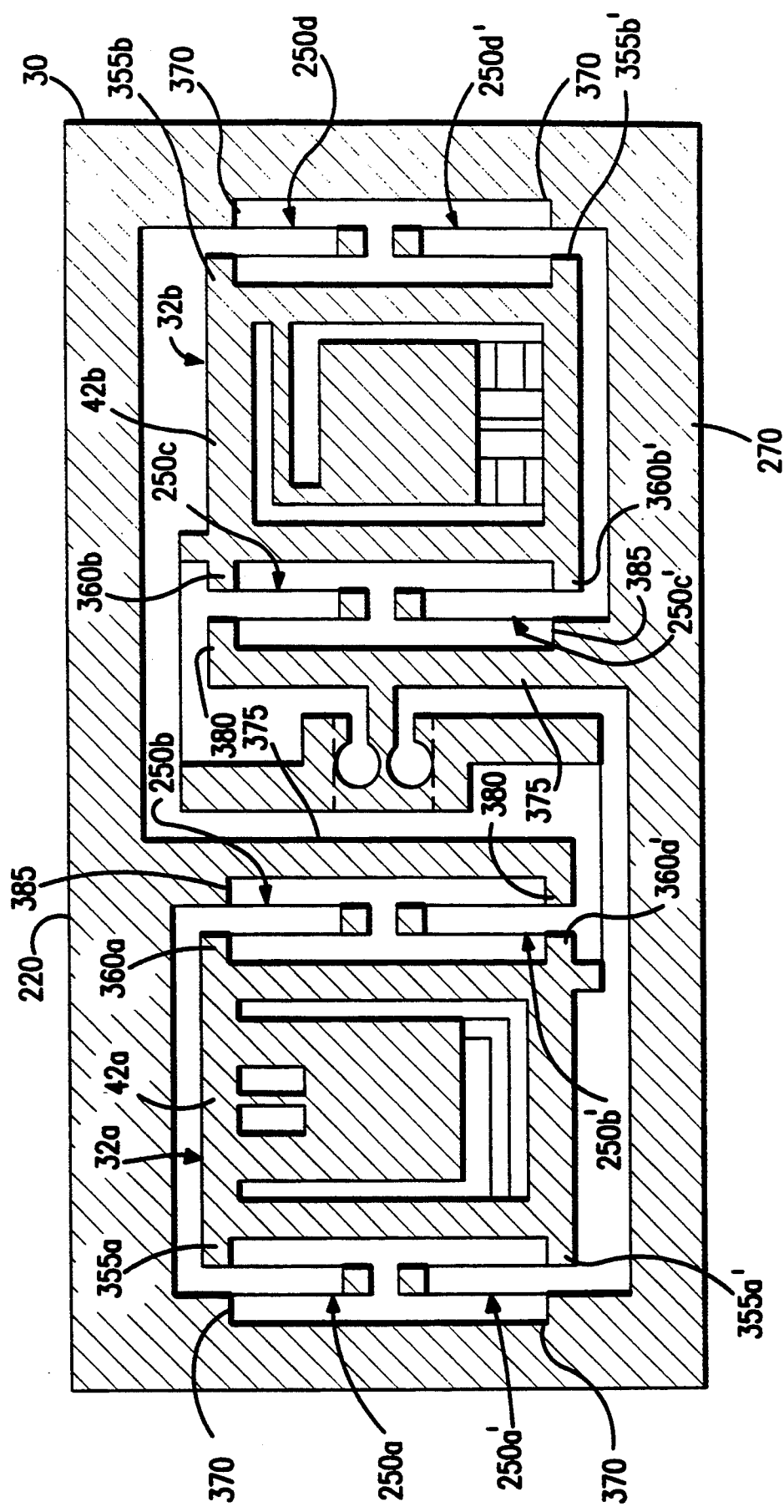

FIG. 13 shows a further pure linear dither configuration that employs a head-to-head arrangement of back-to-back, S-bending flexure units 250. As illustrated, each accelerometer 32 has four tabs 335, 360 respectively extending from each of the four corners of its respective support frame 42. Each accelerometer includes two pair of back-to-back, S-bending flexure units 250, each pair being configured in a head-to-head arrangement. The exterior back-to-back, S-bending flexure units 250a, 250a', 250d, and 250d' extend between the respective exterior tabs 355 and cut out portions 370 on the dither frame 30. Support members 375 extend from opposite sides 210, 220 of the dither frame 30 into the interior portion of the dither frame and terminate in a tab 380. Each interior back-to-back, S-bending flexure unit 250b, 250b', 250c, 250c' has one side extending from the respective interior tab 360 while the other side is connected to the respective support member 375. As illustrated, one set of interior flexure units 250b' and 250c are connected to the respective support member 375 at the tab 380 while the other set of interior flexure units 250b and 250c' are connected to the support frame 42 at cut-out portions 385 in the support frame.

In the above-disclosed embodiments, the link 72 was disposed in an interior region between the accelerometers 32 and separated them from one another. However, the link need not necessarily be so disposed. Rather, two links may be disposed exterior to the accelerometers 32 to provide the necessary control of the dither motion. Several embodiments of sensor substrates employing pairs of exterior links are shown in FIGS. 14–16.

Figure 14:
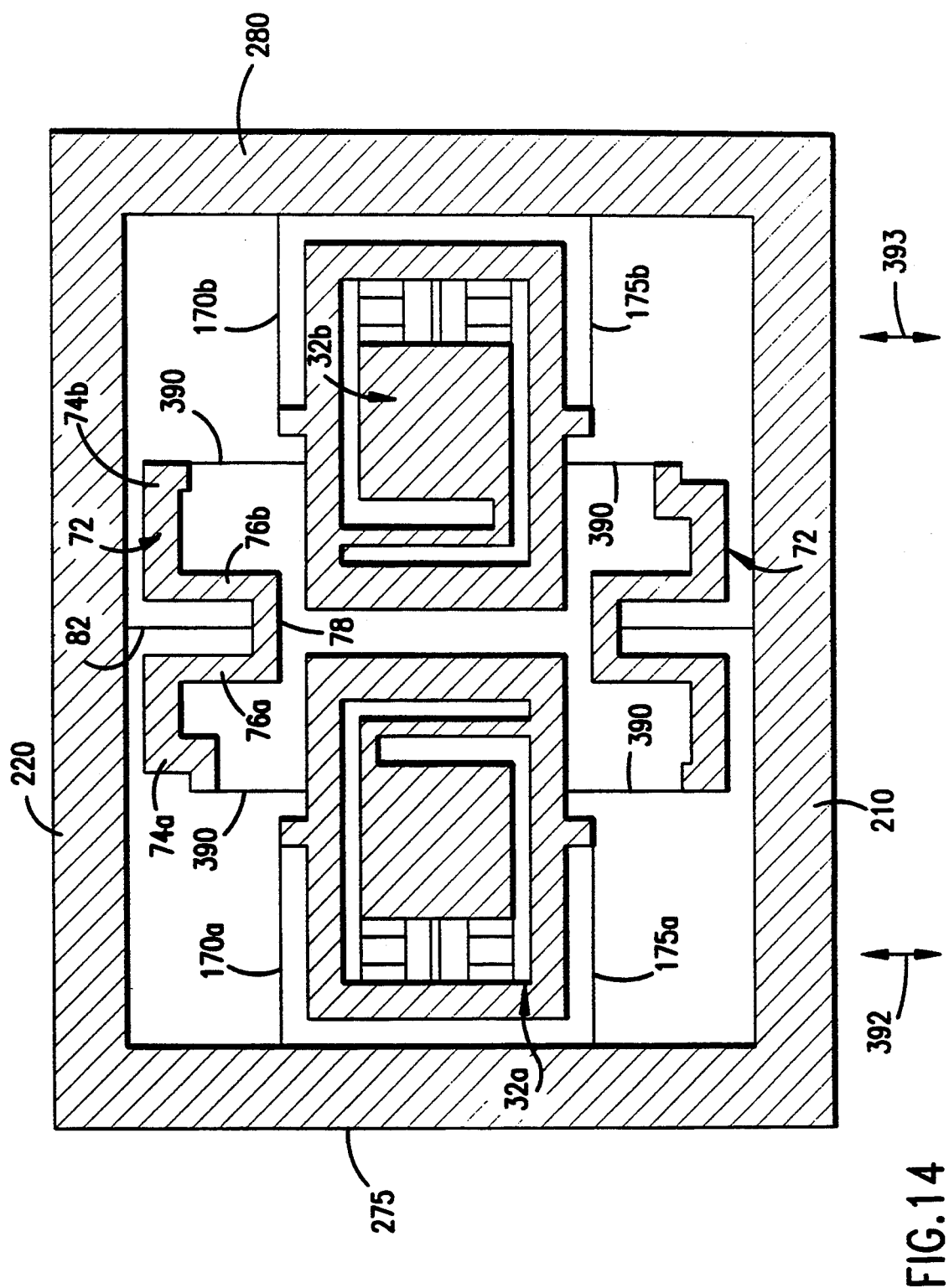
FIGS. 14–16 illustrate alternative embodiments to the substrate shown in FIG. 2A wherein the accelerometers are coupled to one another by two externally disposed links.

FIG. 14 illustrates a sensor substrate having accelerometers 32 that are arranged in a head-to-head configuration. The accelerometers 32 are connected to opposite sides 275, 280 of the dither frame 30 by flexures 170, 175 and extend toward one-another such that their struts 52 are proximate one another. A pair of exterior links 72 are disposed on opposite sides of the accelerometers 32. Each link 72 includes a pair of parallel members 76a and 76b interconnecting the lever arms 74a and 74b to a brace 78 that is connected to the pivot flexure 82. The pivot flexures 82, in turn, are connected to opposite sides 210, 220 of the dither frame 30. A flexure 390 respectively extends from the end of each pivot arm 74 to the respective accelerometer 32 whereby each link has one lever arm connected to one accelerometer while the other lever arm is connected to the other accelerometer. Since the accelerometers are in a head-to-head arrangement, they dither along parallel dither axes denoted by arrows 392 and 393.

Figure 15:
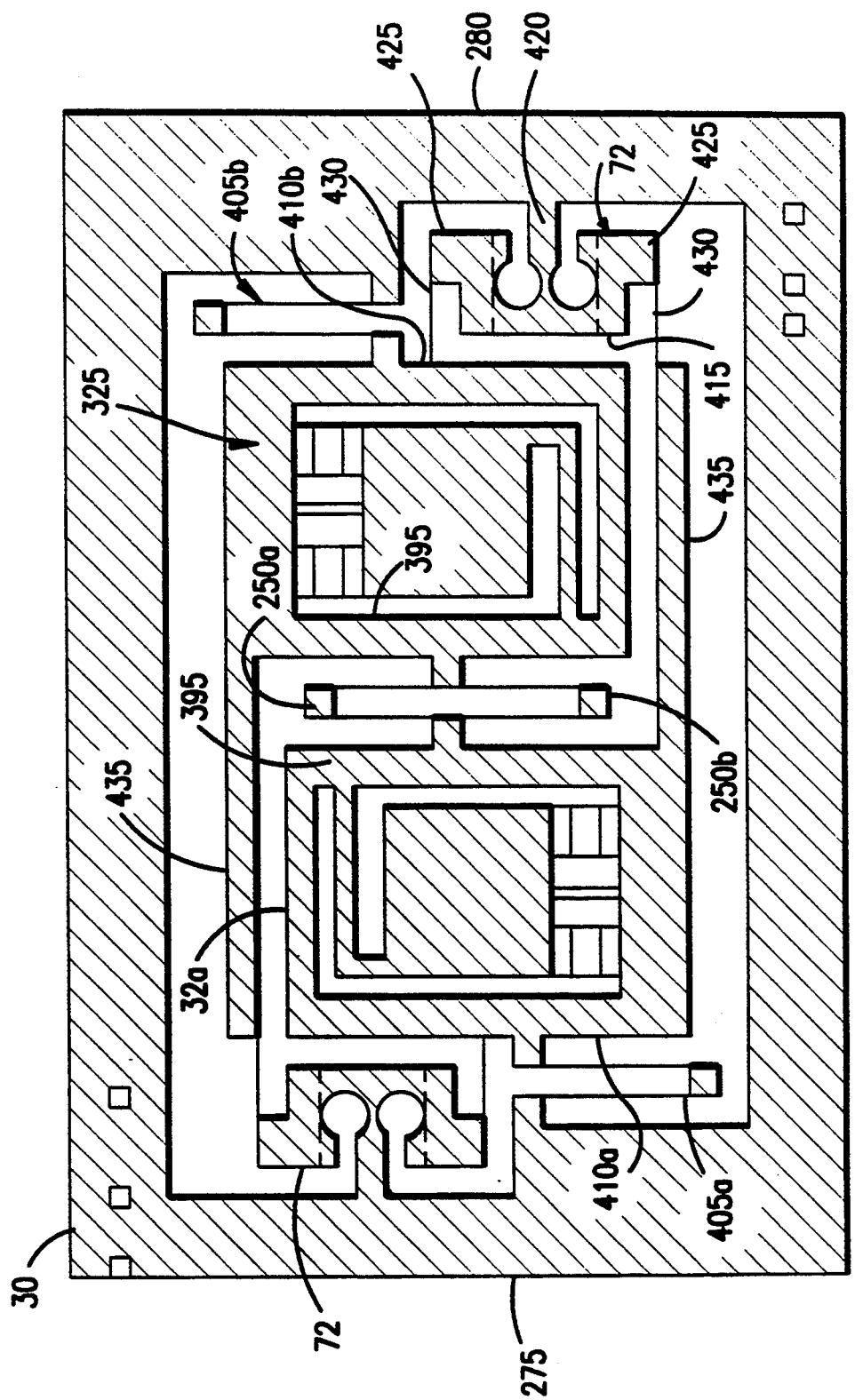
Figure 16:
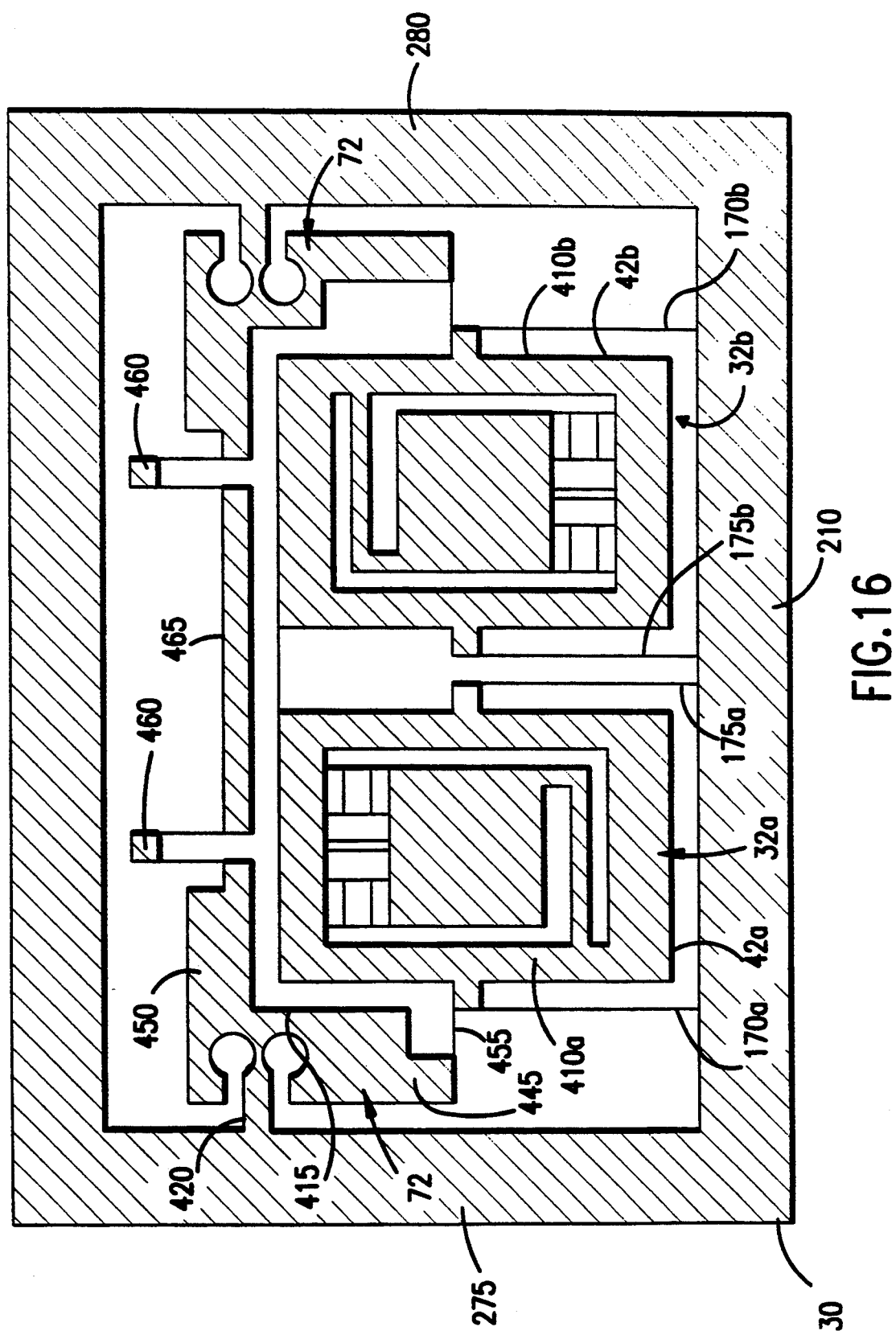

FIG. 15 shows an embodiment having two accelerometers 32 in a side-by-side relationship which are interconnected by a pair of exterior links. A pair of oppositely directed, back-to-back, S-bending flexure units 250a and b are disposed between the interior parallel sides 395 of the support frames 42 of the accelerometers 32 and are connected to tabs that extend from the support frame 42. A single, back-to-back, S-bending flexure unit 405 is connected between a tab on the exterior side 410 of the support frame 42 of each accelerometer 32 and the dither frame 30. The back-to-back, S-bending flexure unit 405a connected to accelerometer 32a is directed in an opposite direction from the back-to-back, S-bending flexure unit 405b connected to accelerometer 32b.

Two exterior links 72 are cut out from opposite sides 275, 280 of the dither frame 42. The opposite sides 275, 280 of the dither frame 30 are generally parallel to the exterior sides 410 of the support frames 42 when the sensor is at rest. Each exterior link includes a central portion 415 having a circular arc flexure that is connected to a fulcrum 420 that perpendicularly extends from the respective side 275, 280 of the dither frame 30. The links 72 further include lever arms 425 that extend in opposite directions from the central portion 415. A flexure 430 extends from the end of each lever arm 425. One flexure is connected directly to the support frame of the immediately adjacent accelerometer while the other flexures is connected to an extension arm 435 that extends from the support frame 42 of the distal accelerometer.

FIG. 16 is an embodiment that employs a pair of exterior links that are interconnected to one another. As illustrated, the accelerometers 32 of this embodiment are placed in a side-by-side arrangement. The accelerometers are connected to the same side 210 of the dither frame by a respective pair of flexures 170 and 175. The flexures 170 and 175 extend from tabs on the support frame 42 of the respective accelerometer 32 and the side 210 of the dither frame 30.

Two exterior links 72 are disposed on opposite sides 275, 280 of the dither frame 42. The opposite sides 275, 280 of the dither frame 30 are substantially parallel to the exterior sides 410 of the support frames 42 when the sensor is at rest. Each exterior link includes a central portion 415 having a circular arc flexure that is connected to a fulcrum 420 that perpendicularly extends from the respective side 275, 280 of the dither frame 30. The links 72 further include a pair of substantially perpendicular lever arms 445, 450. A first lever arm 445 runs substantially parallel to the exterior side of the respective support frame 42 while a second lever arm 450 extends from the central portion 415 in a direction perpendicular to the first lever arm 445. A flexure 445 extends respectively from each first lever arm 445 and is connected to the exterior tab of the immediately adjacent accelerometer. The second lever arms 450 of each link 72 extend toward one another and are interconnected by a pair of similarly directed, back-to-back, S-bending flexure units 460 and an interconnect bar 465 that extends between the back-to-back, S-bending flexure units 460.

The embodiments of FIGS. 14 and 16 will experience the previously noted arcuate dither motion since the flexures connecting the accelerometers to the dither frame are similar to those shown in FIG. 2A. Where such arcuate motion cannot be tolerated, the embodiment of FIG. 15 may be employed since it is designed to exhibit a purely linear dither motion.

The foregoing sensor substrates may be modified and incorporated into a single substrate, for example, a crystalline quartz substrate, having three sensors which are adapted to measure angular rate and acceleration along three skewed axes to form a triaxial sensor. One embodiment of such triaxial sensor substrate is shown in FIG. 17.

Figure 17:
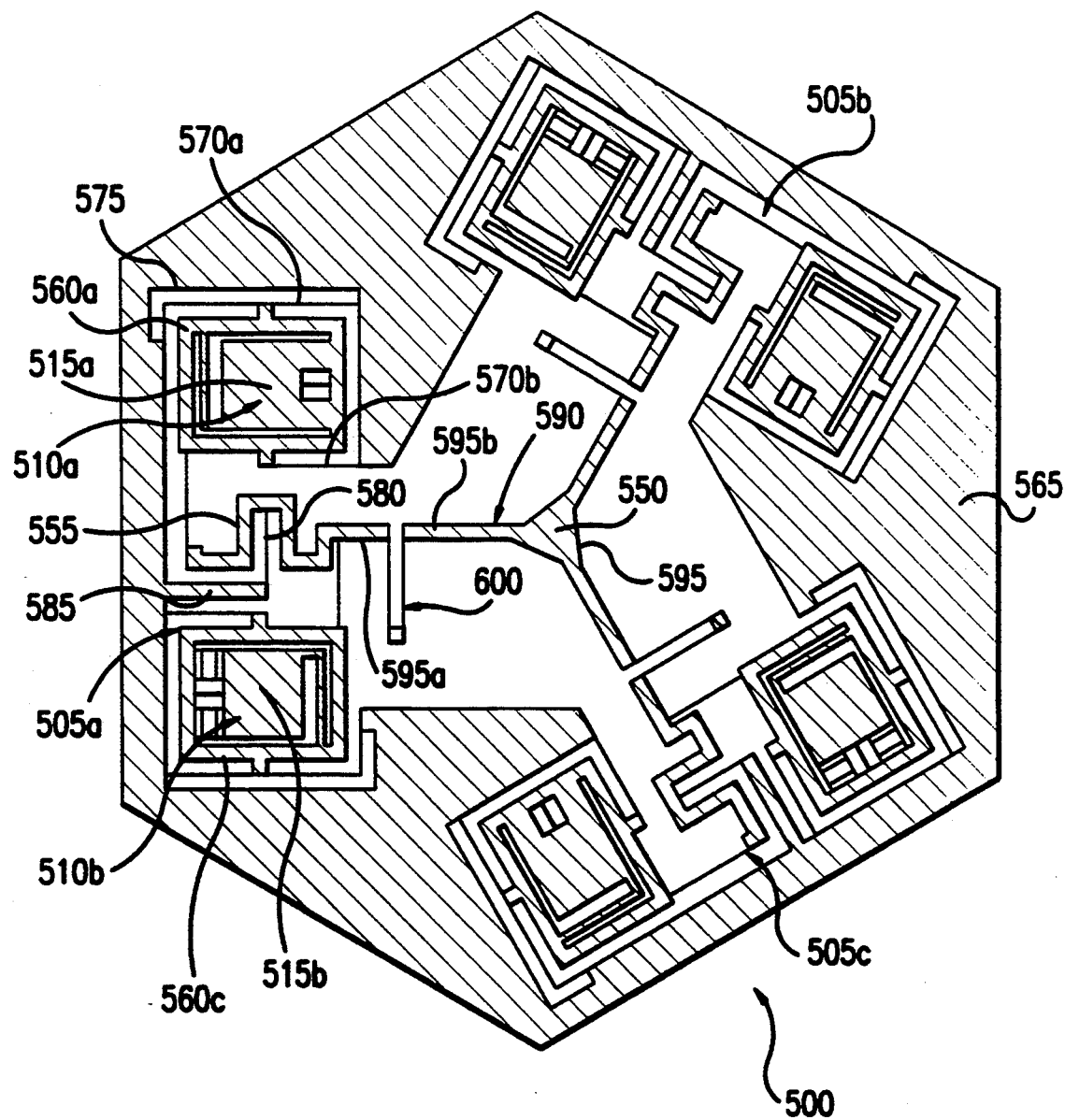
FIG. 17 illustrates an embodiment of a substrate for a triaxial angular rate and acceleration sensor wherein six accelerometer structures are formed in a single monolithic substrate.

As illustrated in FIG. 17 the substrate 500 includes three coplanar sensors 505a, 505b and 505c that are arranged at approximately 120 degrees with respect to one another in the common plane of the substrate. Each sensor 505 includes a first accelerometer 510a and a second accelerometer 510b.

As described with respect to the prior sensor substrates, each accelerometer includes a proof mass that is connected to a sensor frame by a pair of parallel flexures and a pair of vibrating beams that may be used to detect a force on the proof mass. A transverse strut extends from the proof mass to the sensor frame to limit transverse movement of the proof mass. Unlike the substrate described with respect to FIG. 2A above, however, the accelerometers 510 are specifically designed to have their respective sensing axes 515a and 515b canted with respect to the normal 520 of the plane of the substrate. In a preferred embodiment, the axes are canted at an angle of 35.26 degrees with respect to the substrate normal 520.

Figure 18:
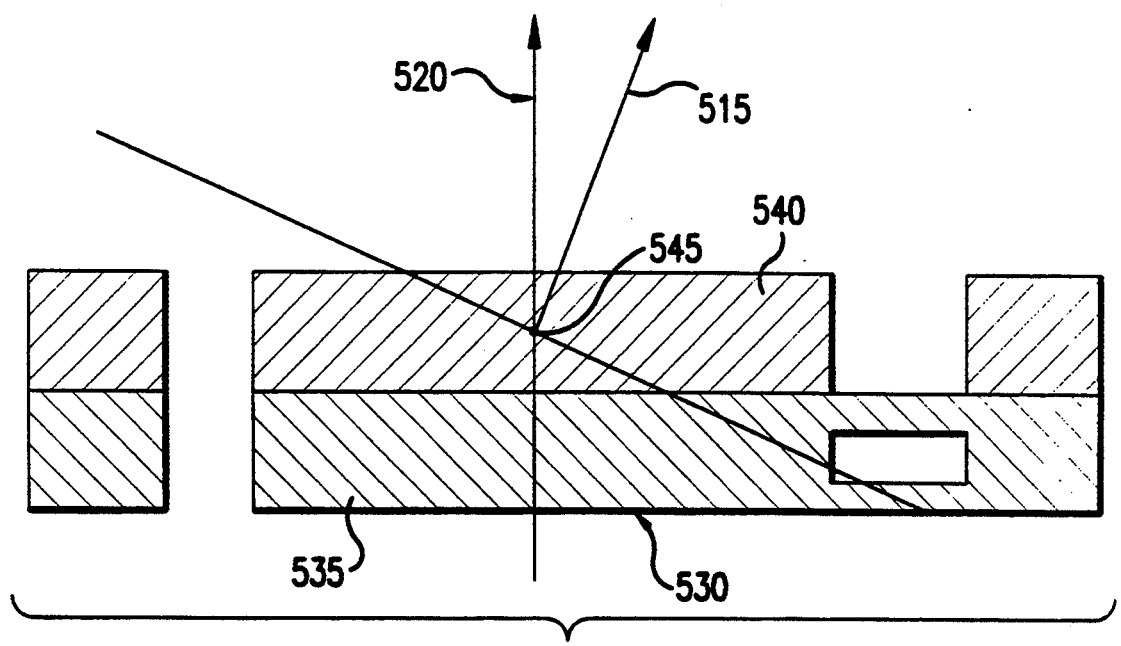
FIG. 18 illustrates one manner of canting the input axis of an accelerometer with a mass plate.

FIG. 18 shows a proof mass 530 and associated elements in more detail. As shown, the proof mass 530 includes a pendulum 535 made, for example, from the substrate. A mass plate 540 is bonded to the pendulum 535. The mass plate 540 is added to adjust the center of mass 545 of the proof mass 530 so that the sensing axis 515 of the accelerometer is canted at an angle of approximately 35.26 degrees with respect to the normal 520 of the plane of the substrate. The full scale acceleration input range of the accelerometer is dependent on the density of the mass plate material. Thus the input range can be varied through selection of the mass plate material. For example, the pendulum 535 may be constructed from silicon (i.e., where silicon is used for the substrate) and be 0.06" wide by 0.06" long by 0.02" thick. A corresponding mass plate constructed from, for example, tungsten, would likewise be approximately 0.02" thick and have the same length and width measurements. The input range of such an accelerometer would decrease on the order of 9:1 when compared to an accelerometer having a proof mass constructed entirely from silicon. Thus an accelerometer that would normally have a 90 G input range if constructed with a proof mass entirely formed from silicon would have a 10 G input range if constructed having a silicon/tungsten proof mass. Additionally, the Q-factor of the accelerometer would be greatly reduced in comparison. Other mass plate materials may also be used including quartz or a cobalt based alloy such as elgiloy or havar.

The first and second accelerometers 510a and 510b of each sensor are arranged such that their sensing axis 515a and 515b are generally parallel and directed in opposite directions. For present purposes, such a configuration shall be referred to as "anti-parallel". The first accelerometer 510a thus has its sensing axis canted at an angle toward center point 550 while the second accelerometer 510b has its sensing axis 515b canted at an angle away from center point 550. Alternatively, the axes may be generally parallel and directed in the same direction. For present purposes, such a configuration shall be referred to as "parallel". Because the parallel configuration does not inherently zero out the linear acceleration signal, additional electronic processing to extract the desired signals may be required (i.e., the linear acceleration signals from the accelerometer pairs undergo a subtraction from one another as opposed to being summed).

A link 555 connects the sensor frames 560a, 560b of the first and second accelerometers 510a, 510b so that any dither of the first accelerometer 510a produces a corresponding dither of the second accelerometer 510b and vice-versa. Each sensor can thus be used to measure linear acceleration along the sensing axes of its respective first and second accelerometers and may further be used to simultaneously measure the angular rate in the direction of the cross-product between a unit dither vector and a unit vector along the sensing axes.

The triaxial sensor substrate also includes a main frame 565. A pair of parallel flexures 570a, 570b and a stiffening flexure 575 connect the sensor frame of each accelerometer to the main frame 565. The link 555 is connected by a pivot flexure 580 to a support member 585 that extends from the main frame 565. A radial hub member 590 respectively connects the links 555 of each sensor to a hub 595. Each radial hub member 590 includes two rigid portions 595a and 595b that are disposed on opposite sides of a back-to-back, S-bending flexure unit 600. Together, the links 555, radial hub members 590 and hub 595 ensure that all of the accelerometers will dither in the plane of the substrate at the same frequency.

Figure 19:
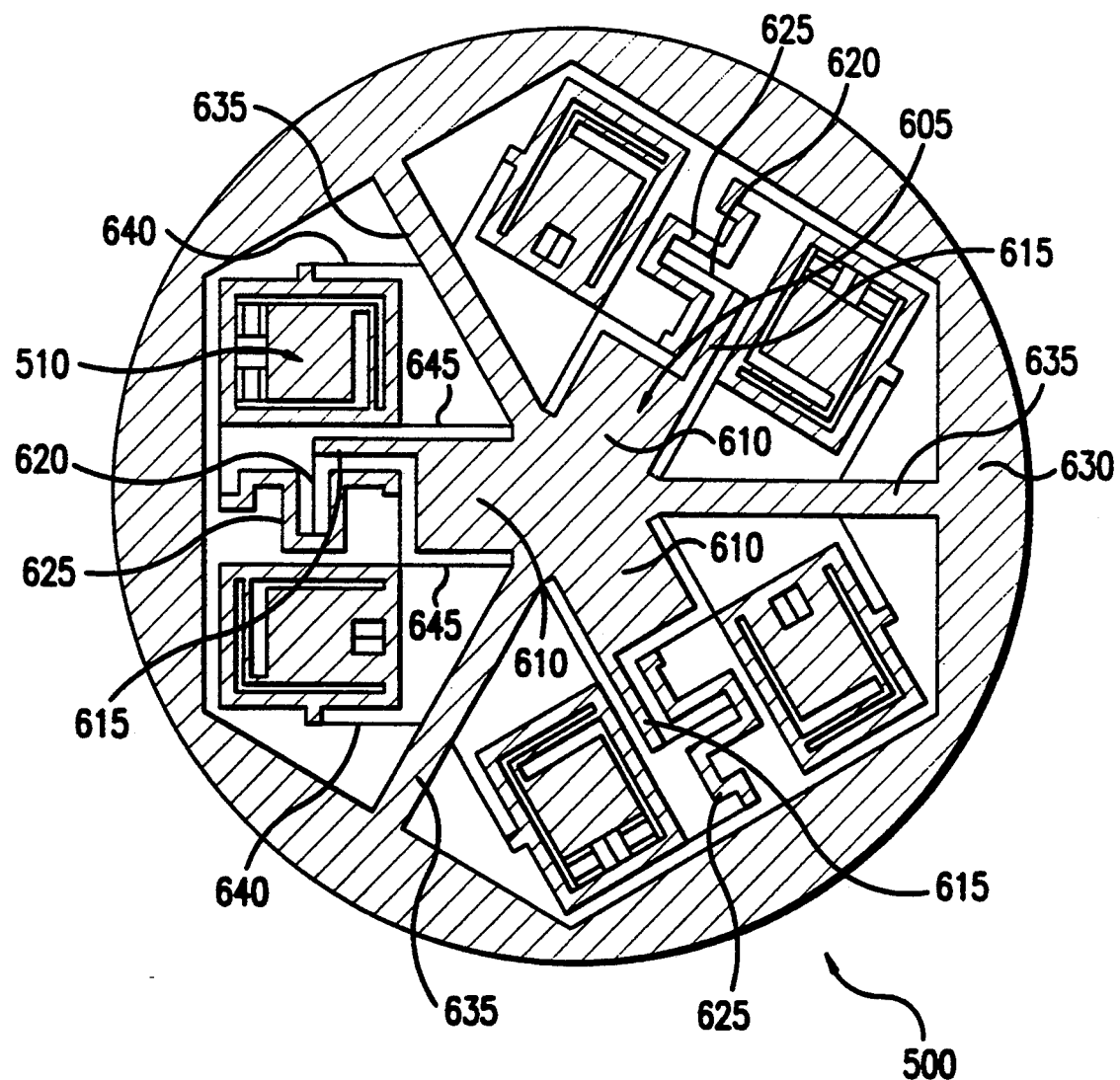
FIG. 19 illustrates an alternative configuration of the substrate of FIG. 17.

FIG. 19 illustrates a further embodiment of a triaxial sensor substrate 500. As illustrated, the hub 605 includes three radial arms 610 that are disposed at angles of 120 degrees with respect to one another. Each arm 610 terminates in a support member 615 which is connected by a pivot flexure 620 to the respective link 625. Additionally, the hub 605 is connected to a main frame 630 by spokes 635 which extend radially from the hub 605 to the main frame 630 and which are disposed at an angle of 120 degrees with respect to one another. The parallel flexures 640, 645 respectively associated with each accelerometer 510 are connected to a corresponding spoke 635 as opposed to being directly connected to the main frame 630.

As can be seen from FIG. 19, each exterior flexure 640 is connected to an exterior tab disposed at a midportion of an exterior side of the respective support frame. Each interior flexure 645 is connected at an internal corner of the accelerometer. This allows the flexures to be formed to the same length and bend in the same desired mode. The sensing axes of the accelerometers 510 of this embodiment are arranged in the same fashion as the embodiment of FIG. 18.

Figure 20:
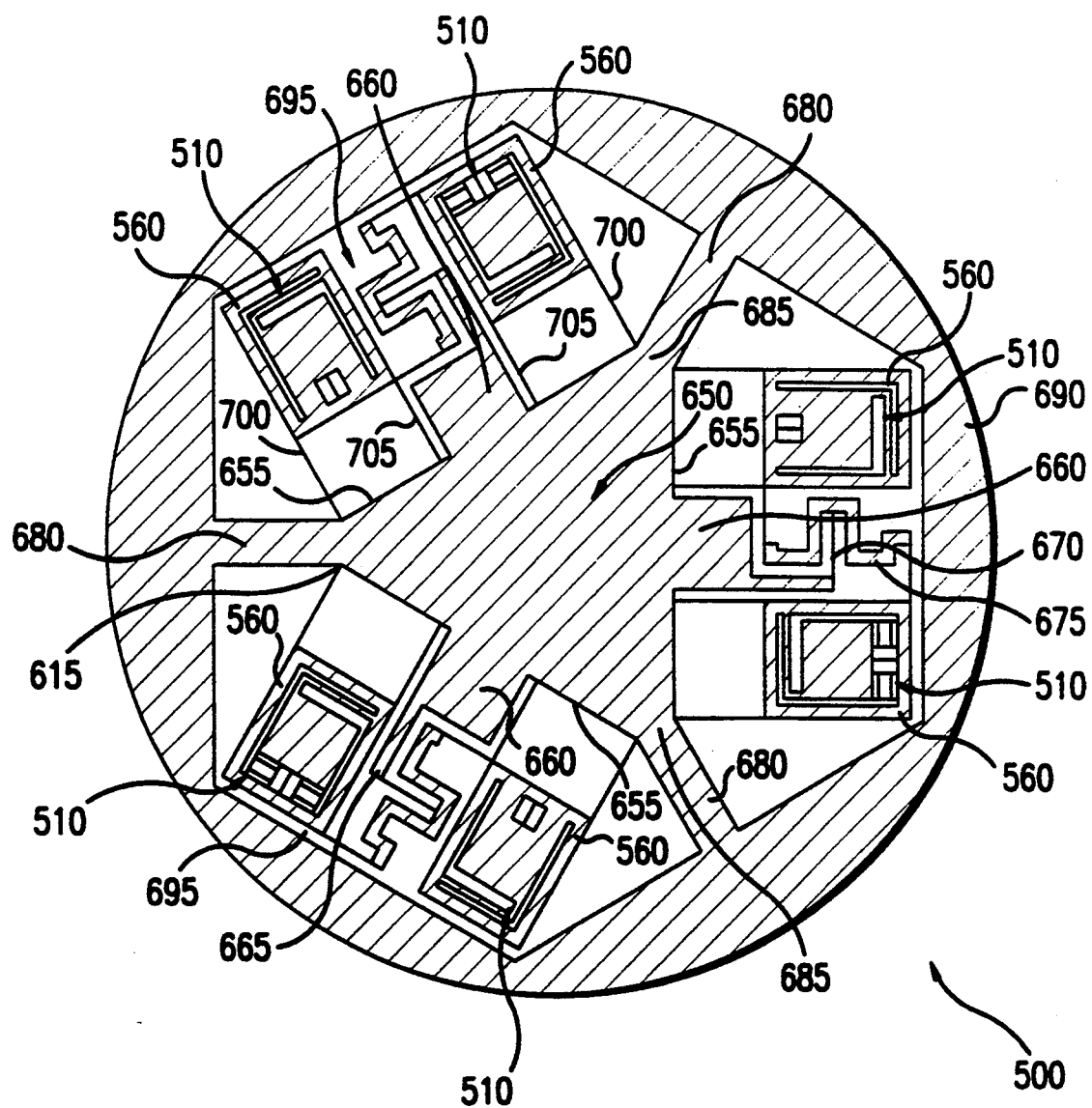
FIG. 20 illustrates a still further alternative configuration of the substrate of FIG. 17.

FIG. 20 shows a further embodiment of the triaxial sensor 500. In this embodiment, the hub 650 is in the form of an equilateral triangle. Each side portion 655 of the hub 650 has an arm 660 which terminates in a support member 665 which, in turn, is connected to a pivot arm flexure 670 that extends from the respective link 675. As illustrated, spokes 680 extend from the apex portions 685 of the hub and connect the hub 650 to a main frame 690.

A sensor 695 is respectively associated with each side portion 655 of the hub 650. Each accelerometer 510 of each sensor is connected to the respective side portion 655 of the hub 650 by a pair of parallel flexures 700, 705 that extend from the corners of the respective sensor frame 560. The common connection between the accelerometers 510 and the hub 650 ensures that the accelerometers will all dither in the plane of the substrate.

The triaxial sensors of the foregoing embodiments can be operationally divided into two sets of three accelerometers. A first set of three accelerometers are disposed in the plane such that their sensing axes are skewed to one another and are directed toward the center axis normal to the hub. The remaining second set of three accelerometers are arranged such that their sensing axes are also skewed to one another and opposite in direction to the sensing axes of the first set of three accelerometers so that they are directed outward from the center axis normal to the hub. When driven by a dither oscillator, the links and associated components cause the first set of accelerometers to dither in a direction opposite the dither of the second set of accelerometers thereby allowing simultaneous measurement of linear acceleration and angular rate.

Figure 32:
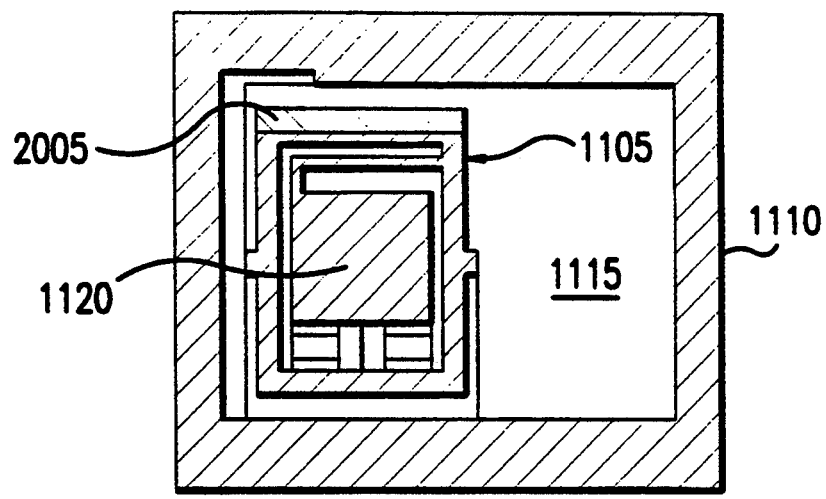
FIGS. 32–35 illustrate an embodiment of a single axis acceleration and angular rate sensor.

The embodiments of the triaxial sensors formed from a single substrate are sensitive to angular acceleration because the sensing axes of the accelerometers of each individual sensor are side by side thereby effectively creating a low sensitivity angular accelerometer about the rate axes. To reduce or eliminate such angular rate sensitivity, the sensing axes of the corresponding accelerometers of each sensor may be aligned. FIGS. 21–32 are directed to embodiments of a triaxial sensor wherein the input axes are aligned to reduce or eliminate angular acceleration sensitivity. FIG. 32 shows an alternate linking for a single axis.

Figure 21:
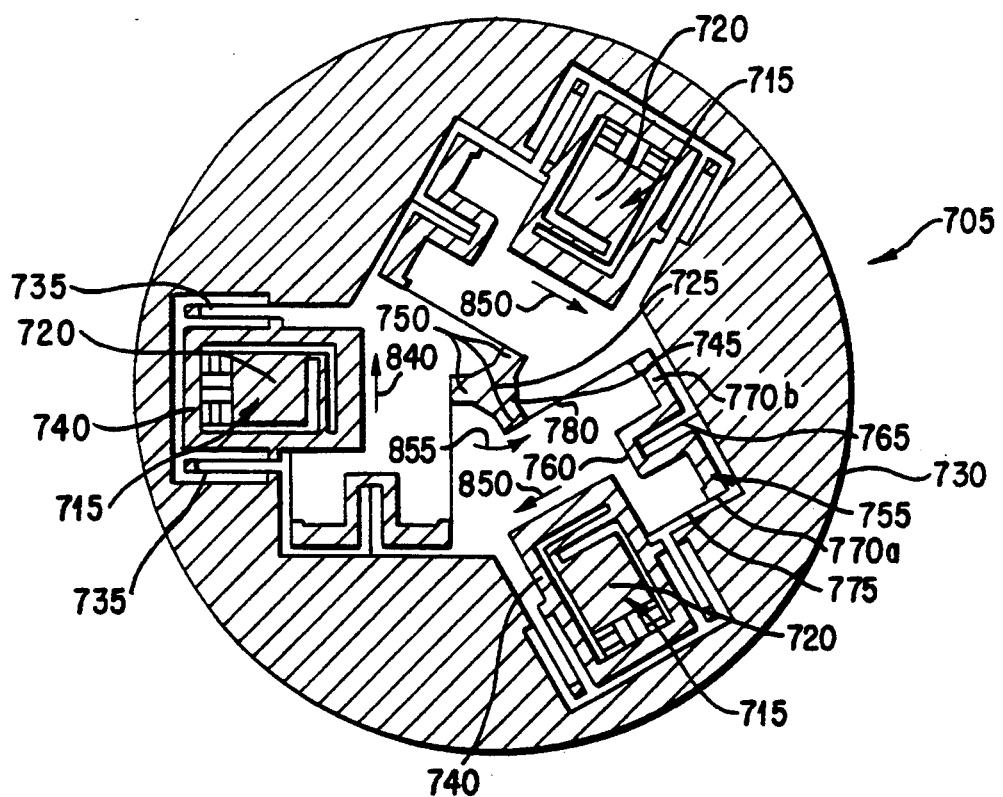
FIGS. 21 and 22 illustrate two substrates for use in a triaxial angular rate and acceleration sensor which may be configured to overlie one another to reduce or eliminate angular acceleration sensitivity of the sensor.
Figure 22:
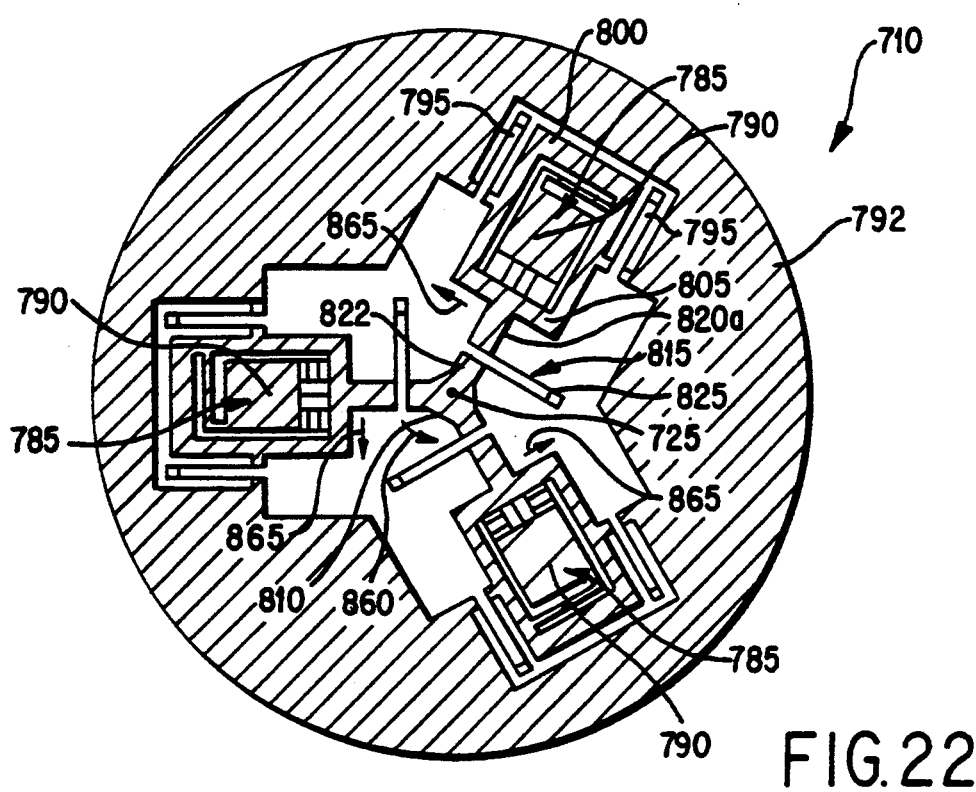
Figure 23:
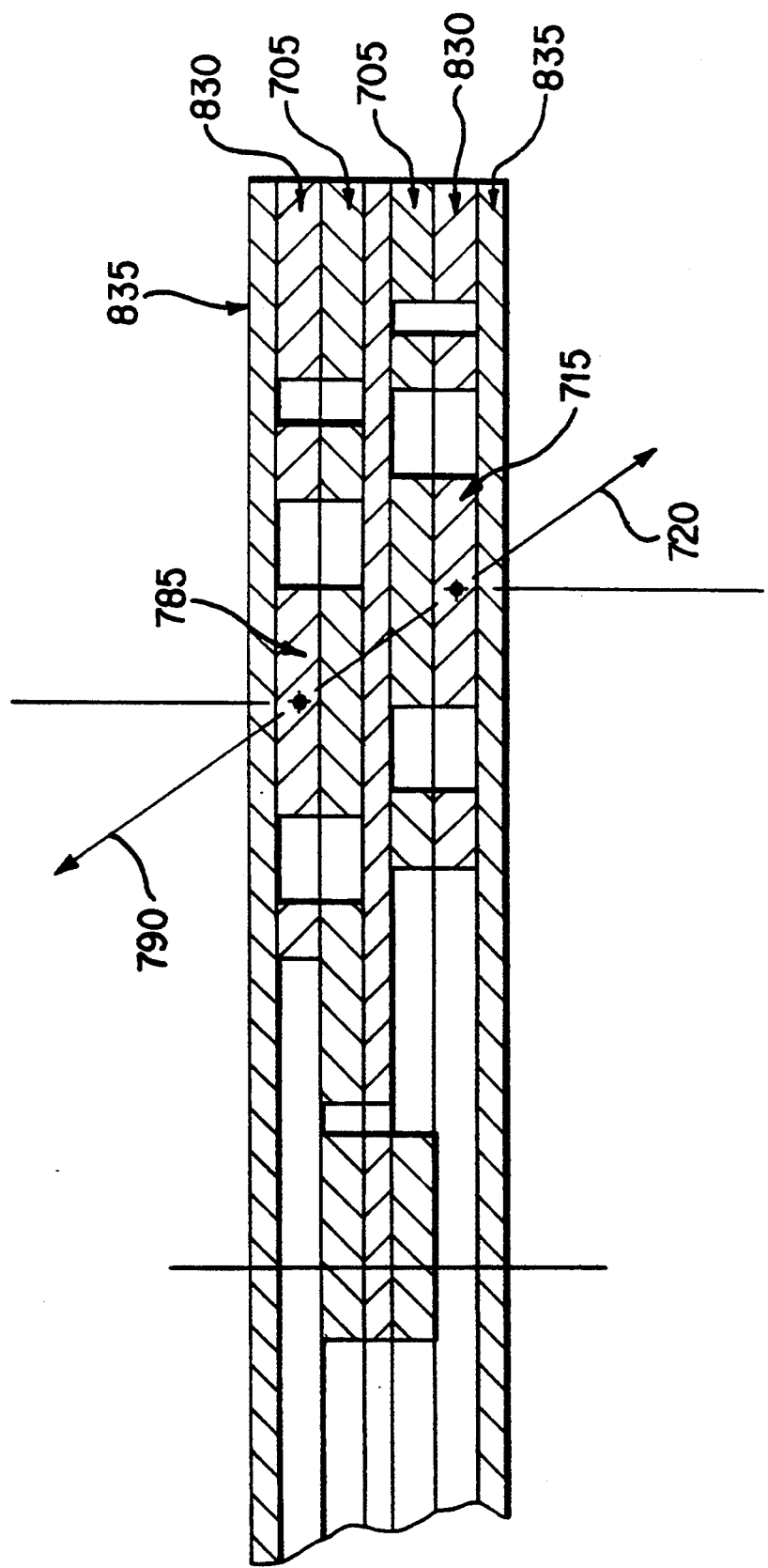
FIG. 23 illustrates the alignment of the substrates shown in FIGS. 21 and 22.
Figure 24:
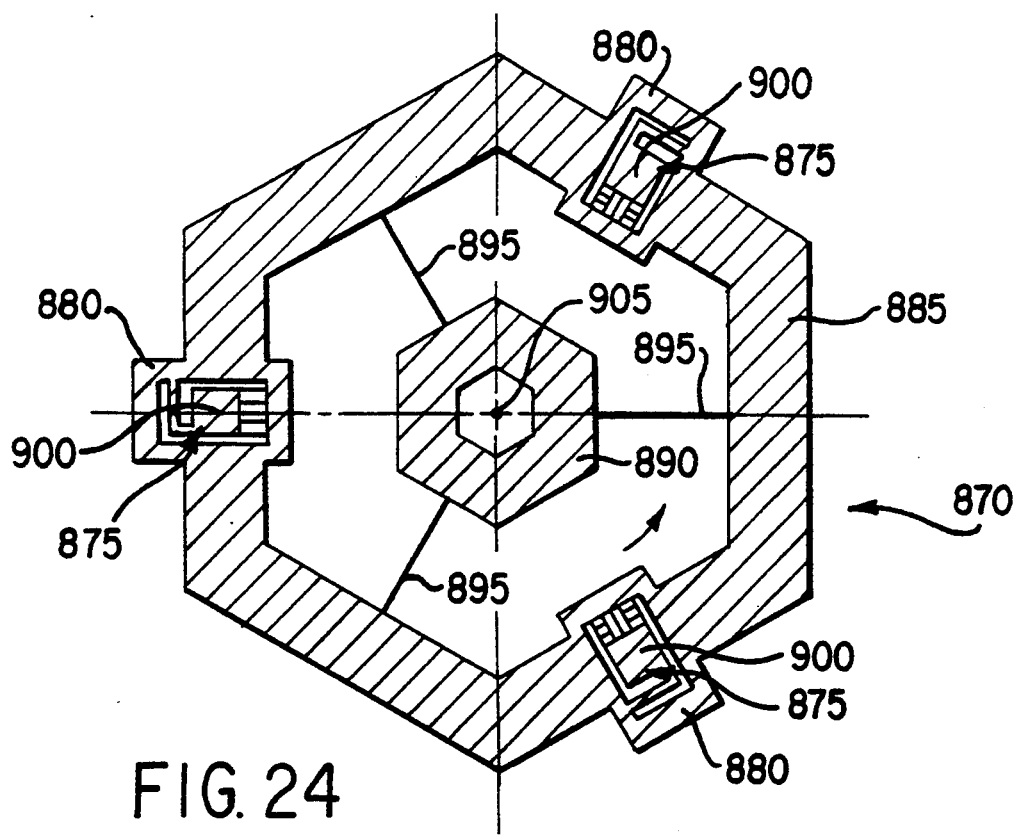
FIGS. 24 and 25 illustrate a further embodiment of two substrates for use in a triaxial angular rate and acceleration sensor which may be configured to overlie one another to reduce or eliminate angular acceleration sensitivity of the sensor.

FIGS. 21–23 are directed to one embodiment of such a triaxial sensor. The triaxial sensor includes first and second substrates 705 and 710, respectively shown in FIGS. 21 and 22. With reference to FIG. 21, the first substrate 705 includes a first set of three accelerometers 715 that are arranged at an angle of 120 degrees with respect to one another and have their sensing axes 720 canted into the page and away from center axis passing through 725 so that the sensing axes lie skewed to one another. Each accelerometer 715 is connected to a main frame 730 by a pair of back-to-back, S-bending flexure units 735, one flexure unit 735 respectively extending from each of two opposite sides of the respective sensor frame 740.

As illustrated, the first substrate 705 includes a central hub 745. The hub includes three arms 750 that are arranged at an angle of 120 degrees with respect to one another. The accelerometers 715 formed in the first substrate 705, unlike those of the second substrate 710 described below, are not directly connected to a hub. Rather, a link 755 and its associated components are interposed between the hub 745 and the support frame 740 of the respective accelerometer 715.

Each link 755 includes a generally U-shaped portion 760 that is connected to the main frame 730 by a pivot flexure 765. A pair of lever arms 770a and 770b extend in opposite directions from the U-shaped portion 760 of each link 755. One lever arm 770a is connected to a perpendicularly extending flexure 775 that connects the lever arm 770a to a side of the support frame 740 of the respective accelerometer 715. The other lever arm 770b of each link 755 is connected to a further perpendicularly extending flexure 780 that connects the lever arm 770b to a respective arm 750 of the hub 745. The flexure 780 is generally perpendicular to the respective arm 750.

The second substrate 710 includes a second set of three accelerometers 785 that are arranged at an angle of 120 degrees with respect to one another and have their sensing axes 790 canted out of the page and toward center axis passing through 725 so that the sensing axes are skewed to one another. Each accelerometer 785 is connected to a main frame 792 by a pair of back-to-back, S-bending flexure units 795, one flexure unit 795 respectively extending from each of two opposite sides of the respective sensor frame 800. The centrally facing side 805 of the sensor frame 800 of each accelerometer 785 is connected to a central hub 810 by a radial hub member 815 that includes a rigid portions 820 that is connected to the respective arm 822 by a back-to-back, S-bending flexure unit 825.

The main frames 730 and 792 of the first and second substrates 705, 710 are placed in fixed relationship with respect to one another so as to properly align the accelerometers. Additionally, the hubs are connected to one another, for example, at the hub portions of damping plates covering the sections of the first and second substrates that face one another.

As shown in the cross-sectional view of FIG. 23, the first and second substrates are assembled with respect to one another so that each accelerometer of the first substrate 705 underlies a corresponding accelerometer of the second substrate 710. Each accelerometer 715 of the first substrate is aligned so that the respective sensing axis 720 diverges away from the center of the triaxial sensor. The substrates 705 and 710 are arranged so that the sensing axis 790 of each accelerometer 785 of the second substrate 710 points in a direction opposite the sensing axis 720 of the corresponding accelerometer 715 in the first substrate 705. Additionally, as shown in the drawing, the sensing axes 720 and 790 are aligned to reduce or eliminate angular acceleration sensitivity. To accomplish this, the accelerometers 785 of the second substrate 710 are at a smaller radial distance from the center point than the corresponding accelerometers 715 of the first substrate 705.

Other aspects of the triaxial sensor are also shown in FIG. 23. As illustrated, each substrate has a corresponding mass plate 830 that assists in canting the sensing axes of the accelerometers and, further, dampens their response with damping plates 835. Additionally, each substrate 705 and 710 is enclosed by a respective pair of cover plates 835.

Referring now to FIGS. 21 and 22, a dither motion applied, for example, to one of the accelerometers of the first substrate in the direction denoted by arrow 840 in FIG. 21 produces a corresponding dither motion in the other accelerometers of the first substrate in the direction denoted by arrows 850. The links 755 effectively reverse this motion as it is transferred to the hub 745. Thus, the hub 745 rotates in the direction denoted by arrow 855. Since the hubs of the first and second substrates are connected to one another, a rotation of the hub of the first substrate produces a corresponding rotation of the hub of the second substrate in the same direction, here denoted by arrow 860 in FIG. 22. This rotational motion of the hub of the second substrate is transferred along the radial hub members 815 and produces a linear dither of each accelerometer in the direction denoted by arrow 865. As shown, the linear dither motion of each accelerometer of the second substrate is in a direction opposite the linear dither motion of the corresponding accelerometer of the first substrate.

A further embodiment of a triaxial sensor is shown in FIGS. 24–31. This embodiment includes a first substrate 870 with a first set of three coplanar accelerometers 875 formed therein that have their support frames 880 integrally interconnected by a hexagonal main frame 885 which spaces the accelerometers at an angle of 120 degrees with respect to one another. The hexagonal main frame 885 is concentrically disposed about a hexagonal hub 890 that is also formed from the substrate 870. Three flexures 895 formed in the substrate connect the hub 890 to the main frame 885. The accelerometers of this first set, with the addition of the mass plate described in more detail below, are designed such that their sensing axes 900 are canted with respect to the normal of the substrate plane toward the center 905 and are directed out of the page. As a result, the sensing axes are skewed to one another.

Figure 25:
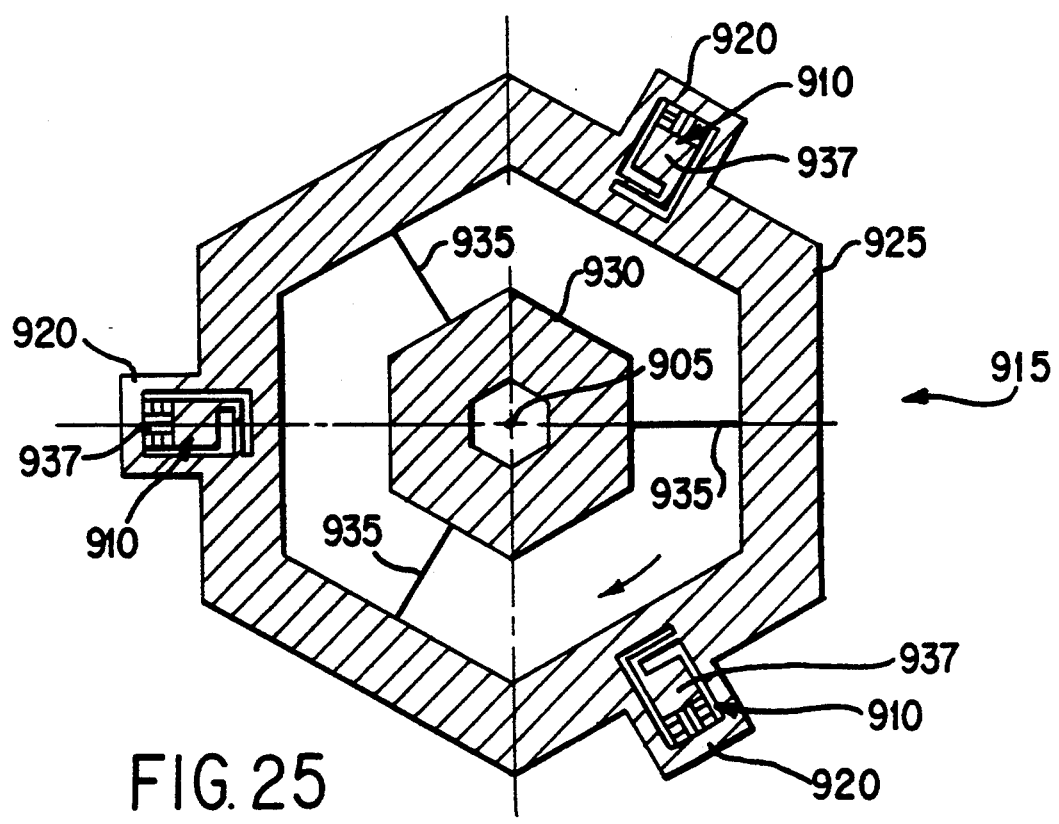
Figure 26:
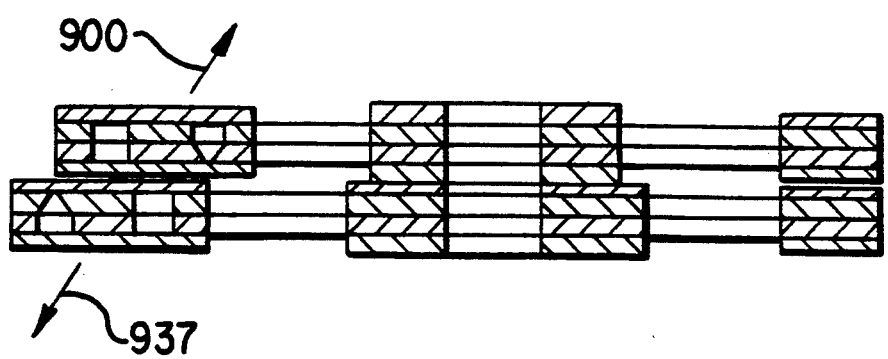
FIGS. 26–28 illustrate one manner in which the substrates of FIGS. 24 and 25 may be arranged with other structures of the sensor.

A second set of three coplanar accelerometers 910 are formed in a second substrate 915, shown here in FIG. 25. The second set of accelerometers 910 likewise have their support frames 920 integrally interconnected by a hexagonal main frame 925 which is concentrically disposed about a hexagonal hub 930 which is also formed from the substrate 915. The hexagonal main frame 925 spaces the accelerometers 910 at an angle of 120 degrees with respect to one another. Three flexures 935 are formed in the substrate 915 and connect the hub 930 to the main frame 925. The accelerometers of the second set, with the addition of the mass plate shown in the assembly below, are designed such that their sensing axes 937 are canted with respect to the plane of the substrate at an angle away from the center 905 and are directed into the page. As a result, the sensing axes are skewed with respect to one another. Additionally, the hub 930 and main frame 925 of the second set of accelerometers 910 are larger than the hub 890 and main frame 885 of the first set of accelerometers 875. As will be more clearly evident from the description below, this arrangement aligns the sensing axes 900 of the first set of accelerometers 875 with the sensing axes 937 of the second set of accelerometers 910 when the first and second set of accelerometers are stacked over one another (See FIG. 26).

Figure 27:
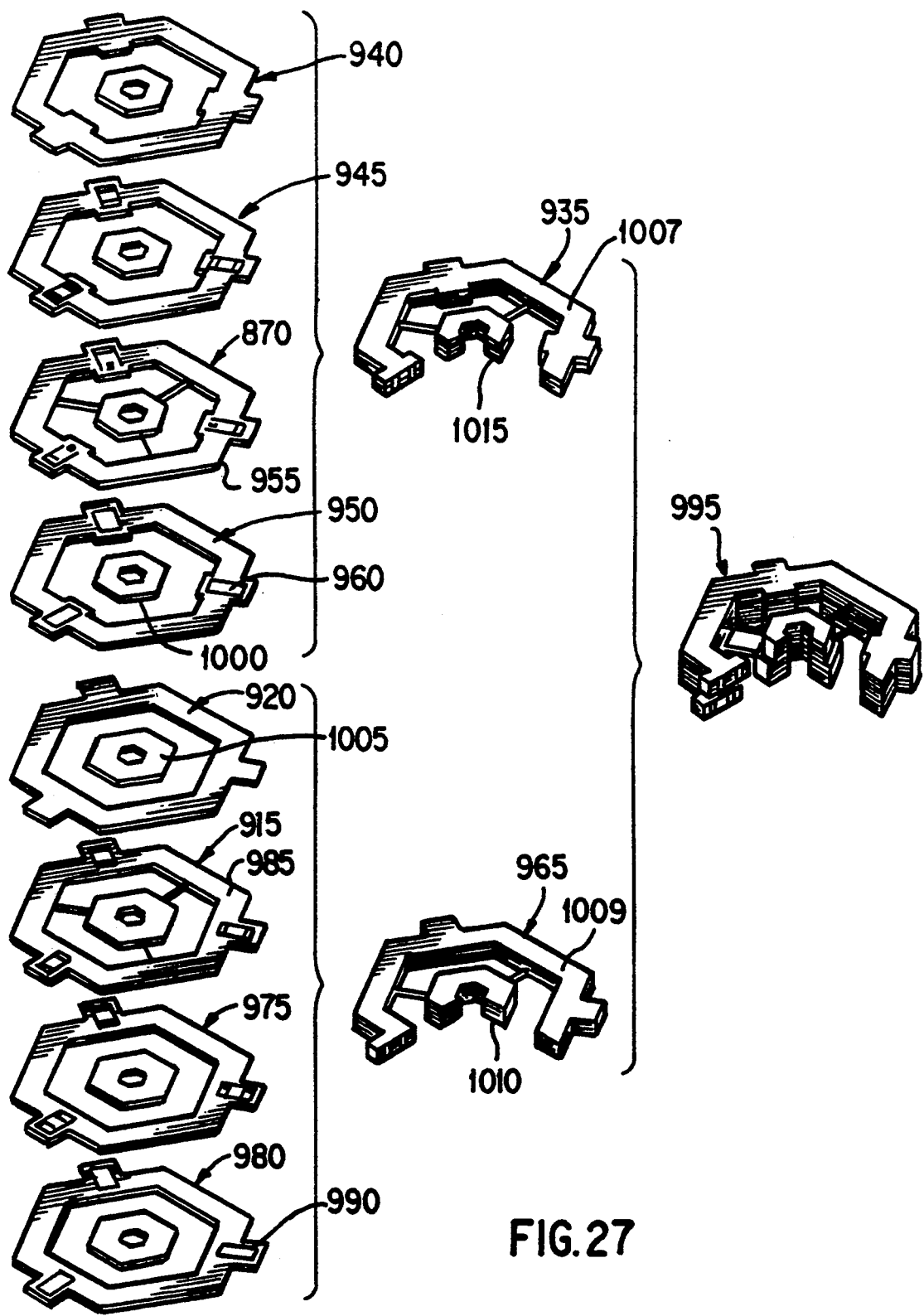

FIG. 27 shows other structures which comprise the triaxial sensor of this embodiment. As shown, the first set of accelerometers are arranged in a first layered stack 935 which includes a first damping plate 940, the first substrate 870, a mass plate 945 and a second damping plate 950. The mass plate 945 is disposed over the top surface 955 of the first set of accelerometers and includes an extension of the material that is disposed over the proof masses of the accelerometers. Although only shown with respect to the second damping plate 950, both the first and second damping plates 940, 950 include damping gaps 960 which are etched back to permit motion of the proof masses of the accelerometers.

The second set of accelerometers 910 are arranged in a second layered stack 965 which includes a first damping plate 970, a mass plate 975, the second substrate 915, and a second damping plate 980. The mass plate 975 is disposed under the lower surface 985 of the second set of accelerometers and includes an extension of the material that is disposed over the proof masses of the accelerometers. Both the first and second damping plates 970, 980 include damping gaps 990 which are etched back to permit motion of the proof masses of the accelerometers.

The first and second layered stacks 935, 965 are arranged over one another to form a complete triaxial sensor stack 995. The hub portion 1005 of the first damping plate 970 of the second layered stack 965 and the hub portion 1000 of the second damping plate 950 of the first layered stack 935 are constructed to be slightly thicker than the portions of the damping plates respectively covering the main frame and accelerometers. The hub portions 1000, 1005 of the damping plates 950, 970 thus are used to space the main frame portion 1007 of the first layered stack from the main frame portions 1009 of the second layered stack. When a dither motion is applied to drive the layered stacks, the natural difference between the resonant frequencies of the first and second layered stacks causes the first layered stack to rotate out of phase and at a slightly different frequency with respect to the second layered stack.

Figure 28:
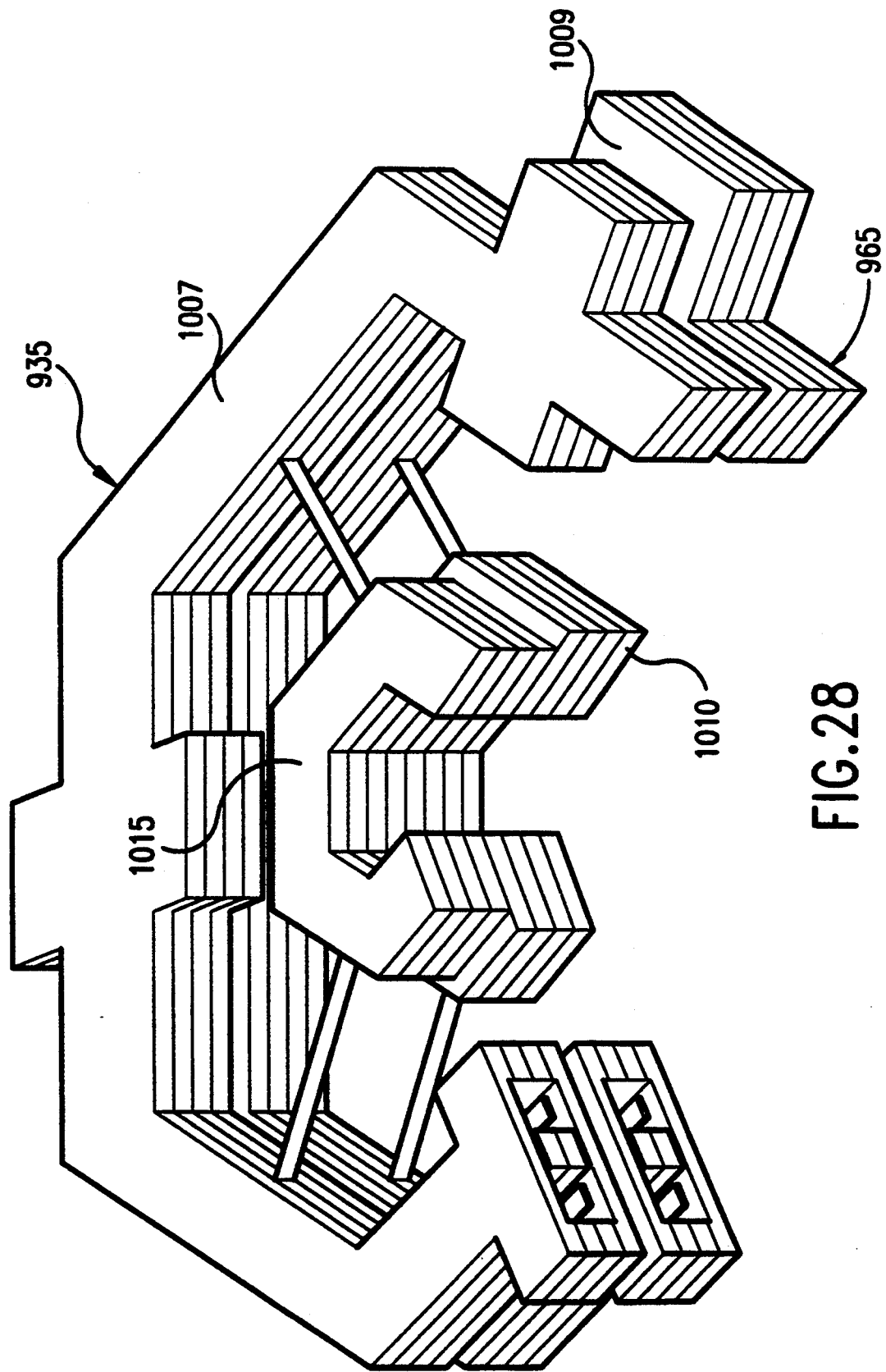

A partial cross-sectional view of the completed stack is shown in FIG. 28. As shown, the hub portion 1010 and main frame portion 1009 of the second layered stack 965 are larger than the hub portion 1015 and main frame portion 1007 of the first layered stack 935 by an amount sufficient to align the sensing axis of each accelerometer of the first set of accelerometers 875 with the sensing axis of the corresponding second set of accelerometers 910. This configuration thus allows a triaxial sensor formed in this manner to operate without angular acceleration sensitivity.

Figure 29:
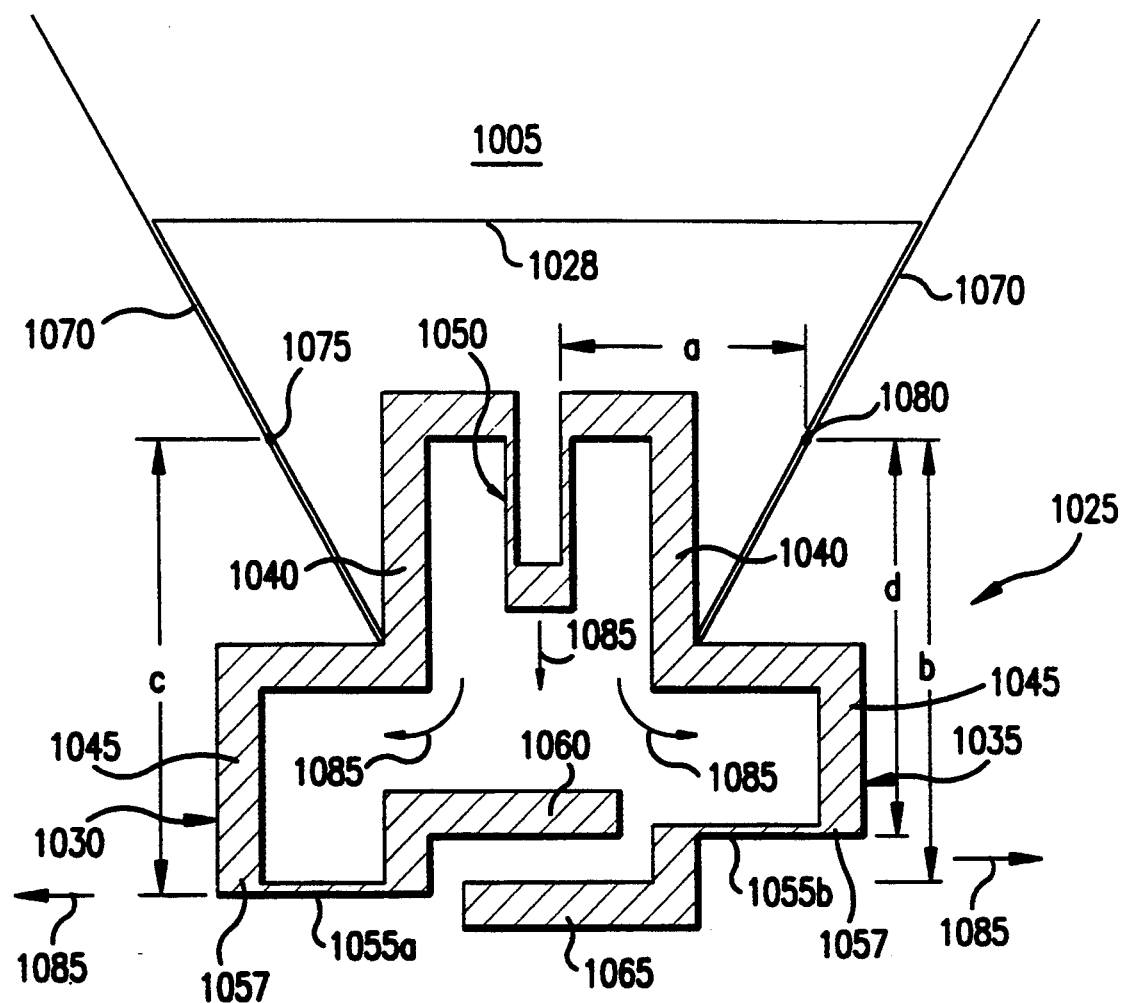
FIG. 29 illustrates one embodiment of a stack link which may be used to link the sensor stacks shown in FIGS. 26–28.

The first and second layered stacks may be linked by flexures or the like to facilitate counter-rotation of the first and second layered stacks. A stack link suitable for use in linking the first and second layered stacks is shown in FIG. 29.

As illustrated, the stack link 1025 may be formed, for example, as an extension from a side 1028 of the hub portion 1005 of the second damping plate 950 of the first layered stack 965. Both the stack link and hub may be formed from a single substrate material such as quartz. The stack link 1025 includes oppositely directed first and second stepped members 1030 and 1035 each having a first step portion 1040 and a second step 1045 portion. The first and second stepped members are interconnected by a back-to-back, S-bending flexure unit 1050 that serves as a coupler. A flexure 1055 extends from the end portion 1057 of each stepped member 1030, 1035. The flexures 1055 extend toward one another and are connected to respective L-shaped members 1060 and 1065. While L-shaped member 1060 extends inward toward the hub portion 1005, L-shaped member 1065 extends outward from the hub portion 1005. Angular flexures 1070 extend from the first and second stepped members 1030 and 1035 at the junction of the first and second steps 1040 and 1045 and connect the first and second steps to the hub portion 1005. The angular flexures 1070 bend in a simple bending mode.

The stepped members effectively act as gears which are intermeshed by the back-to-back, S-bending flexure unit 1050. The gear formed by the first stepped member 1030 has an effective center of rotation about point 1075 while the second stepped member 1035 has an effective center of rotation about point 1080.

Figure 30:
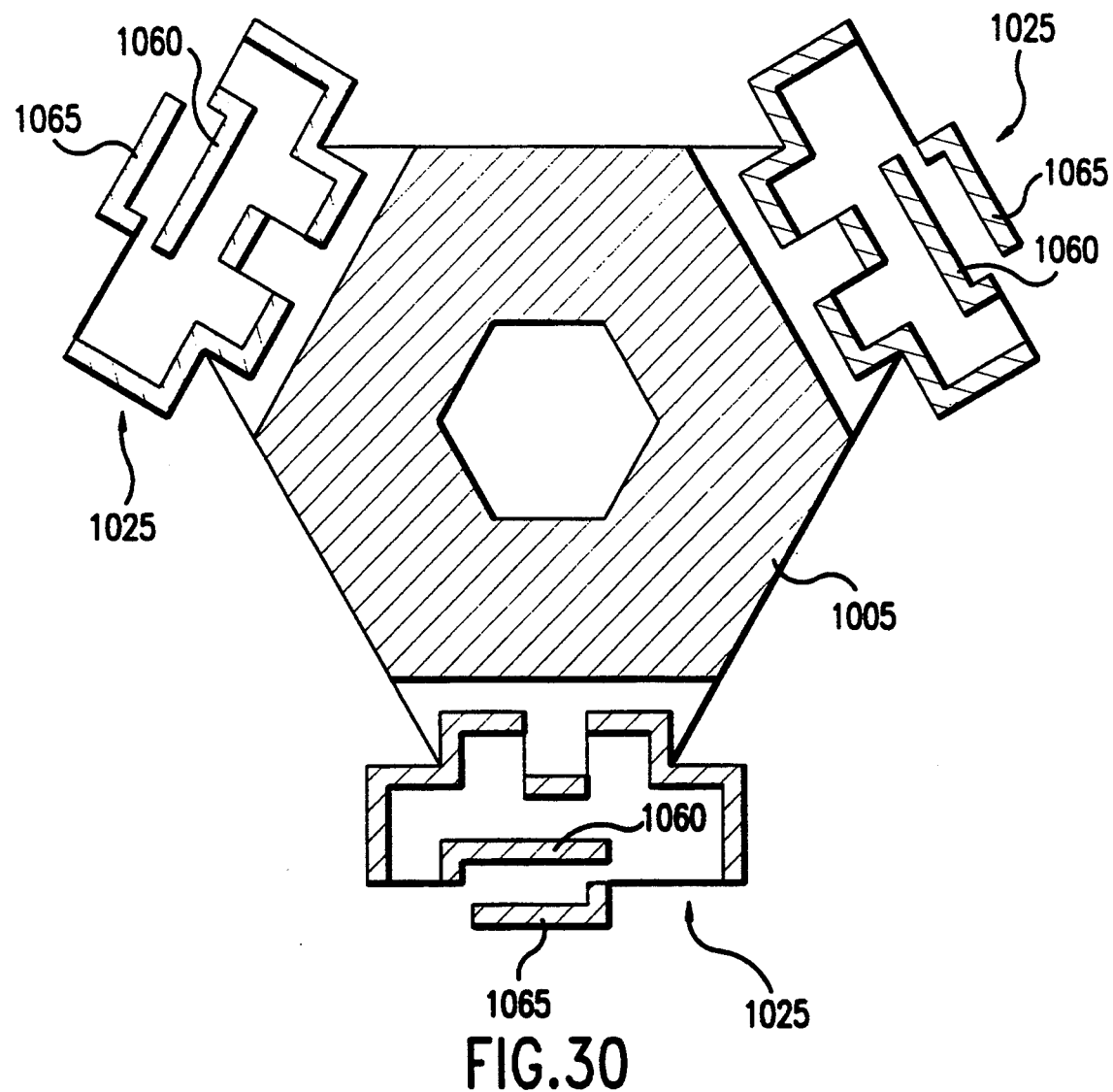
FIG. 30 illustrates the use of three of the stack links shown in FIG. 29.
Figure 31:
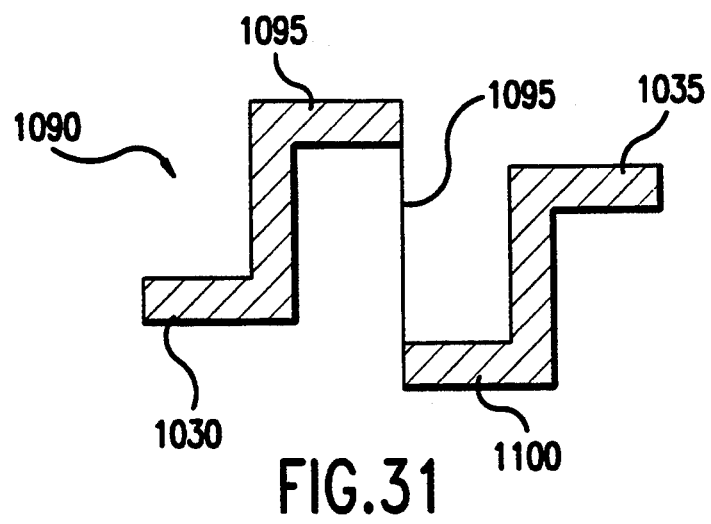
FIG. 31 illustrates an alternative coupler to couple the first and second stepped members of the stack link of FIG. 29.

In a preferred embodiment, three stack links 1025 extend from the hub portion 1005 as shown in FIG. 30. Each stack link is respectively associated with and aligned with a corresponding pair of accelerometers. The L-shaped member 1060 is connected to the first layered stack 935 while the L-shaped member 1065 is connected to the second layered stack 965. Dither motion applied by an accelerometer of one of the sensor stacks is transferred to the stack links 1025 and results in motion of the flexure unit 1050 and stepped members 1030, 1035 in the directions shown by arrows 1085 of FIG. 29. This motion, in turn, causes the stacks to dither in opposite directions.

Several dimensions should be noted. As illustrated, the first stepped member 1030 has an associated length c corresponding to the distance between the center of rotation 1075 and the middle of flexure 1055a. Similarly, the second stepped member 1035 has an associated length d corresponding to the distance between the center of rotation 1080 and the middle of flexure 1055b. The ratio c:d represents the gearing ratio which should be taken into consideration when designing the stack link 1025. The gearing ratio should contemplate the fact that the main frame portions of the layered stacks are disposed at different radii. The gearing ratio c:d can be selected to compensate for this so that corresponding accelerometers travel through the same linear distance.

The dimension b represents the distance from the center of rotation 1080 and the mid-point between the L-shaped members (i.e., b=(c+d)/2). If the stack link 1025 and hub portion 1005 are made from crystalline quartz, the ratio a:b should follow the following equation:

$$30 = \mathrm{Tan}^{-1}(a/b).$$

If formed in this manner, the design will take advantage of the symmetry of the crystal planes inherent in the crystalline quartz.

The back-to-back, S-bending flexure unit 1050 may be subject to block rotation. To avoid such block rotation, the flexure unit 1050 may be replaced by the in-line coupler 1090 shown in FIG. 31. The in-line coupler 1090 includes a single flexure 1095 that is connected to the stepped members 1030 and 1035 by oppositely directed L-shaped portions 1095 and 1100.

FIGS. 32–35 are directed to a single axis acceleration and angular rate sensor which is insensitive to angular acceleration. The sensor includes a first accelerometer 1105 that is connected to a dither frame 1110 by a flexure configuration such as the one shown and described above with respect to FIG. 4. The accelerometer 1105 is disposed inside the dither frame 1110 to leave an open region 1115. The accelerometer 1105 further includes a sensitive axis 1120 that extends outward from the page.

A second accelerometer 1125 (FIG. 34) connected to a respective dither frame 1130 is also utilized and includes a sensitive axis 1135 that extends inward toward the page. The second accelerometer 1125 is disposed inside the dither frame 1130 to leave an open region 1140.

Figure 33:
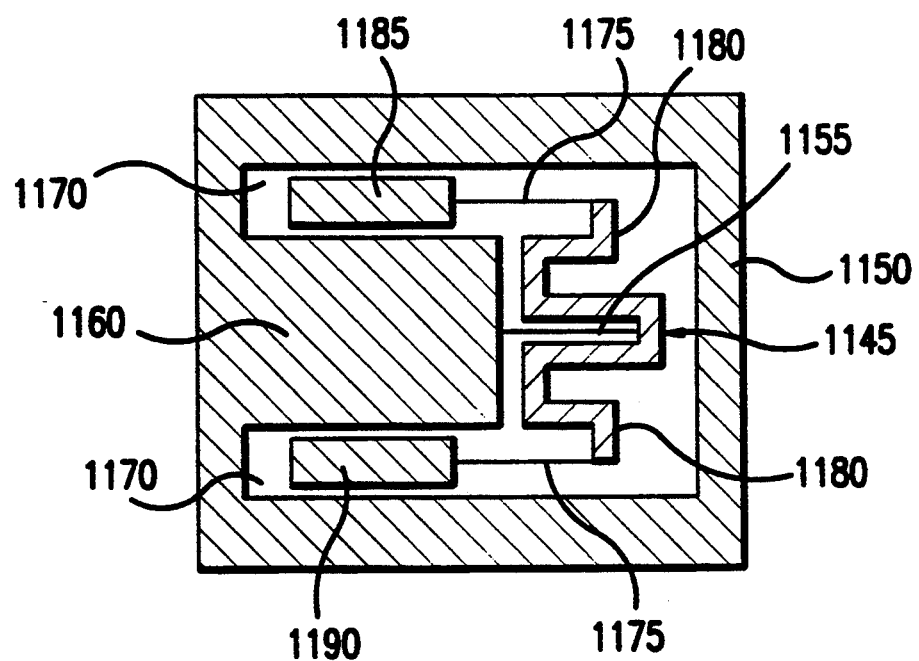
Figure 34:
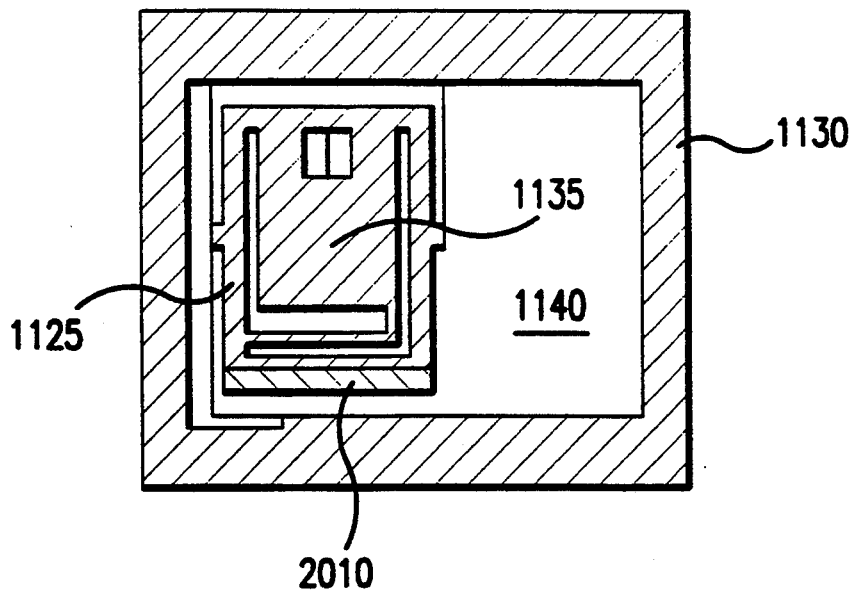

FIG. 33 illustrates a link 1145 that is connected to a link frame 1150 by a pivot flexure 1155. The link frame 1150 includes a protruding portion 1160 that defines channels 1170 on opposite sides thereof. Flexures 1175 are connected to opposite arms 1180 of the link 1145 and terminate in bonding members 1185 and 1190 respectively disposed in the channels 1170.

Figure 35:
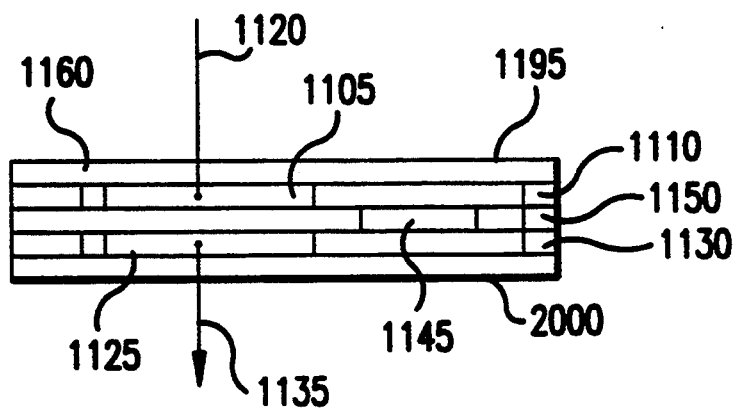

An assembled sensor is shown in FIG. 35. As illustrated, the sensor is formed by bonding the dither frames 1110 and 1130 to the to opposite sides of the link frame 1150 in a stack structure. Bonding may be accomplished using a standard bonding method known to those skilled in the art. The sensitive axes 1120 and 1135 are aligned to limit angular acceleration sensitivity. Although the axes are shown as pointing in opposite directions (anti-parallel), the axes may also lie along the same direction (parallel). A first damping plate 1195 is bonded to the first dither frame 1110 and a second damping plate 2000 is bonded to the second dither frame 1130 using known bonding techniques. The protruding portion 1160 of the link frame 1150 serves as a further damping plate that is common to both the first and second accelerometers 1105 and 1125.

The accelerometers 1105 and 1125 are connected to one another by the link 1145 which is disposed in the chamber that includes open areas 1115 and 1140. Bonding member 1185 is connected to the bottom of the bonding area 2005, shown here with cross-hatching of the first accelerometer 1105. Similarly, bonding member 1190 is connected to the bonding area 2010, shown here with cross-hatching of the second accelerometer 1125. In operation, the link allows equal but opposite dither motion of the accelerometers.

While several embodiments of the invention have been described hereinabove, those of ordinary skill in the art will recognize that the embodiments may be modified and altered without departing from the central spirit and scope of the invention. Thus, the preferred embodiments described hereinabove are to be considered in all respects as illustrative and not restrictive, the scope of the invention being indicated by the appended claims rather than by the foregoing description. Therefore, it is the intention of the inventor to embrace herein all changes which come within the meaning and range of equivalency of the claims.

What is claimed is:

1. A sensor structure adapted for use in a triaxial angular rate and acceleration sensor comprising:
    a first sensor stack including a first generally planar substrate, a first mass plate disposed over a first surface of said first substrate, a first damping plate disposed over a second surface of said first substrate, said second surface being opposite and generally parallel to said first surface, a second damping plate disposed over said mass plate, said first substrate having a first set of coplanar accelerometers formed therein, each accelerometer of said first set of accelerometers having a sensing axis canted at an angle with respect to the plane of said first substrate, said first set of accelerometers being arranged in the plane of said first substrate to place said sensing axes of said first set of accelerometers skewed to one another;
    a second sensor stack including a second generally planar substrate, a second mass plate disposed over a first surface of said second substrate, a third damping plate disposed over a second surface of said second substrate, said second surface being generally parallel to said first surface, a fourth damping plate disposed over said mass plate, said second substrate including a second set of coplanar accelerometers formed therein, each of said second set of accelerometers having a sensing axis canted at an angle with respect to the plane of said second substrate, said second set of accelerometers being arranged in the plane of said second substrate to place said sensing axes of said second set of accelerometers skewed to one another, each of said second set of accelerometers being paired with a corresponding accelerometer of said first set of accelerometers, corresponding accelerometer pairs having sensing axes that are parallel or anti-parallel;
    means for linking said first and second stacks so that said first and second sets of accelerometers dither at the same frequency.

2. A sensor structure as claimed in claim 1 wherein the sensing axes of said corresponding pairs of accelerometers are aligned.

3. A sensor structure as claimed in claim 1 wherein said first sensor stack comprises:
    a hub portion;
    a main frame portion;
    a plurality of flexures connecting said hub portion to said main frame portion to allow said main frame portion to dither with respect to said hub portion.

4. A sensor structure as claimed in claim 3 wherein said second sensor stack comprises:
    a further hub portion connected in fixed alignment with said hub portion of said first sensor stack;
    a further main frame portion;
    a further plurality of flexures connecting said further hub portion to said further main frame portion to allow said further main frame portion to dither with respect to said further hub portion.

5. A sensor structure as claimed in claim 4 wherein said means for linking comprises a stack link interconnecting said first and second sensor stacks.

6. A sensor structure as claimed in claim 5 wherein said stack link provides means for translating dither motion imposed on said main frame portion of said first sensor stack in a first direction into a dither motion on said main frame portion of said second sensor stack in a second direction opposite said first direction.

7. A sensor structure adapted for use in a triaxial angular rate and acceleration sensor comprising:
    a first sensor stack including a first generally planar substrate, a first mass plate disposed over a first surface of said first substrate, a first damping plate disposed over a second surface of said first substrate, said second surface being opposite and generally parallel to said first surface, a second damping plate disposed over said mass plate, a hub portion, a main frame portion, a plurality of flexures connecting said hub portion to said main frame portion to allow said main frame portion to dither with respect to said hub portion, said first substrate having a first set of coplanar accelerometers formed therein, each accelerometer of said first set of accelerometers having a sensing axis canted at an angle with respect to the plane of said first substrate, said first set of accelerometers being arranged in the plane of said first substrate to place said sensing axes of said first set of accelerometers skewed to one another;
    a second sensor stack including a second generally planar substrate, a second mass plate disposed over a first surface of said second substrate, a third damping plate disposed over a second surface of said second substrate, said second surface being generally parallel to said first surface, a fourth damping plate disposed over said mass plate, a further hub portion connected in fixed alignment with said hub portion of said first sensor stack, a further main frame portion, a further plurality of flexures connecting said further hub portion to said further main frame portion to allow said further main frame portion to dither with respect to said further hub portion, said second substrate including a second set of coplanar accelerometers formed therein, each of said second set of accelerometers having a sensing axis canted at an angle with respect to the plane of said second substrate, said second set of accelerometers being arranged in the plane of said second substrate to place said sensing axes of said second set of accelerometers skewed to one another, each of said second set of accelerometers being paired with a corresponding accelerometer of said first set of accelerometers, corresponding accelerometer pairs having sensing axes that are parallel or anti-parallel;

means for linking said first and second stacks so that said first and second sets of accelerometers dither at the same frequency, said means for linking including a stack link interconnecting said first and second sensor stacks, said stack link provides means for translating dither motion imposed on said main frame portion of said first sensor stack in a first direction into a dither motion on said main frame portion of said second sensor stack in a second direction opposite said first direction;

said stack link including a first stepped member, a second stepped member directed opposite said first stepped member, a back to back, S-bending flexure unit connecting said first and second stepped members, first means for connecting said first stepped member to said main frame portion of said first sensor stack, second means for connecting said second stepped member to said further main frame portion of said second sensor stack, third means for connecting said first and second stepped members to said further hub portion.

8. A sensor structure as claimed in claim 7 wherein the sensing axes of said corresponding pairs of accelerometers are aligned.

* * * * *